US00RE34061E

United States Patent [19]

Kawai et al.

[11] E Patent Number: Re. 34,061

[45] Reissued Date of Patent: Sep. 8, 1992

[54] POLYMERS OF TRICYCLO[5.2.1.0$^{2,6}$]DECA-8-YL (METH)ACRYLATE

[75] Inventors: Hiromasa Kawai, Ichihara; Takashi Morinaga, Chiba; Hiromu Miyajima, Hitachi; Toshio Akima; Mitsuharu Kato, both of Ichihara; Yutaka Hosoi, Mito, all of Japan

[73] Assignee: Hitachi Chemical Co., Ltd., Tokyo, Japan

[21] Appl. No.: 199,775

[22] Filed: May 27, 1988

Related U.S. Patent Documents

Reissue of:

[64] Patent No.: 4,591,626
Issued: May 27, 1986
Appl. No.: 663,974
Filed: Oct. 23, 1984

[30] Foreign Application Priority Data

Oct. 24, 1983 [JP] Japan ..... 58-198743
Nov. 1, 1983 [JP] Japan ..... 58-205601
Sep. 20, 1984 [JP] Japan ..... 59-197596

[51] Int. Cl.$^5$ ..... C08F 32/08

[52] U.S. Cl. ..... 526/282; 526/280; 523/169

[58] Field of Search ..... 526/282

[56] References Cited

U.S. PATENT DOCUMENTS 2,342,295 2/1944 Orthner et al. ..... 526/262
4,097,677 6/1978 Emmons et al. ..... 526/282
4,131,729 12/1978 Schmitt et al. ..... 526/282
4,319,009 3/1982 Friedli et al. ..... 526/282
4,416,950 11/1983 Muller et al. ..... 526/282

FOREIGN PATENT DOCUMENTS 2058493 9/1971 Fed. Rep. of Germany .
58/80312 5/1983 Japan ..... 526/262

*Primary Examiner*—Thurman K. Page
*Assistant Examiner*—P. Kulkosky
*Attorney, Agent, or Firm*—Antonelli, Terry Stout & Kraus

[57] ABSTRACT

A polymer obtained by polymerizing tricyclo[5.2.1.0$^{2,6}$-]deca-8-yl acrylate or methacrylate in an amount of 100–5% by weight with one or more copolymerizable unsaturated monomers in an amount of 0 to 95% by weight is excellent in transparency, moisture resistance, and heat resistance and is suitable as a material for optical elements.

8 Claims, 54 Drawing Sheets

POLYMERS OF TRICYCLO[5.2.1.0$^{2,6}$]DECA-8-YL (METH)ACRYLATE

Matter enclosed in heavy brackets [ ] appears in the original patent but forms no part of this reissue specification; matter printed in italics indicates the additions made by reissue.

BACKGROUND OF THE INVENTION

This invention relates to a polymer excellent in transparency, low moisture-absorption properties, and heat resistance.

Heretofore, poly(methyl methacrylate) resins, polycarbonate resins, polystyrene resins, methyl methacrylate-styrene copolymer resins have been known as transparent resins. These resins are used as molding materials or sheet materials for producing electrical and mechanical parts, automotive parts, light fitment parts; and general merchandise goods applying their transparency, thermoplastic properties, and the like. Further, these resins are going to be used newly as materials for optical elements such as various optical lenses, optical fibers, optical connectors, optical disks, optical circuits, and the like. But with enlargement of application fields, demands for properties of these transparent resins are varied and enhanced, for example, there are newly or highly demanded low moisture absorption properties, heat resistance, molding transfer properties, low birefringence of molded products, and the like in addition to the transparency originally required.

But new materials satisfying all such demands have not been developed, and this is an unsolved problem. For example, poly(methyl methacrylate) resins are excellent in optical properties such as transparency and low birefringence but has a fatal defect in moisture absorption properties. Polystyrene resins are excellent in low moisture absorption properties but disadvantageously large in birefringence and poor in heat resistance. Further, polycarbonate resins are excellent in heat resistance but disadvantageously very large in birefringence like polystyrene resins.

In order to improve the moisture absorption properties and heat resistance of poly(methyl methacrylate) resins which have high possibility as materials for optical elements among these resins, there have been proposed processes for copolymerizing cyclohexyl methacrylate or benzyl methacrylate with methyl methacrylate (e.g. Japanese Patent Appln, Kokai (Laid-Open) Nos. 5318/83, 5354/83, 11515/83, and 13652/83). According to these processes, the moisture absorption properties can be improved considerably but are still insufficient as materials for optical elements and there arises another problem of lowering the heat resistance remarkably.

SUMMARY OF THE INVENTION

It is an object of this invention to provide a polymer excellent in transparency and heat resistance overcoming the disadvantages of known transparent resins.

It is another object of this invention to provide a polymer suitable as a material for optical elements overcoming the disadvantages of known transparent resins.

This invention provides a polymer produced by polymerizing a compound of the formula:

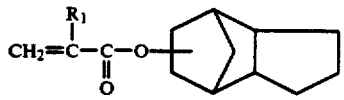

(I)

wherein $R_1$ is hydrogen or a methyl group, or polymerizing a compound of the formula (I) together with one or more unsaturated monomers copolymerizable with the compound of the formula (I)

Thus the polymer has at least a repeating unit of the formula:

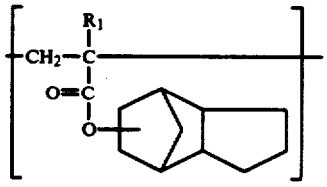

(II)

wherein $R_1$ is as defined above.

This invention also provide an optical resin material comprising a polymer having at least a repeating unit of the formula (II).

DESCRIPTION OF PREFERRED EMBODIMENTS

Figure 1:
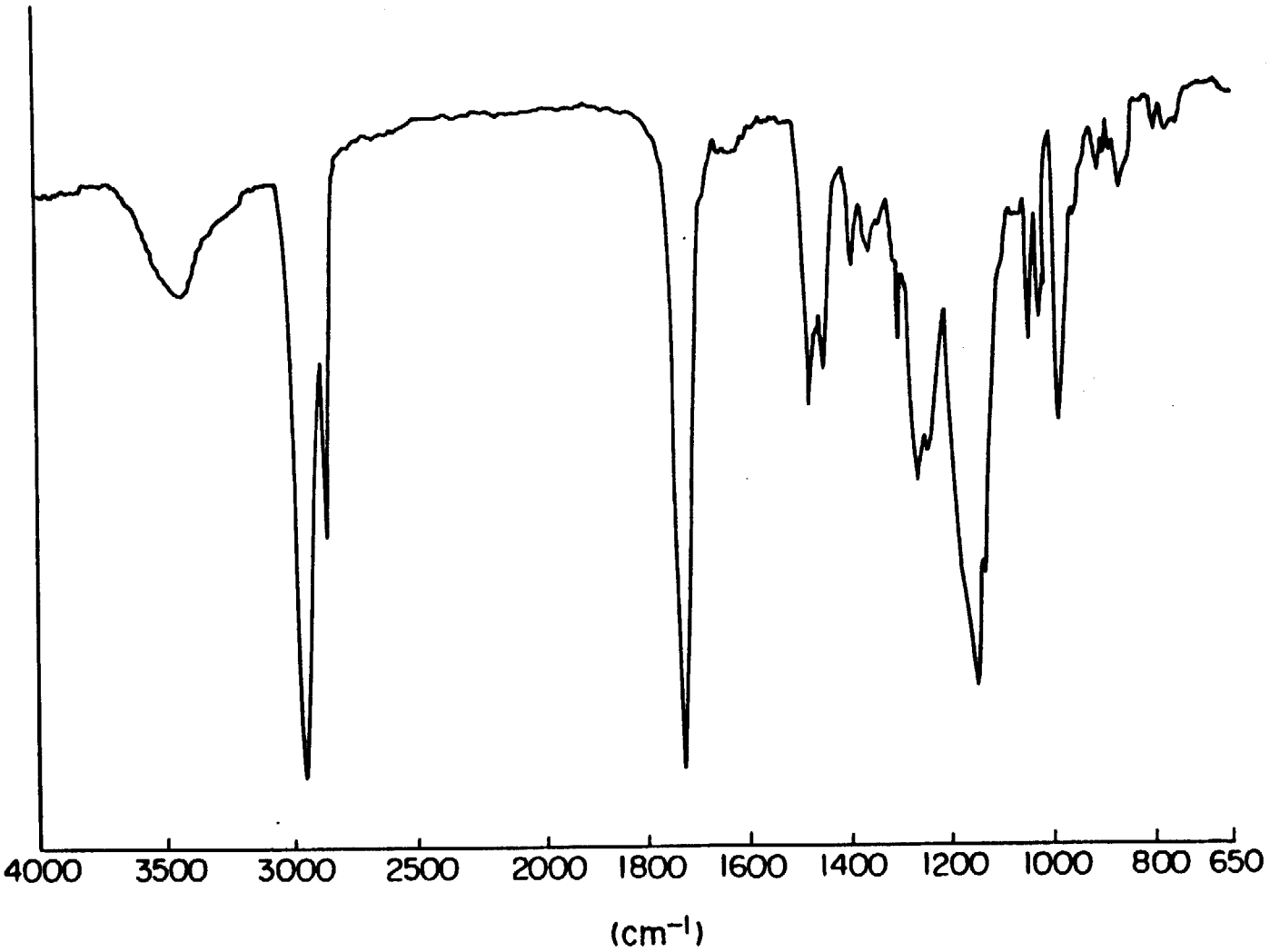
FIGS. 1, 4, 7, 10, 13, 16, 19, 22, 25, 28, 31, 34, 37, 40, 43, 46, 49, 52 and 53 are infrared spectra of the polymers obtained in this invention.

The polymer of this invention is characterized by containing the repeating unit of the formula (II) and having excellent heat resistance, low moisture absorption properties and transparency. Features of the repeating unit of the formula (II) are caused by attaching at a side chain a tricyclo[5.2.1.0$^{2,6}$]deca-8-yl group which is bulky three-dimensionally and large in displacement volume to the main chain, said side chain giving excellent heat resistance and low moisture absorption properties.

The polymer of this invention includes a homopolymer obtained by polymerizing a compound of the formula (I), a copolymer obtained by polymerizing different kinds of the compounds of the formula (I), a copolymer obtained by polymerizing a compound of the formula (I) and one or more unsaturated monomers copolymerizable with the compound of the formula (I).

The compound of the formula:

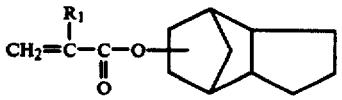

(I)

wherein $R_1$ is hydrogen or a methyl group, that is, tricyclo-[5.2.1.0$^{2,6}$]deca-8-yl methacrylate or tricyclo[5.2.1.0$^{2,6}$]-deca-8-yl acrylate, can be prepared by a conventional process for synthesizing a methacrylic or acrylic acid ester. For example, the compound of the formula (I) can be prepared by adding $H_2O$ to dicyclopentadiene to give dicyclopentenyl alcohol, which is changed to tricyclo[5.2.1.0$^{2,6}$]deca-8-ol by catalytic hydrogenation reaction, followed by ester exchange reaction with methyl methacrylate or methyl acrylate, or condensation reaction with methacrylic acid, acrylic acid, methacrylic acid chloride or acrylic acid chloride.

The monomer copolymerizable with the compound of the formula (I) includes unsaturated fatty acid esters, aromatic vinyl compounds, vinyl cyanide compounds, unsaturated dibasic acids or derivatives thereof such as N-substituted maleimides, unsaturated fatty acids or derivatives thereof such as (meth)acrylamide, etc.

Examples of the unsaturated fatty acid esters are alkyl acrylates such as methyl acrylate, ethyl acrylate propyl acrylate, butyl acrylate, hexyl acrylate, lauryl acrylate, stearyl acrylate, venenyl acrylate, 2-ethylhexyl acrylate, etc.; cycloalkyl acrylates such as cyclohexyl acrylate, methylcyclohexyl acrylate, tricyclo[5.2.1.0$^{2,6}$]deca-8-yl-oxyethyl acrylate, bornyl acrylate, isobornyl acrylate, adamantyl acrylate, etc.; aromatic acrylic acid esters such as phenyl acrylate, benzyl acrylate, naphthyl acrylate, etc.; substituted aromatic acrylic acid esters such as fluorophenyl acrylate, chlorophenyl acrylate, bromophenyl acrylate, fluorobenzyl acrylate, chlorobenzyl acrylate, bromobenzyl acrylate, etc.; halogenated alkyl acrylates such as fluoromethyl acrylate, fluoroethyl acrylate, chloroethyl acrylate, bromoethyl acrylate, etc.; acrylic acid esters such as hydroxyalkyl acrylates, glycidyl acrylate, ethylene glycol acrylate, polyethylene glycol acrylate, alkylaminoalkyl acrylates, cyanoalkyl acrylate; alkyl methacrylates such as methyl methacrylate, ethyl methacrylate, propyl methacrylate, butyl methacrylate, hexyl methacrylate, 2-ethylhexyl methacrylate, lauryl methacrylate, stearyl methacrylate, vehenyl methacrylate, etc.; cycloalkyl methacrylates such as cyclohexyl methacrylate, methylcyclohexyl methacrylate, tricylo[5.2.1.0$^{2,6}$]deca-8yl-oxyethyl methacrylate, bornyl methacrylate, isobornyl methacrylate, adamantyl methacrylate, etc.; aromatic methacrylic acid esters such as phenyl methacrylate, benzyl methacrylate, naphthyl methacrylate, etc.; substituted aromatic methacrylic acid esters such as fluorophenyl methacrylate, chlorophenyl methacrylate, bromophenyl methacrylate, fluorobenzyl methacrylate, chlorobenzyl methacrylate, bromobenzyl methacrylate, etc.; halogenated alkyl methacrylates such as fluoromethyl methacrylate, fluoroethyl methacrylate, chloroethyl methacrylate, bromoethyl methacrylate, etc.; methacrylic acid esters such as hydroxyalkyl methacrylates, glycidyl methacrylate, ethylene glycol methacrylate, polyethylene glycol methacrylate, alkylaminoalkyl methacrylates, cyanoalkyl methacrylates, etc.; α-substituted acrylic acid esters such as α-fluoroacrylic acid esters, α-chloroacrylic acid esters, α-cyanoacrylic acid esters, etc.

Examples of the aromatic vinyl compounds are styrene; α-substituted styrenes such as α-methyl styrene, α-ethyl styrene, α-fluoro styrene, α-chloro styrene, etc.; nuclear-substituted styrenes such as fluorostyrene, chlorostyrene, bromostyrene, methylstyrene, butylstyrene, methoxystyrene, etc.; vinyl toluene, etc.

Examples of the vinyl cyanide compounds are acrylonitrile, methacrylonitrile, etc.

Examples of the unsaturated basic acids and derivatives thereof are maleic acid, maleic anhydride, fumaric acid, etc.; N-substituted maleimides, e.g. aliphatic N-substituted maleimides such as N-methylmaleimide, N-ethylmaleimide, N-propylmaleimide, N-isopropylmaleimide, N-butylmaleimide, N-laurylmaleimide, etc.; alicyclic N-substituted maleimides such as N-cyclohexylmaleimide, etc.; aromatic N-substituted maleimides such as N-phenylmaleimide, N-methylphenylmaleimide, N-chlorophenylmaleimide, N-methoxyphenylmaleimide, N-carboxyphenylmaleimide, etc.

Examples of the unsaturated fatty acids and derivatives thereof are acrylic acid, methacrylic acid, etc.; acrylamides or methacrylamides such as acrylamide, methacrylamide, N-dimethylacrylamide, N-diethylacrylamide, N-dimethylmethacrylamide, N-diethylmethacrylamide, etc.; metal salts of acrylic acid or methacrylic acids such as potassium arcylate, potassium methacrylate, barium acrylate, barium methacrylate, lead acrylate, lead methacrylate, tin acrylate, tin methacrylate, zinc acrylate, zinc methacrylate, etc.

Among these monomers copolymerizable with the compound of the formula (I), the N-substituted maleimides are preferable for improving the heat resistance.

In the polymerization to produce the polymer of this invention, there can be employed conventional polymerization methods such as radical polymerization, ionic polymerization, coordination polymerization, group transformation polymerization, etc. For example, the desired polymers can be produced by bulk polymerization, solution polymerization, suspension polymerization, emulsion polymerization in the presence of a polymerization initiator. Particularly when the contamination of a resulting resin with impurities should be considered in the case of using said resin as a material for optical elements, the bulk polymerization or suspension polymerization is preferable.

As the polymerization initiator, these can be used those usually used in radical polymerization and ionic polymerization, e.g., organic peroxides such as benzoyl peroxide, lauroyl peroxide, di-t-butylperoxy hexahydroterephthalate, t-butylperoxy-2-ethyl hexanoate, 1,1-di-t-butylperoxy-3,3,5-trimethylcyclohexane, etc.; azo compounds such as azobisisobutyronitrile, azobis-4-methoxy-2,4-dimethylvaleronitrile, azobiscyclohexanone-1-carbonitrile, azobenzoyl, etc.; redox catalysts in combination of a water-soluble catalyst such as potassium persulfate, ammonium persulfate, or the like with a reducing agent such as a peroxide or a persulfate salt; organic alkaline compounds such as lithium ethyl, lithium butyl, sodium naphthalene, sodium methoxide, sodium butoxide, etc.

The polymerization initiator is preferably used in an amount of 0.01 to 10% by weight based on the total weight of the monomer or monomers.

It is possible to use a polymerization regulator such as a mercaptan compound e.g., dodecyl mercaptan, octyl mercaptan; thioglycol, carbon tetrabromide, α-methyl styrene dimer, or the like in order to regulate the molecular weight.

The polymerization is carried out at a temperature of preferably at 0° to 200° C., more preferably 50° to 120° C.

In the case of solution polymerization, there can be used as a solvent benzene, toluene, xylenes, methyl ethyl ketone, methyl isobutyl ketone, ethyl acetate, butyl acetate, dichloroethylene, or the like.

In the case of suspension polymerization, the polymerization is carried out in an aqueous medium using a suspending agent and, if necessary, a suspending auxiliary.

As the suspending agent, there can be used water-soluble polymers such as poly(vinyl alcohol), methyl cellulose, polyacrylamide, etc., in an amount of preferably 0.03 to 1% by weight based on the total weight of the monomer or monomers, or hardly-soluble inorganic substances such as potassium phosphate, magnesium pyrophosphate, etc., in an amount of preferably 0.05 to 0.5% by weight based on the total weight of the monomer or monomers.

As the suspending auxiliary, there can be used anionic surface active agents such as sodium dodecylbenzenesulfonate, etc. When a hardly-soluble inorganic substance is used as a suspending agent, co-use of the suspending auxiliary is preferable. The suspending auxiliary is preferably used in an amount of 0.001 to 0.02% by weight based on the total weight of the monomer or monomers.

(1) The amount of monomer or monomers used for the polymerization is usually 100 to 5% by weight of (A) the compound of the formula (I) and 0 to 95% by weight of (B) one or more monomers copolymerizable with the compound of the formula (I).

In the case of the above-mentioned proportion of the monomer or monomers, the polymers are excellent in transparency, heat resistance, and low moisture absorption.

(2) When the proportion of an N-substituted maleimide in the copolymerizable unsaturated monomers becomes larger, the heat resistance is improved but the moldability is easily lowered. Therefore, in order to prevent such a disadvantage, the following monomer proportions are preferable:

| | | |
|---|---|---|
| (A) | The compound of the formula (I) | 100–5% by weight |
| (B-1) | N-Substituted maleimide(s) | 0–50% by weight |
| (B-2) | Other copolymerizable unsaturated monomer(s) | 0–95% by weight |

the total being 100% by weight.

(3) In order to produce polymers suitable for molding materials, it is preferable to make the glass transition point (Tg) not too low. For such a purpose, the following monomer proportions are preferable:

| | | |
|---|---|---|
| (A) | The compound of the formula (I) | 100–5% by weight |
| (B-1) | N-Substituted maleimide(s) | 0–50% by weight |
| (B-2-1) | Unsaturated monomer(s) (Tg ≦ 50° C.), i.e., having a Tg of 50° C. or less when measured as to homopolymer thereof | 0–50% by weight |
| (B-2-2) | Other copolymerizable unsaturated monomer(s) | 0–95% by weight |

the total being 100% by weight.

As the unsaturated monomer(s) (Tg≦50° C.) [(B-2-1)], there can preferably be used ethyl acrylate, propyl acrylate, butyl acrylate, hexyl acrylate, 2-ethylhexyl acrylate, butyl methacrylate, hexyl methacrylate, or 2-ethylhexyl methacrylate, alone or as a mixture thereof.

(4) In order to produce polymers which are excellent in transparency, heat resistance, moldability, low birefringence and low moisture absorption properties and can be used as materials for various optical elements such as prisms, compensators, optical fibers, optical connectors, optical disks, light emitting diodes, etc., the following monomer proportions are preferable:

| | | |
|---|---|---|
| (A) | The compound of the formula (I) | 100–20% by weight |
| (B-1) | N-substituted maleimide(s) | 0–30% by weight |
| (B-2-1) | Unsaturated monomer(s) (Tg ≦ 50° C.) | 0–30% by weight |
| (B-2-2) | Other copolymerizable unsaturated monomer(s) | 0–80% by weight |

the total being 100% by weight.

(5) In order to produce polymers satisfying all the above-mentioned properties with higher levels, the following monomer proportions are preferable:

| | | |
|---|---|---|
| (A) | The compound of the formula (I) | 100–50% by weight |
| (B-1) | N-substituted maleimide(s) | 0–30% by weight |
| (B-2-1) | Unsaturated monomer(s) (Tg ≦ 50° C.) | 0–30% by weight |
| (B-2-2) | Other copolymerizable unsaturated monomer(s) | 0–50% by weight |

the total being 100% by weight.

As the unsaturated monomer(s) (Tg≦50° C.) [(B-2-1)], it is preferable to use butyl acrylate, ethyl acrylate or cyclohexyl acrylate.

As the other copolymerizable unsaturated monomer(s) [(B-2-2)], it is preferable to use methyl methacrylate, styrene, an α-substituted styrene, a nuclear-substituted styrene or acrylonitrile.

The polymers of this invention can be used as transparent resins for molding, as materials for optical elements such as optical disks, optical fibers, optical connectors, optical guides, and as expandable thermoplastic resin particles.

The above-mentioned polymers are novel. Among the above-mentioned polymers, preferable ones are those having the following repeating units in their molecules:

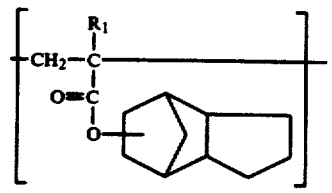

(II)

wherein $R_1$ is hydrogen or a methyl group, in an amount of 100 to 3 mole %, (III)

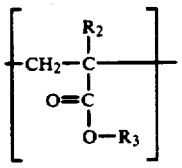

wherein $R_2$ is hydrogen or a methyl group; and $R_3$ is an alkyl group having 1 to 22 carbon atoms, preferably 1 to 8 carbon atoms from the viewpoint of impact strength or preferably 9 to 22 carbon atoms from the viewpoint of flexural strength and flow properties of the polymer, a cycloalkyl group having 5 to 22 carbon atoms, or an aromatic group having 6 to 14 carbon atoms, said aromatic group may be substituted with one or more alkyl groups, etc., in an amount of 0 to 97 mole %, and (IV)

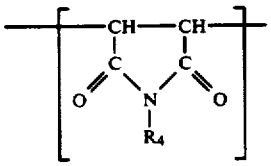

wherein $R_4$ is an alkyl group having 1 to 6 carbon atoms or a cycloalkyl group having 5 to 22 carbon atoms, in an amount of 0 to 30 mole %.

The repeating unit of the formula (II) is derived from the compound of the formula (I).

The repeating unit of the formula (III) is derived from an alkyl methacrylate such as methyl methacrylate, ethyl methacrylate, i-propyl methacrylate, n-butyl methacrylate, t-butyl methacrylate, hexyl methacrylate, or 2-ethylhexyl methacrylate as preferable example; a cycloalkyl methacrylate such as cyclohexyl methacrylate as preferable example; an aromatic methacrylic acid ester such as plenyl methacrylate, or benzyl methacrylate as preferable example; an alkyl acrylate such as methyl acrylate, ethyl acrylate, n-butyl acrylate, t-butyl acrylate, hexyl acrylate, or 2-ethylhexyl acrylate as preferable example; a cycloalkyl acrylate such as cyclohexyl acrylate as preferable example; an aromatic acrylic acid ester such as phenyl acrylate or benzyl acrylate as preferable example.

Considering for preventing the lowering in low moisture absorption properties, it is preferable to use a monomer having a relatively large carbon atoms at a side chain such as butyl methacrylate, hexyl methacrylate, 2-ethylhexyl methacrylate, cyclohexyl methacrylate, phenyl methacrylate, benzyl methacrylate, butyl acrylate, hexyl acrylate, 2-ethylhexyl acrylate, cyclohexyl acrylate, phenyl acrylate or benzyl acrylate.

The repeating unit of the formula (IV) is derived from an N-substituted maleimide such as an N-alkylmaleimide, e.g., N-methylmaleimide, N-ethylmaleimide, N-propylmaleimide, or N-butylmaleimide as preferable example; or an N-cycloalkylmaleimide, e.g., N-cyclohexylmaleimide as preferable example.

More concretely, the preferable polymers of this invention include:

a homopolymer having a repeating unit (II), a copolymer having a repeating unit (II) and a repeating unit (II) (different in $R_1$), a copolymer having repeating units (II) and (III), a copolymer having repeating units (II) and (IV), and a copolymer having repeating units (II), (III) and (IV).

In the copolymer having the repeating units (II), and (III) and/or (IV), when the repeating unit (II) is less than 3 mole %, the heat resistance and the low moisture absorption properties become insufficient.

In the copolymer having the repeating unit (II) (3 mole % or more) and the repeating unit (III) (97 mole % or less, mechanical properties of the copolymer can be improved by the incorporation of the repeating unit (III) while maintaining good transparency. But when the amount of the repeating unit (III) is more than 97 mole % the amount of the repeating unit (II) is lowered undersirably to lower the effects due to the repeating unit (II), particularly to lower the heat resistance and the resistance to moisture absorption of the copolymer.

In the copolymer having the repeating unit (II) (70 mole % or more) and the repeating unit (IV) (30 mole % or less), the heat resistance of the copolymer can be improved by the incorporation of the repeating unit (IV). But when the amount of the repeating unit (IV) is more than 30 mole %, the transparency and the resistance to moisture absorption of the copolymer are undesirably lowered.

In the copolymer having the repeating unit (II) (10 mole % or more), the repeating unit (III) (90 mole % or less) and the repeating unit (IV) (30 mole % or less), the total being 100 mole %, when the repeating unit (II) is less than 10 mole %, when the repeating unit (II) is less than 10 mole % and the repeating unit (III) is more than 90 mole %, the heat resistance and the resistance to moisture absorption of the copolymer easily become insufficient, while the repeating unit (IV) is more than 30 mole %, there is a tendency to lower the transparency and the resistance to moisture absorption.

The above-mentioned novel homopolymers or copolymers have preferably a weight-average molecular weight of 10,000 to 1,000,000 (converted to polystyrene), which molecular weight is particularly preferable when used as molding materials. Further, in order to maintain particularly excellent resistance to moisture absorption (low moisture absorption properties) of the abovementioned novel homopolymers and copolymers, it is preferable to make the carbon atom ratio in the polymer molecule obtained by the elementary analysis 60% by weight or more.

The polymers of this invention can be used as transparent resins for molding, as materials for optical elements such as optical disks, optical fibers, optical connectors, optical guides, and as expandable thermoplastic resin particles.

The polymer may take any form such as a random copolymer, alternating copolymer, block copolymer or polymer blend so long as the transparency is not damaged.

When the polymer is practically used for optical purposes, it may be mixed with one or more antioxidants of conventionally used phenolic compounds, phosphite compounds, and thioether compounds, mold release agents of conventionally used aliphatic alcohols, fatty acid esters, phthalic acid esters, triglycerides, fluorine series surface active agents, metal salts of higher fatty acids, and other conventionally used additives such as lubricants, plasticizers, antistatic agents, ultraviolet absorbing agents, fire retardants, inactivating agents for heavy metals, and the like considering prevention of deterioration, thermal stability, moldability, processability and the like.

The polymer of this invention can be shaped into desired articles by a conventional molding method such as an injection molding method, a compression molding method, a micro-mold method, a floating mold method, a rolling method, a casting method, or the like. In the case of casting method, a partially polymerized material may be casted in a mold, wherein the polymerization is completed to give the desired shaped article which is also the polymer of this invention.

Among the polymers of this invention, more suitable for materials for optical elements are those having a saturated water absorption rate of 1.8% or less preferably 1.2% or less, more preferably 0.6% or less, an Abbe number of 45 ore more, preferably 50 or more, more preferably 55 or more, and a glass transition point of 100° C. or higher, preferably 120° C. or higher.

The optical dispersion is indicated by an Abbe number. The larger the Abbe number becomes, the better. The low moisture absorption properties can be indicated by the saturated water absorption rate, the value of which becomes smaller, the better. The heat resistance is indicated by the glass transition point, the value of which becomes larger, the better. In order to make these properties of the polymers in the above-mentioned ranges, the amounts of the compound of the formula (I) and monomers copolymerizable therewith together with their kinds are properly selected as mentioned ranges, the amounts of the compound of the formula (I) and monomers copolymerizable therewith together with their kinds are properly selected as mentioned previously. Further, since the compound of the formula (I) does not contain a double bond except for in the portion to be polymerized, when a monomer having a double bond only in the portion to be polymerized is used as the copolymerizable unsaturated monomer, the resulting polymer is excellent in resistance to light. In addition, when a monomer having no aromatic ring is used as the copolymerizable unsaturated monomer, the resulting polymer is excellent in birefringence.

There is no particular limit to the molecular weight of the polymers, but considering the heat resistance and mechanical properties, the weight-average molecular weight (converted to polystyrene) of 10,000 to 1,000,000 is preferable particularly when used as a molding material.

In order to maintain particularly excellent resistance to moisture absorption (low moisture absorption properties) of the materials for optical elements, it is preferable to make the carbon atom ratio in the polymer molecule obtained by the elementary analysis 60% by weight or more.

The optical resin material, if necessary as a mixture with the above-mentioned additives or a blend with the above-mentioned additives, can be shaped into various optical elements by the above-mentioned molding or shaping methods.

The optical elements include lenses for general cameras, video cameras, telescopes, laser beams, projectors, ophthalmologic instruments, collecting sunbeams, optical fibers, etc., prisms such as a penta prism, light transmitting elements such as optical fibers, optical guides, etc., disks such as optical video disks, audio disks, document-file disks, memory disks, etc., these exhibiting their functions by transmitting light.

The shaped articles can be improved in resistance to moisture, optical properties, resistance to chemicals, wear resistance, and anti-fogging properties by coating the surfaces thereof with $MgF_2$, $SiO_2$ or the like inorganic compound by a vacuum metallizing method, a sputtering method, an ion plating method or the like, or hard-coating the surfaces thereof with an organic silicon compound such as a silane coupling agent, a vinyl monomer, a melamine resin, an epoxy resin, a fluorine resin, a silicone resin, or the like.

This invention is illustrated by way of the following Examples, in which all parts and percents are by weight unless otherwise specified.

SYNTHESIS EXAMPLE 1

In a 10-liter separable flask equipped with a stirrer, a condenser and a water separator, 2700 g of tricyclo[5.2.1.0$^{2,6}$]deca-8-ol (white crystal powder), 1896 g of methacrylic acid, 2700 g of toluence, 135 g of p-toluenesulfonic acid and 0.64 g of hydroquinone monomethyl ether were placed and reacted at 115° C. with stirring for 2 hours while removing the water generated out of the system. Then, the reaction solution was taken out of the flask and then subjected to distillation to remove low boiling point components. Then, 15 g of hydroquinone monomethyl ether was added to the resulting solution and distillation under reduced pressure was conducted to isolate a distillate having a boiling point of 90°-95° C. under 0.7 mmHg. The distillate was washed with an aqueous solution of 2% KOH, washed with water, dehydrated and filtered to give tricyclo[5.2.10$^{2,6}$]deca-8-yl methacrylate (hereinafter referred to as "TCD-MA") in 80% yield and 99.5% purity.

SYNTHESIS EXAMPLE 2

In a 10-liter separable flask equipped with a stirrer, a condenser and a water separator, 2700 g of tricyclo[5.2.1.0$^{2,6}$]deca-8-ol, 1588 g of acrylic acid, 2700 g of toluene, 135 g of p-toluenesulfonic acid, and 0.64 g of hydroquinone monomethyl ether were placed and reacted at 115° C. with stirring for 2 hours while removing the water generated out of the system. Then, the reaction solution was taken out of the flask and then subjected to distillation to remove low boiling point components. Then, 15 g of hydroquinone monomethyl ether was added to the resulting solution and distillation under reduced pressure was conducted to isolate a distillate having a boiling point of 87°-92° C. under 0.7 mmHg. The distillate was washed with an aqueous solution of 2% KOH, washed with water, dehydrated and filtered to give tricyclo[5.2.1.0$^{2,6}$]deca-8-yl acrylate (hereinafter referred to as "TCD-AA") in 70% yield and 99.5% purity.

| | |
|---|---|
| Component (i) | |
| TCD-MA | 100 parts |
| Lauroyl peroxide | 0.4 |
| m-Dodecyl mercaptan | 0.2 |
| Component (ii) | |
| Demineralized water | 270 |
| Potassium triphosphate (10% aqueous suspension) | 30 |
| Sodium dodecylbenzenesulfonate | 0.015 |
| Sodium sulfate | 0.3 |

The components (i) and (ii) were placed in a reactor and polymerization was conducted at 60° C. for 2 hours and 98° C. for 4 hours with stirring under nitrogen atmosphere. The resulting polymer particles were filtered, washed with an acid, washed with water, repeating the washings several times, dried and molded into pellets by using an extruder to evaluate properties. The results are shown in Table 1.

Properties were evaluated as follows:

Glass transition point (Tg) . . . Measured by using a differential scanning calorimeter (DSC) and indicated by a peak temperature (°C.) at an endothermic time in the glass transition Light transmittance (%) . . . ASTM D1003

Moisture absorption rate (%) . . . ASTM D570

Impact strength . . . A molded plate was fallen from a height of 1 m and the state of the plate was evaluated. (o . . . good, Δ . . . slightly good)

EXAMPLES 2 to 5

The process of Example 1 was repeated except for using monomer or monomers as listed in Table 1. Properties of the resulting polymers were evaluated in the same manner as described in Example 1.

The results are shown in Table 1.

TABLE 1

| | Example No. | | | | | | | | | |
|---|---|---|---|---|---|---|---|---|---|---|
| | Example 1 | Example 2 | Example 3-1 | Example 3-2 | Example 4-1 | Example 4-2 | Example 5-1 | Example 5-2 | Reference Example 1 (PMMA) | Reference Example 2 (polycarbonate) |
| TCD-MA | 100 | — | 90 | 85 | 90 | 80 | 80 | 70 | | |
| TCD-AA | — | 100 | — | — | — | — | — | — | | |
| n-Butyl acrylate | — | — | 10 | 15 | — | — | — | — | | |
| Ethyl acrylate | — | — | — | — | 10 | 20 | — | — | | |
| Cyclohexyl acrylate | — | — | — | — | — | — | 20 | 30 | | |
| Tg (°C.) | 173 | 103 | 142 | 128 | 148 | 140 | 142 | 133 | 115 | 152 |
| Light transmittance (%) | 91 | 91 | 91 | 91 | 91 | 90 | 90 | 90 | 93 | 88 |
| Moisture absorption (%) | 0.2 | 0.2 | 0.2 | 0.2 | 0.2 | 0.3 | 0.3 | 0.4 | 2.0 | 0.4 |
| Birefringence*1 | o | o | o | o | o | o | o | o | o | x |
| Impact strength*2 | Δ | o | o | o | o | o | Δ | Δ | o | o |
| Melt index (g/10 min) | 1.5 | 3.5 | 2.0 | 2.2 | 2.0 | 2.5 | 2.5 | 2.8 | 2.0 | 2.5 |

Note
*1o good, x bad
*2o good, Δ slightly good
PMMA = poly(methyl methacrylate)

EXAMPLES 6 TO 8

The process of Example 1 was repeated except for using monomers as listed in Table 2. Properties of the resulting polymers were evaluated in the same manner as described in Example 1.

The results are shown in Table 2.

TABLE 2

| | Example No. | | | | | | | |
|---|---|---|---|---|---|---|---|---|
| | Example 6-1 | Example 6-2 | Example 6-3 | Example 7-1 | Example 7-2 | Example 8-1 | Example 8-2 | Reference Example 1 (PMMA) |
| TCD-MA | 80 | 50 | 20 | — | — | 80 | 60 | — |
| TCD-AA | — | — | — | 80 | 50 | — | — | — |
| Methyl methacrylate | 20 | 50 | 80 | 20 | 50 | — | — | 100 |
| Cyclohexyl methacrylate | — | — | — | — | — | 20 | 40 | — |
| Tg (°C.) | 160 | 144 | 123 | 110 | 115 | 156 | 141 | 115 |
| Light transmittance (%) | 91 | 92 | 93 | 91 | 93 | 93 | 93 | 93 |
| Moisture absorption (%) | 0.4 | 1.0 | 1.5 | 0.5 | 1.0 | 0.3 | 0.4 | 2.0 |
| Melt index (g/10 min) | 2.0 | 2.0 | 2.0 | 3.0 | 3.5 | 2.2 | 2.5 | 2.0 |

EXAMPLES 9 AND 10

The process of Example 1 was repeated except for using monomers as listed in Table 3. Properties of the resulting polymers were evaluated in the same manner as described in Example 1.

The results are shown in Table 3.

TABLE 3

| | Example No. | | | | | | |
|---|---|---|---|---|---|---|---|
| | Example 9-1 | Example 9-2 | Example 9-3 | Example 10-1 | Example 10-2 | Reference Example 3 | Reference Example 4 |
| TCD-MA | 70 | 50 | 30 | 50 | 30 | — | — |
| Styrene | 30 | 50 | 70 | 35 | 50 | 100 | 70 |
| Acrylonitrile | — | — | — | 15 | 20 | — | 30 |
| Tg (°C.) | 153 | 140 | 125 | 145 | 128 | 109 | 115 |
| Light transmittance (%) | 90 | 90 | 88 | 88 | 88 | 88 | 88 |
| Melt index | 7.5 | 8.2 | 9.0 | 7.0 | 7.5 | 9.5 | 7.5 |

TABLE 3-continued

| | Example No. | | | | | | |
|---|---|---|---|---|---|---|---|
| | Example 9-1 | Example 9-2 | Example 9-3 | Example 10-1 | Example 10-2 | Reference Example 3 | Reference Example 4 |
| (g/10 min) | | | | | | | |

*The material of Example 9-3 has an Abbe number of 34.*

EXAMPLES 11 TO 15

The process of Example 1 was repeated except for using monomers as listed in Table 4. Properties of the resulting polymers were evaluated in the same manner as described in Example 1.

The results are shown in Table 4.

TABLE 4

| | Example No. | | | | |
|---|---|---|---|---|---|
| | Example 11 | Example 12 | Example 13 | Example 14 | Example 15 |
| TCD-MA | — | — | 50 | 75 | 75 |
| TCD-AA | 90 | 90 | 50 | — | — |
| N-Methylmaleimide | 10 | — | 10 | 10 | — |
| Cyclohexylmaleimide | — | 10 | — | — | 10 |
| n-Butyl acrylate | — | — | — | 15 | 15 |
| Tg (°C.) | 125 | 125 | 150 | 143 | 144 |
| Light transmittance (%) | 91 | 90 | 91 | 90 | 90 |
| Moisture absorption (%) | 0.5 | 0.5 | 0.5 | 0.5 | 0.5 |

EXAMPLE 16

In a 500-ml triangular flask equipped with a threeway stop cock, 200 g of TCD-MA, 0.8 g of lauroyl peroxide and 0.4 g of n-dodecyl mercaptan were placed, and the air in the flask was replaced by nitrogen gas while conducting mixing and dissolving. Then, the flask was dipped in a constant temperature water bath of 60° C. with stirring to conduct the polymerization for 30 minutes under nitrogen stream to give a partially polymerized material. Then the partially polymerized material was cast into a glass cell, subjected to the polymerization at 60° C. for 2 hours and 100° C. for 2 hours to give a transparent sheet-form polymer.

The total light transmittance and water absorption rate of the resulting polymer were measured.

The results are shown in Table 5.

Then, the polymer in an amount of 100 g was dissolved in 200 g of tetrahydrofuran. The resulting solution was poured into 5 liters of methanol with stirring and the precipitated and deposited polymer was filtered, and dried to give a white powdery polymer. The glass transition point and a decomposition beginning point of the resulting polymer were measured and shown in Table 5.

EXAMPLES 17 TO 21

The process of Example 16 was repeated except for using monomers as listed in Table 5. Properties of the resulting polymers were evaluated i the same manner as described in Example 16.

The results are shown in Table 5.

TABLE 5

| | | Example No. | | | | | |
|---|---|---|---|---|---|---|---|
| | | 16 | 17 | 18 | 19 | 20 | 21 |
| Monomer (g) | TCD-MA | 200 | — | 100 | 160 | 120 | — |
| | TCD-AA | — | 200 | 100 | — | — | 180 |
| | Ethyl methacrylate | — | — | — | 40 | — | — |
| | Cyclohexyl methacrylate | — | — | — | — | 80 | — |
| | N-Methyl-maleimide | — | — | — | — | — | 20 |
| Yield of powdery polymer (%) | | 97 | 98 | 98 | 97 | 97 | 99 |
| Tg (°C.) | | 173 | 102 | 141 | 144 | 141 | 125 |
| Decomposition beginning point (°C.) | | 237 | 255 | 245 | 238 | 239 | 265 |
| Light transmittance (%) | | 91 | 91 | 91 | 91 | 91 | 90 |
| Moisture absorption (%) | | 0.2 | 0.2 | 0.2 | 0.3 | 0.3 | 0.5 |

EXAMPLE 22

In a 500-ml triangular flask equipped with a threeway stop cock, 200 g of TCD-MA obtained in Synthesis Example 1, 0.8 g of lauroyl peroxide and 0.4 g of n-dodecyl mercaptan were placed, and the air in the flask was replaced by nitrogen gas while conducting mixing and dissolving. Then the flask was dipped in a constant temperature water bath at 60° C. with stirring to conduct the polymerization for 30 minutes under nitrogen stream to give a partially polymerized material. Then the partially polymerized material was cast into a glass cell, subjected to the polymerization at 60° C. for 2 hours and at 100° C. for 2 hours to give a transparent sheet-form polymer.

The total light transmittance (ASTM D1003) and moisture absorption rate (ASTM D570) of the resulting polymer were measured. The results are shown in Table 9.

Then, the polymer in an amount of 100 g was dissolved in 200 g of tetrahydrofuran. The resulting solution was poured into 5 liters of methanol with stirring and the precipitated and deposited polymer was filtered and dried to give a white powdery polymer. Elementary analysis values, repeating unit ratio (in the main chain), glass transition point, decomposition beginning point, weight-average molecular weight, infrared absorption (IR) spectrum, nuclear magnetic resonance (NMR) spectrum and molecular weight distribution by high-speed liquid chromatography (HLC) analysis were measured as to the resulting polymer and shown in Tables 6 and 8.

EXAMPLES 23 TO 27

The process of Example 22 was repeated except for using monomer of monomers as listed in Table 6 to give transparent sheet-form polymers and white powdery polymers.

Monomer ratios, yields of powdery polymers, IR spectra, NMR spectra, molecular weight (MW) distributions of these polymers are listed in Table 6, elementary analysis values, glass transition points, decomposition beginning points and weight-average molecular weights are listed in Table 8 and total light transmittances and moisture absorption rates are listed in Table 9.

The IR spectra were based on the KBr method.

The molecular weight distribution graphs were obtained by measuring molecular weights by using a HLC analyzer (Hitachi 635 A type, mfd. by Hitachi, Ltd.) (HLC measurement), integrating the results every 0.5 minute of elution time by using an integrating plotter (Chromato Graph Processor 8000 A type, mfd. by System Instruments Co.), and plotting the thus obtained results. The weight fraction was taken along the ordinate axis and the molecular weight (M) in logarithm value (log M) was taken along the abscissa axis. The molecular weight was calculated by converting to that of polystyrene.

[Explanation on Drawings]

EXAMPLE 22

The IR spectrum chart of FIG. 1 shows an absorption at near 1730 $cm^{-1}$ due to the carbonyl group of polymethacrylic ester.

Figure 2:
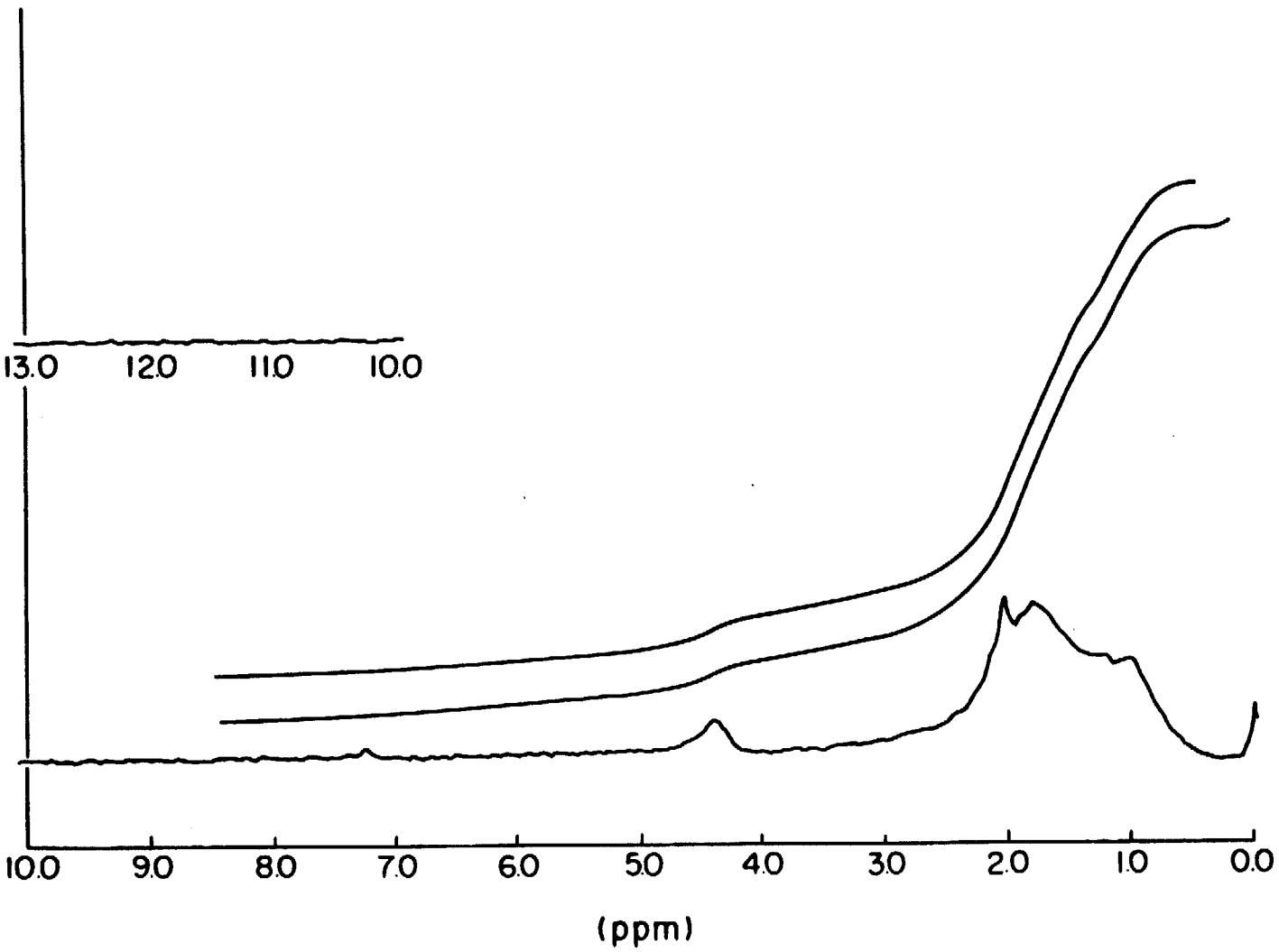
FIGS. 2, 5, 8, 11, 14, 17, 20, 23, 26, 29, 32, 35, 38, 41, 44, 47 and 50 are nuclear magnetic resonance spectra of the polymers obtained in this invention.

The NMR spectrum chart of FIG. 2 shows peaks near 1 to 2.1 ppm due to the methyl group, the methylene group and the tricyclo[5.2.1.$0^{2,6}$]deca-8-yl group in the main chain, and a small peak at near 4.4 ppm due to the proton O—CH< in the tricyclo[5.1.2.$0^{2,6}$]deca-8-yl group neighboring to the carbonyl group of methacrylic ester.

(2) EXAMPLE 25

Figure 11:
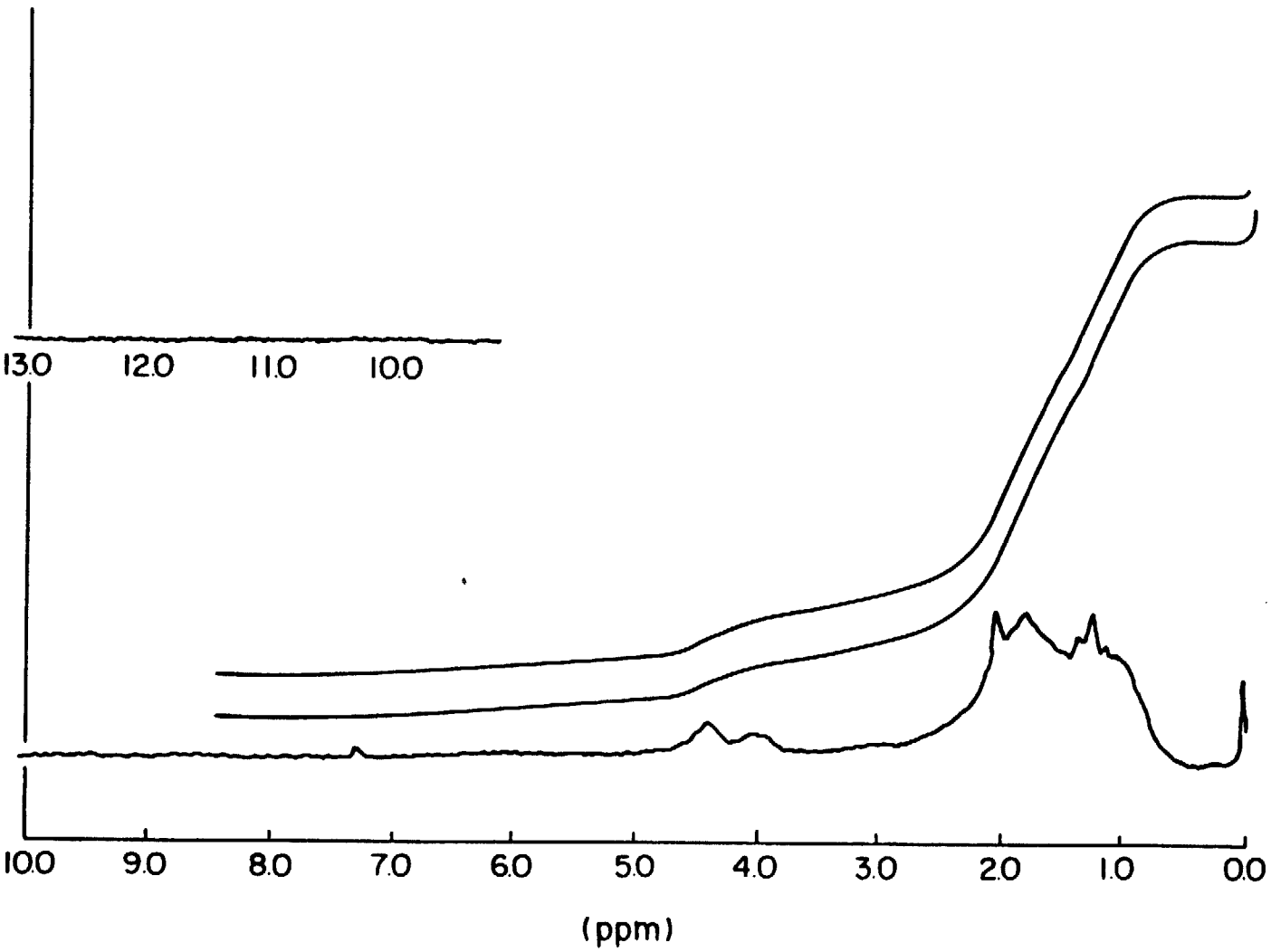

The NMR spectrum chart of FIG. 11 shows a peak at near 1.2 ppm due to the proton

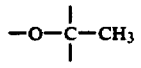

in the ethyl group neighboring to the carbonyl group and a small peak at near 4 ppm due to the proton —O—$CH_2$—.

(3) EXAMPLE 26

Figure 14:
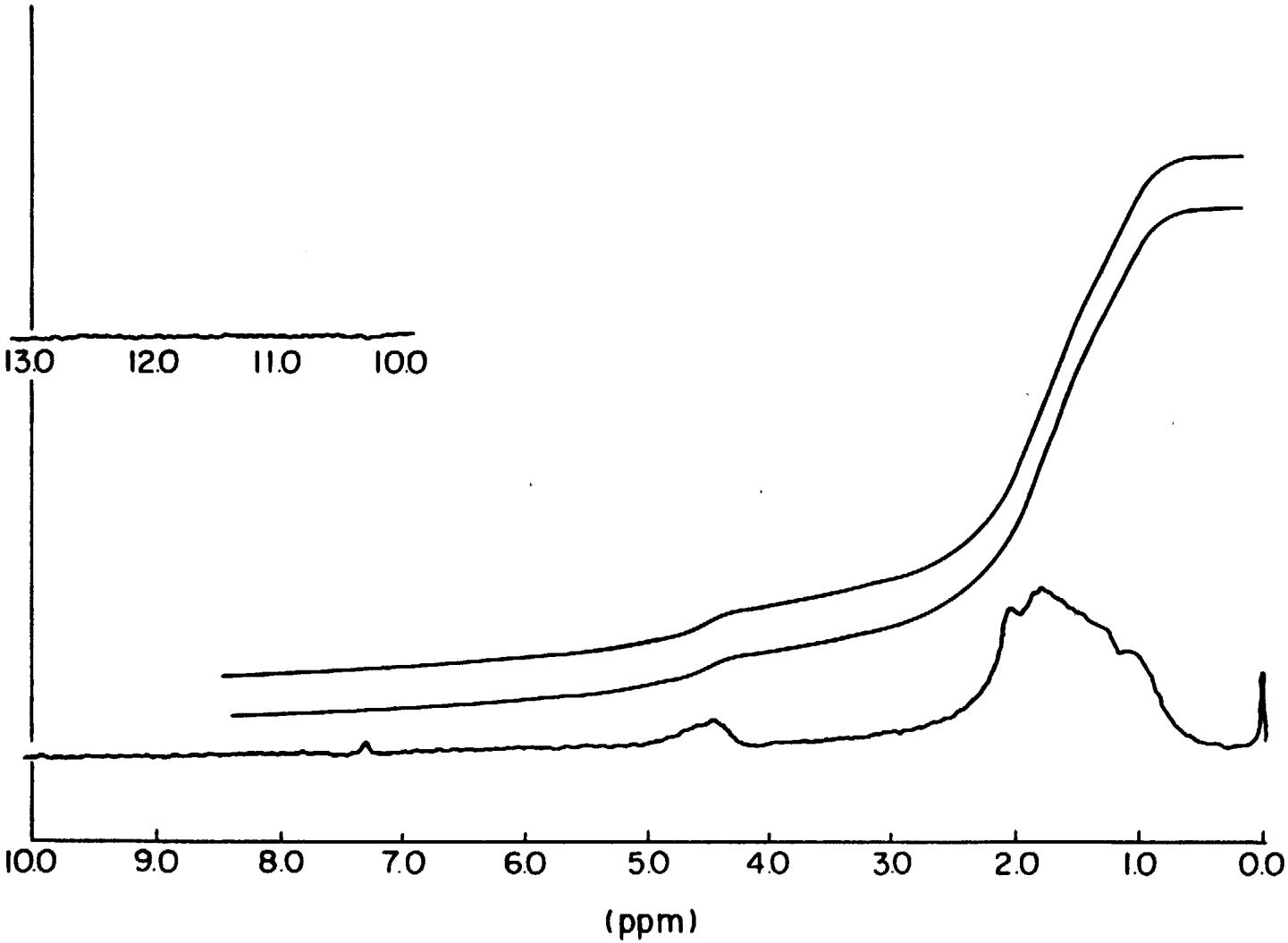

The NMR spectrum chart of FIG. 14 shows small overlapped peaks at near 4.7 ppm due to the proton

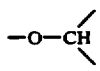

in the cyclohexyl group neighboring to the carbonyl group.

(4) EXAMPLE 27

Figure 16:
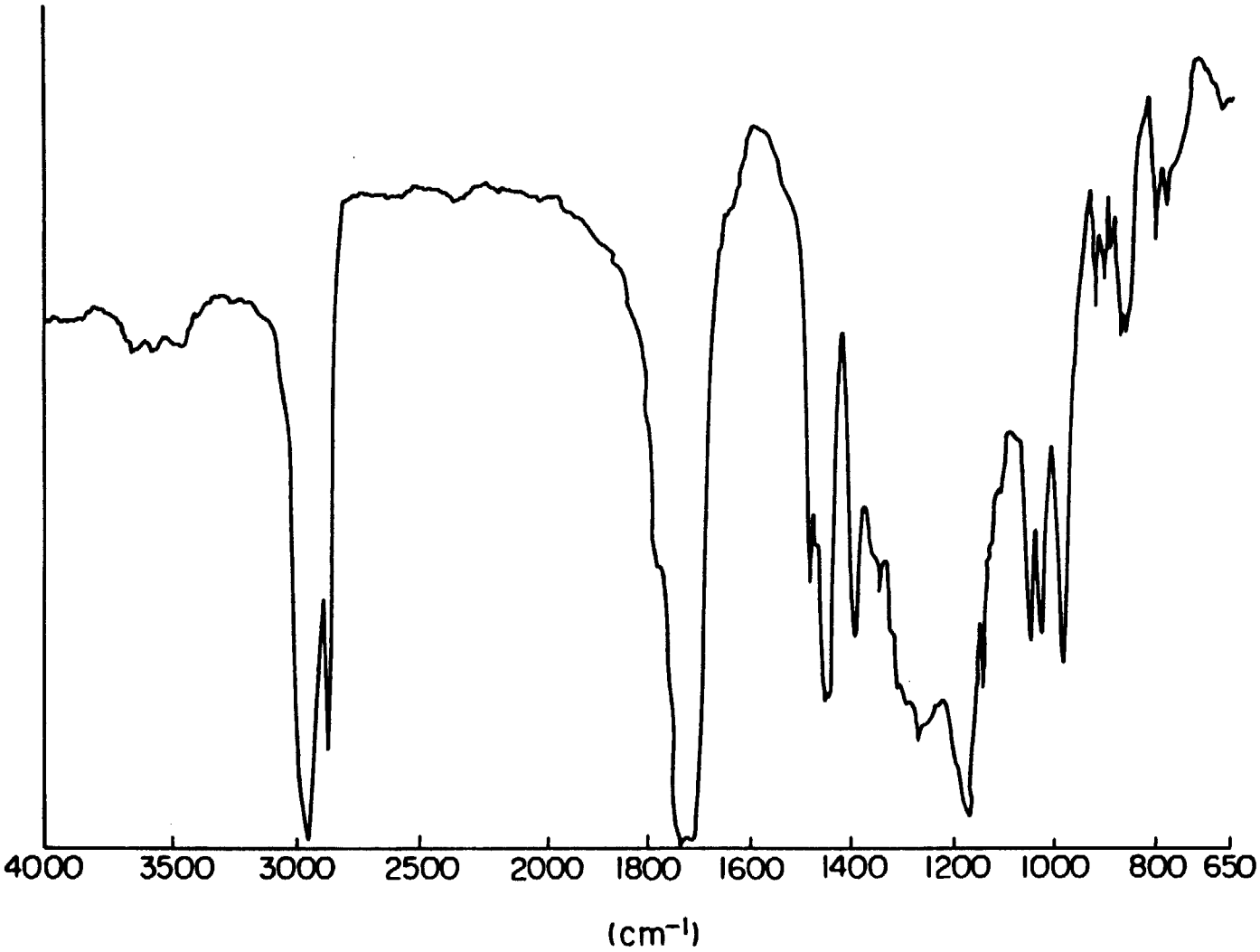

The IR spectrum chart of FIG. 16 shows absorptions at near 1705 $cm^{-1}$ and 1780 $cm^{-1}$ due to the imide group.

Figure 17:
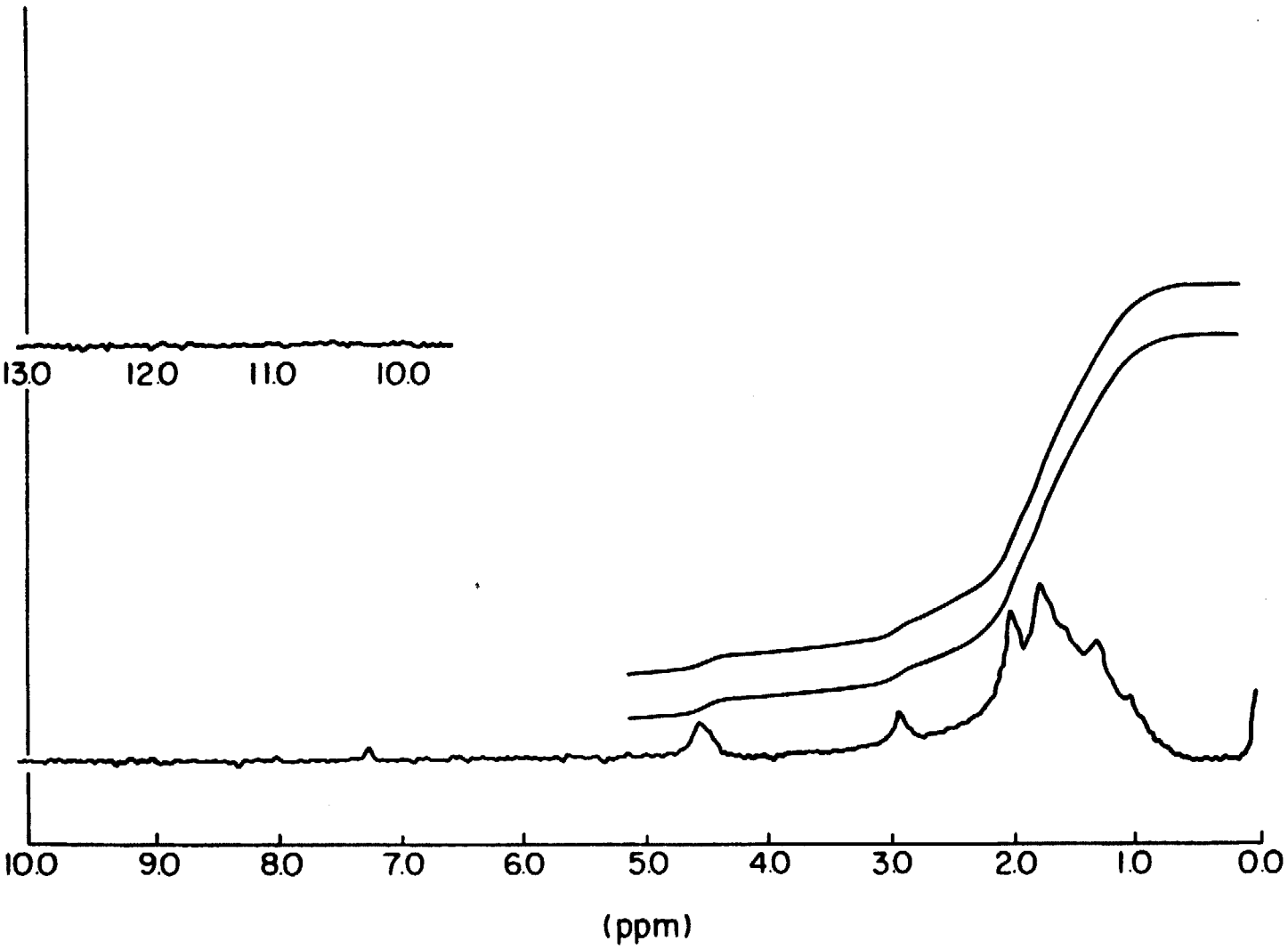

The NMR spectrum chart of FIG. 17 shows a small peak at near 2.9 ppm due to the proton of N-methyl group neighboring to the imide group.

TABLE 6

Figure 3:
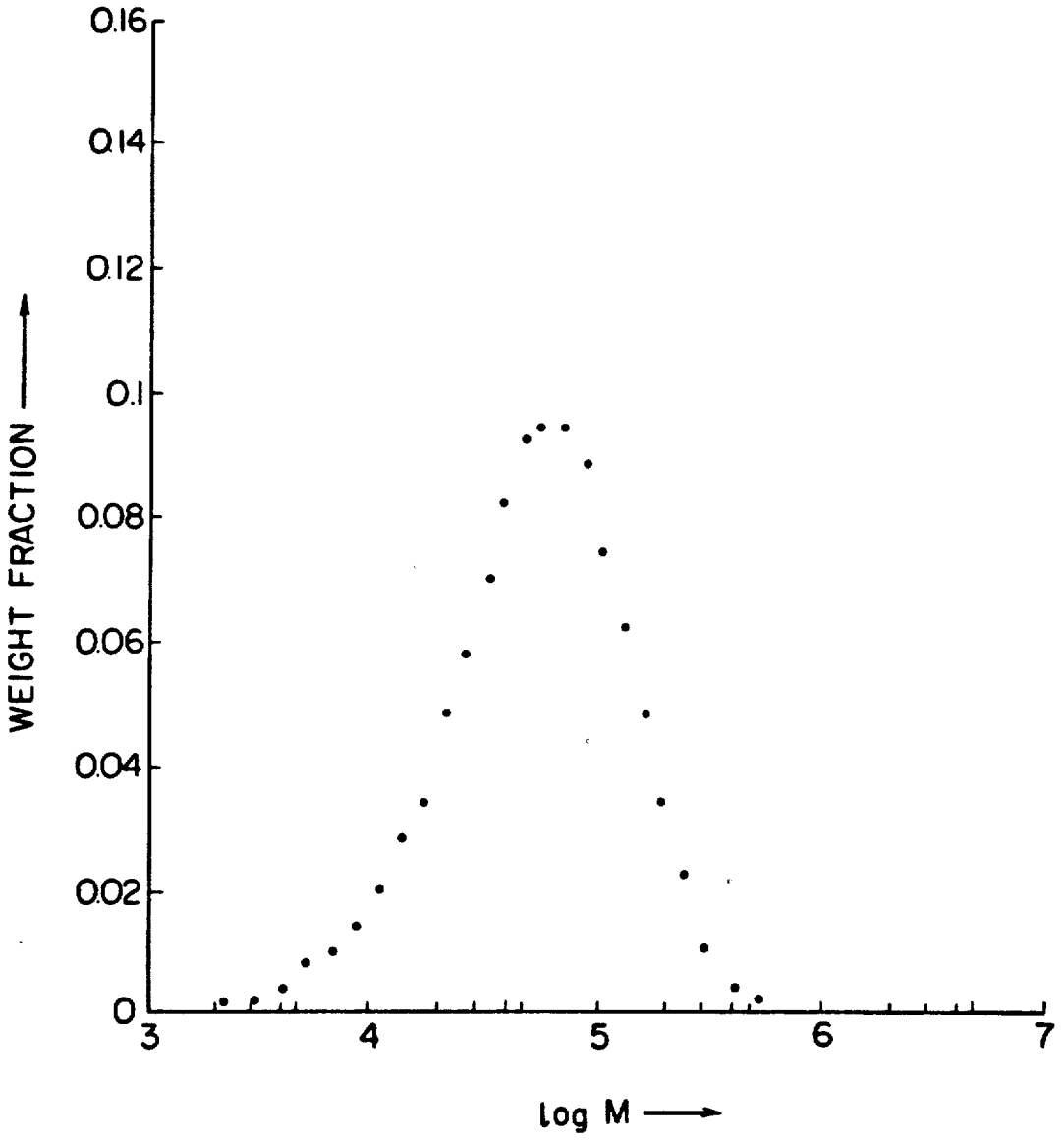
FIGS. 3, 6, 9, 12, 15, 18, 21, 24, 27, 30, 33, 36, 39, 42, 45, 48 and 51 are graphs showing molecular weight distributions of the polymers obtained in this invention.
Figure 4:
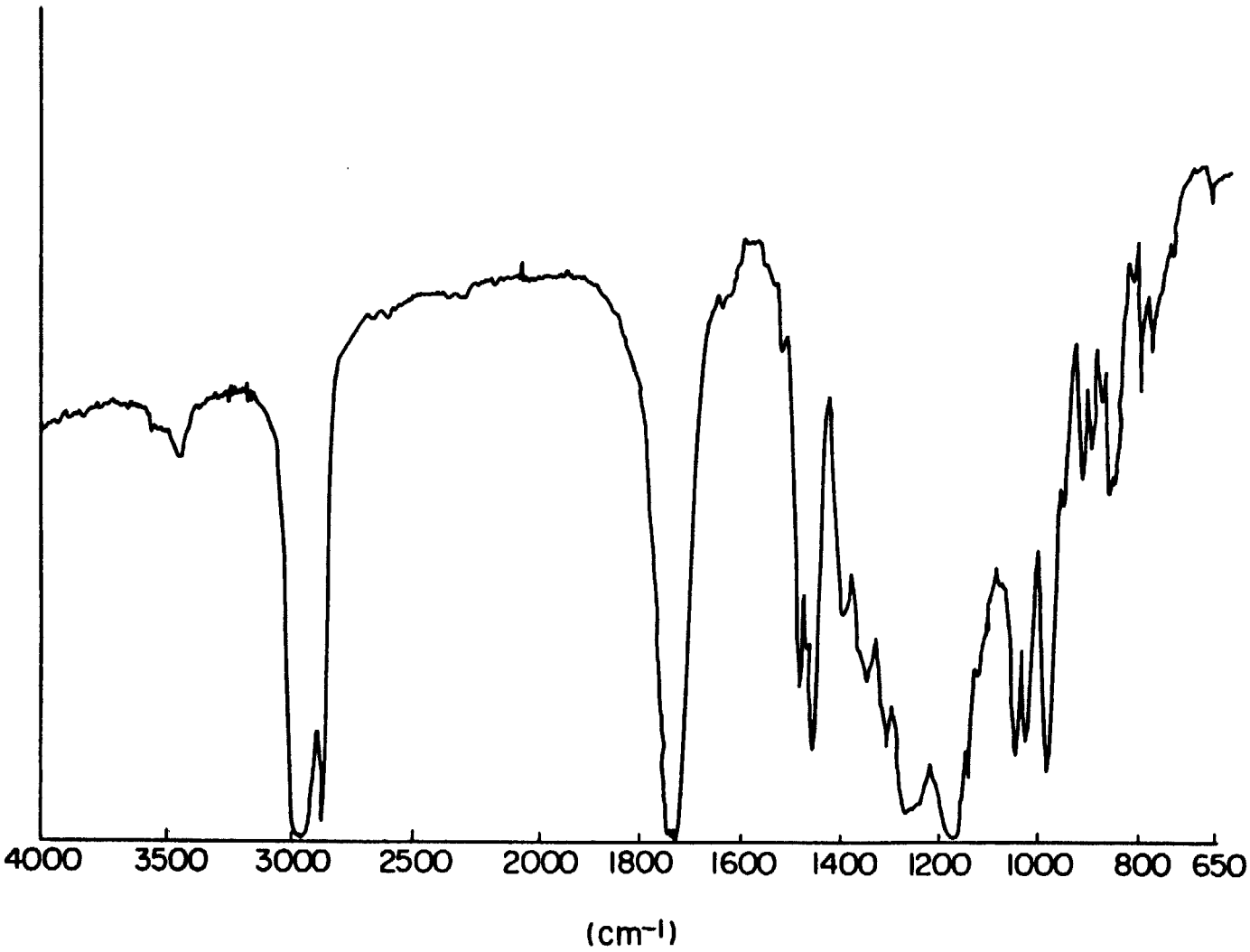
Figure 5:
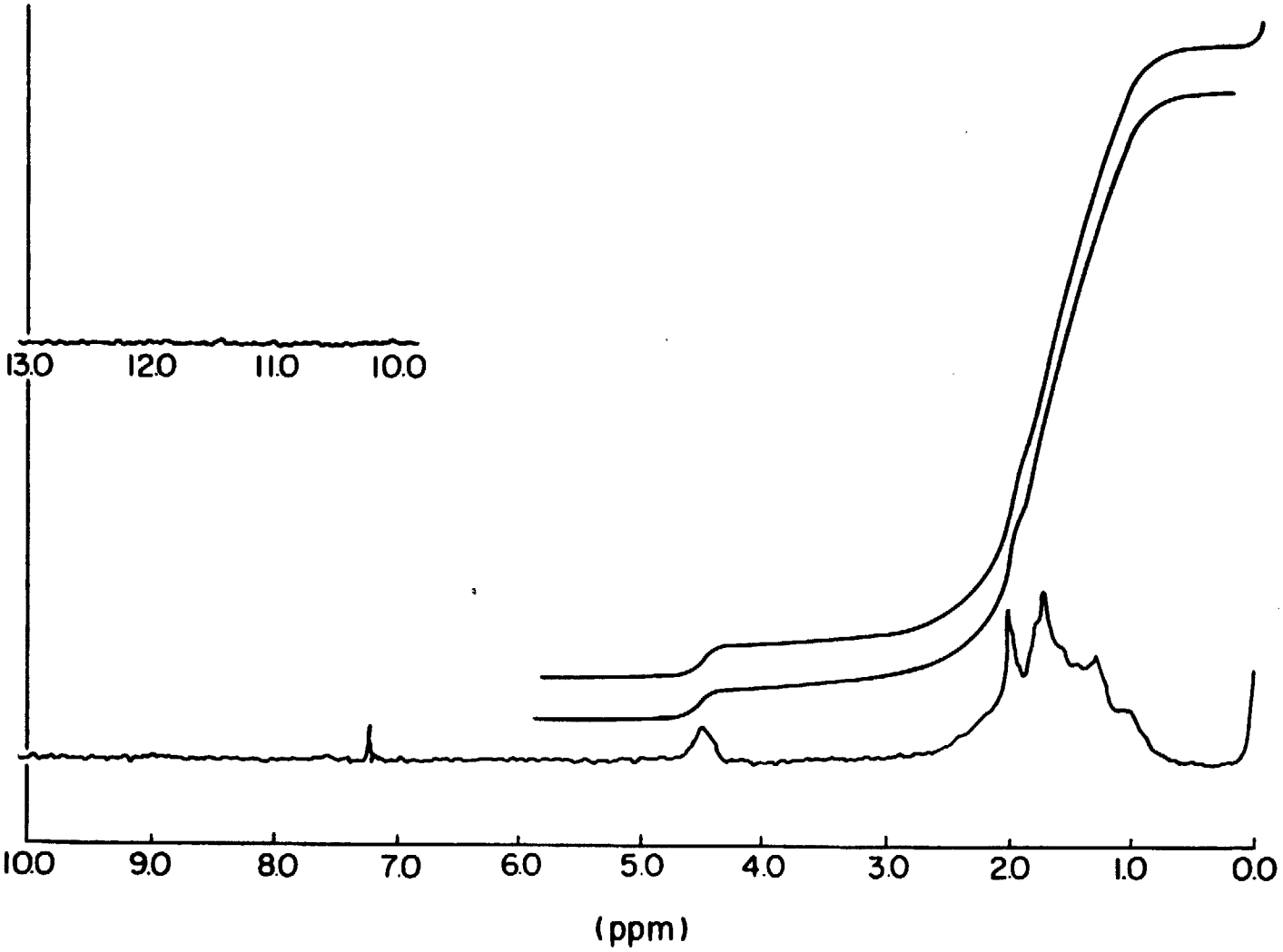
Figure 6:
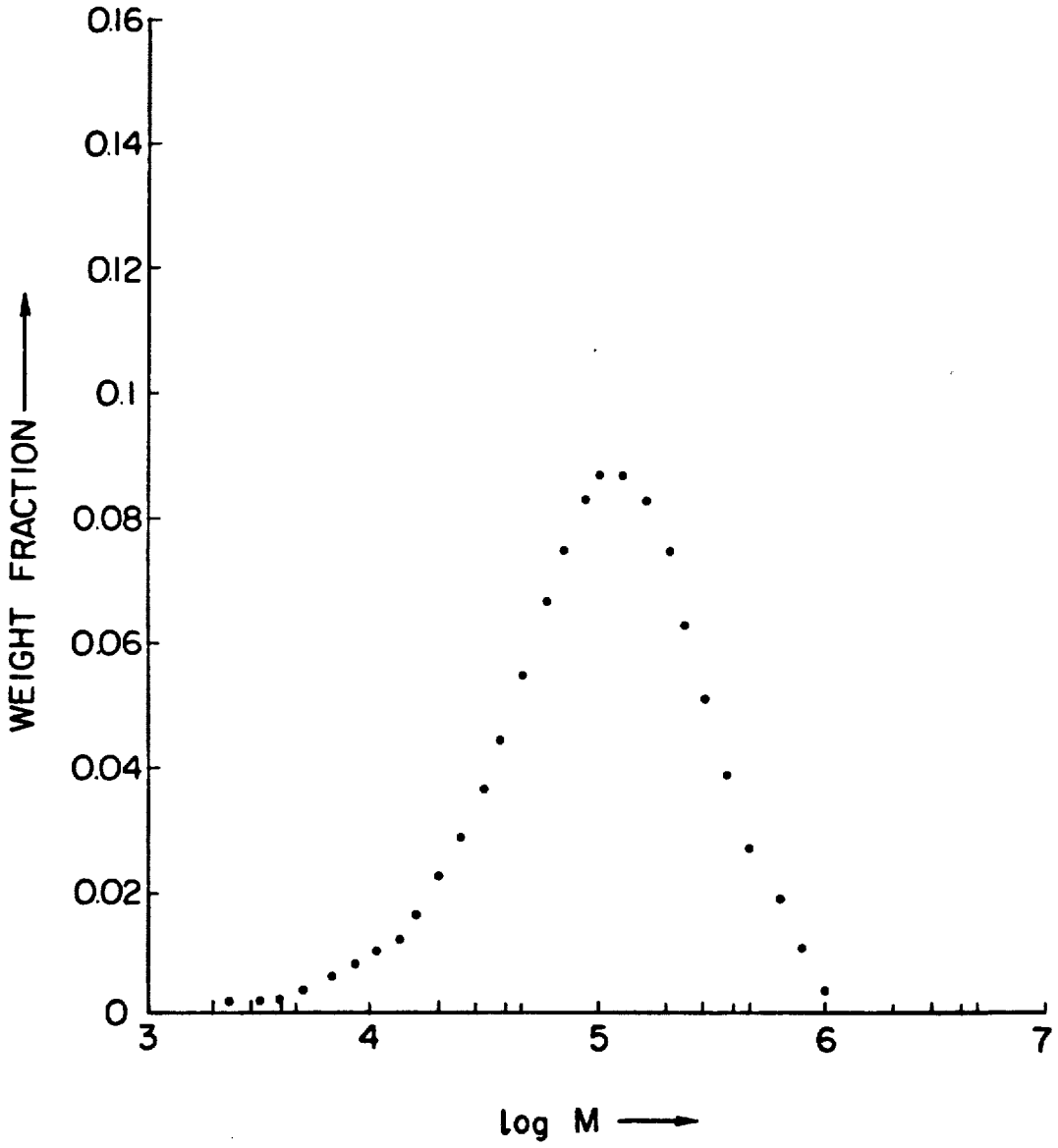
Figure 7:
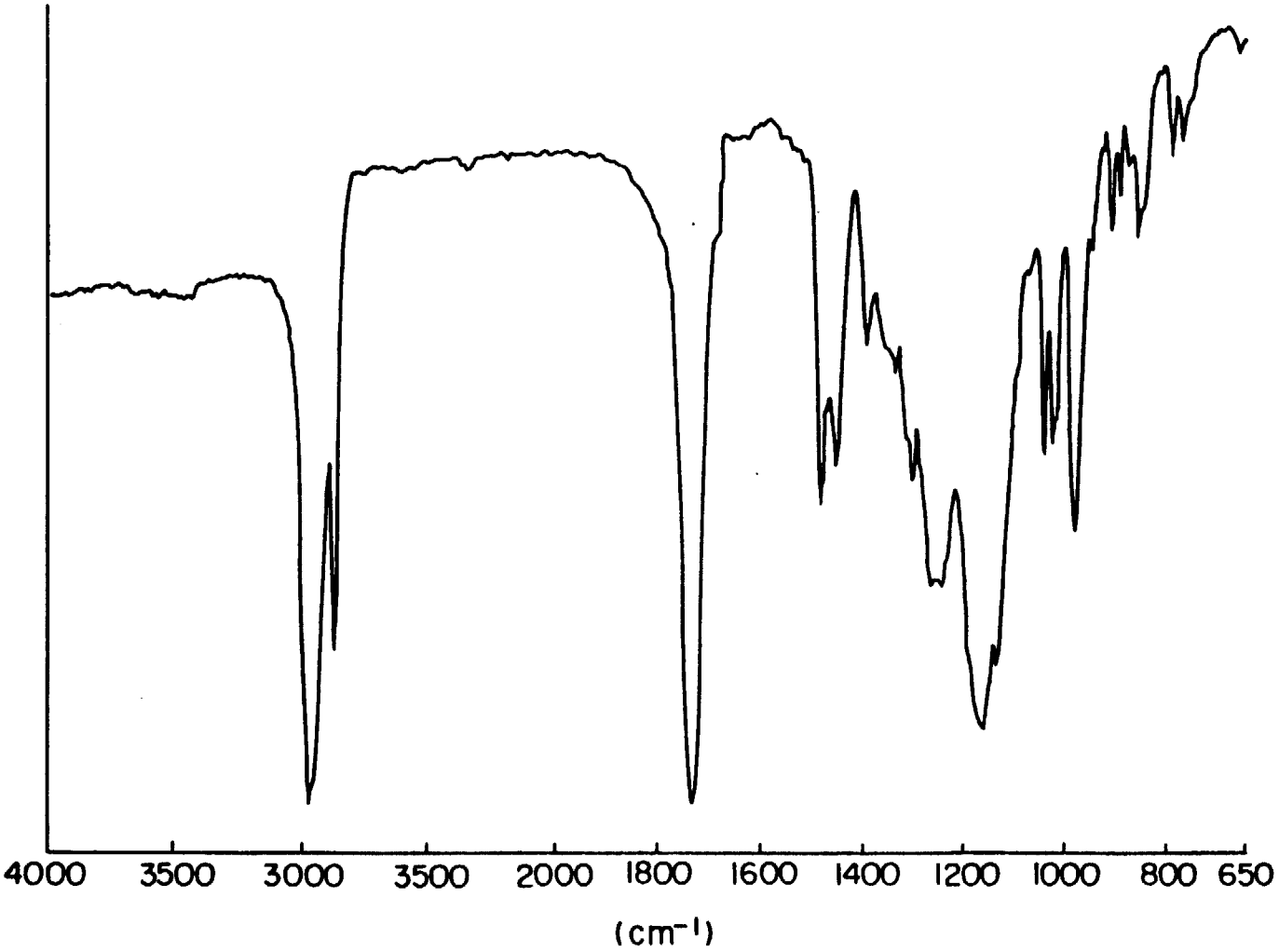
Figure 8:
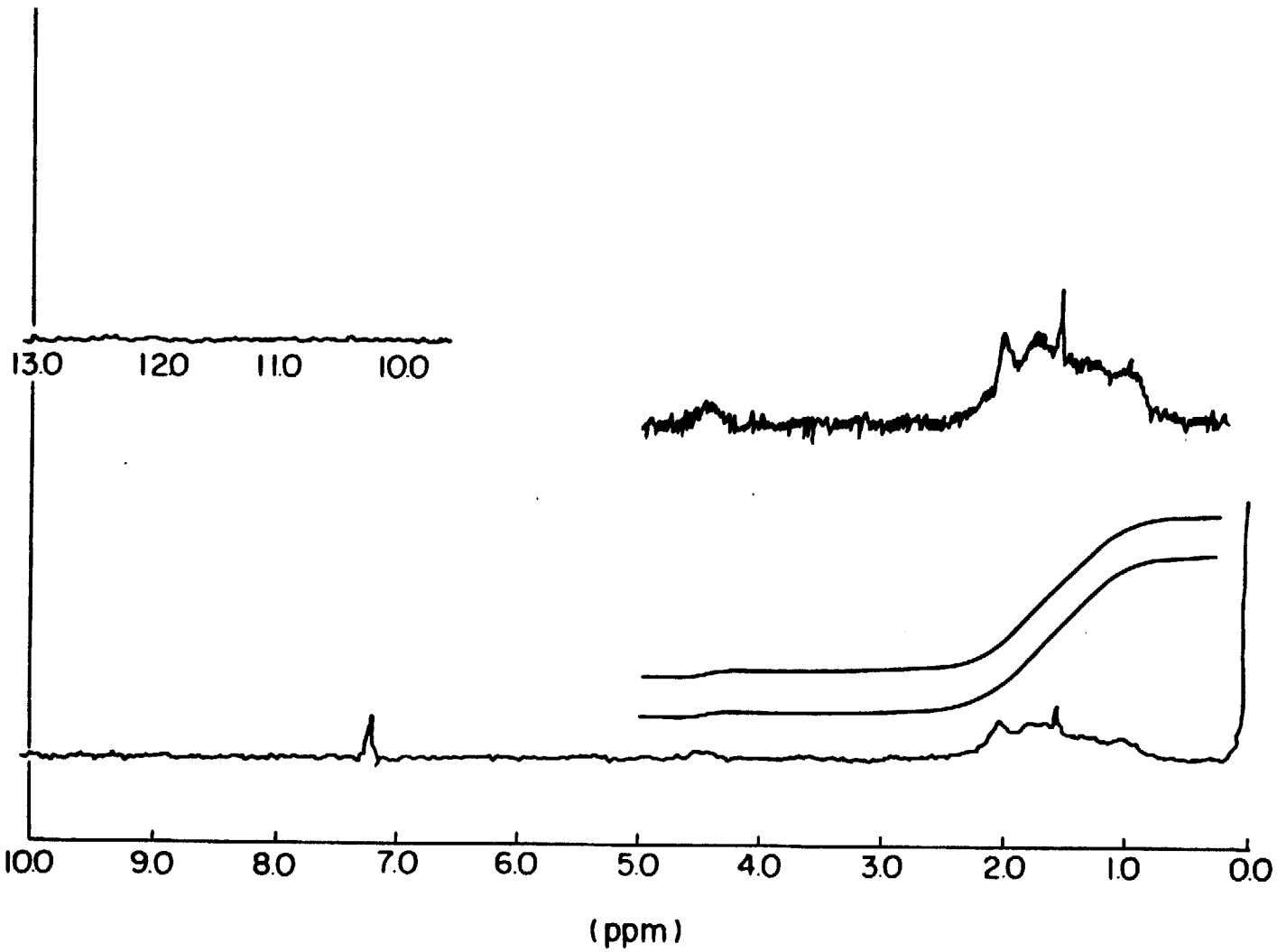
Figure 9:
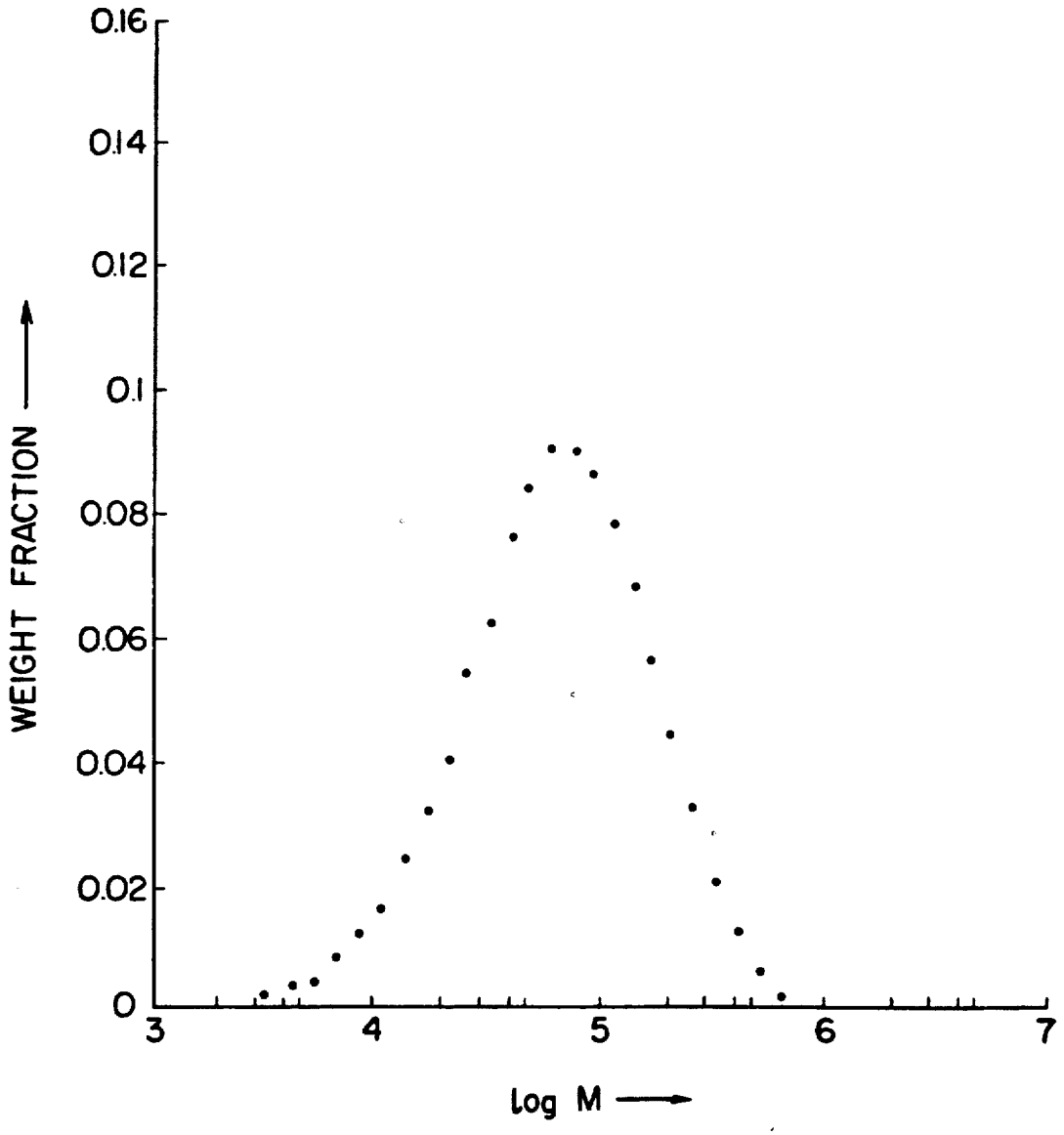
Figure 10:
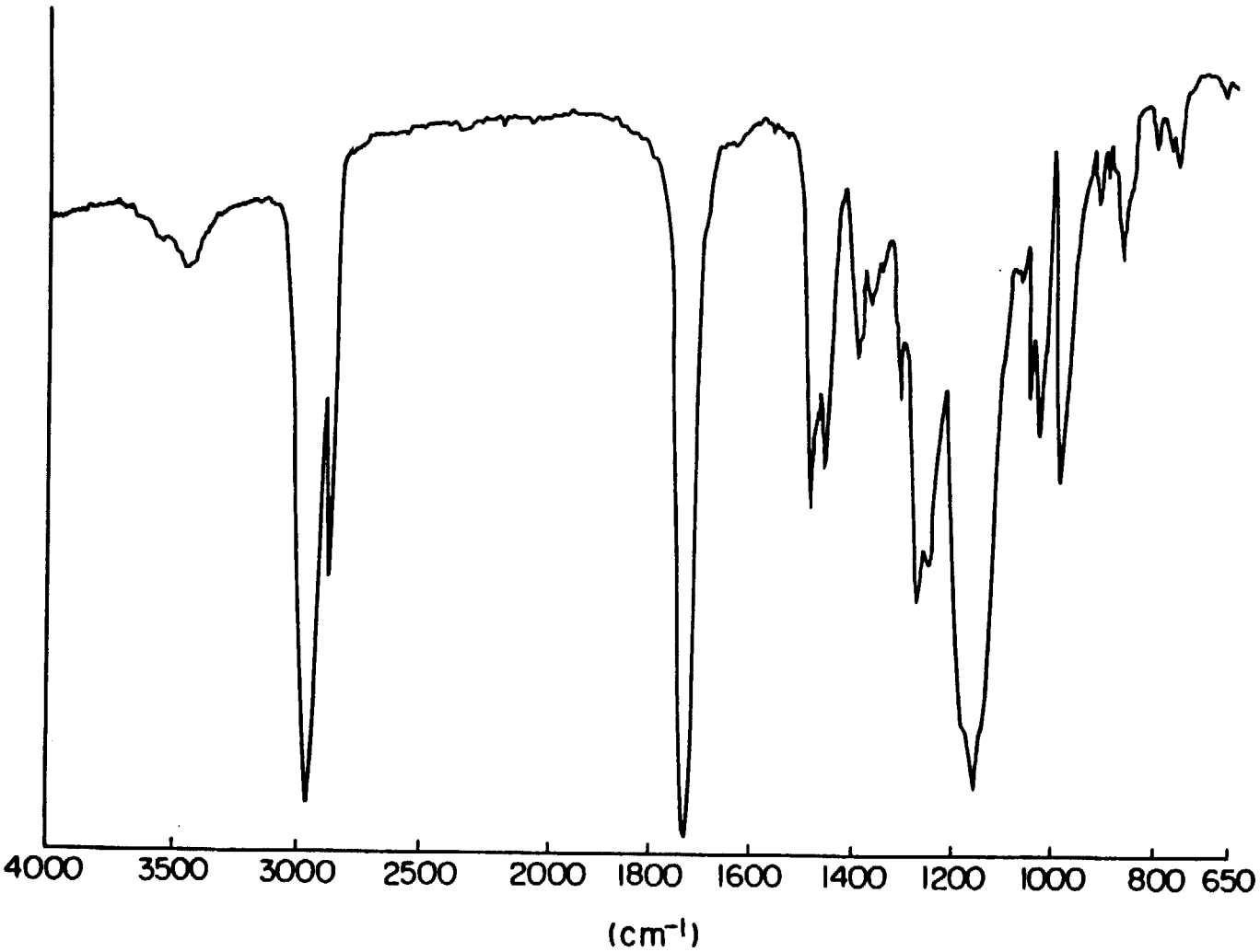
Figure 12:
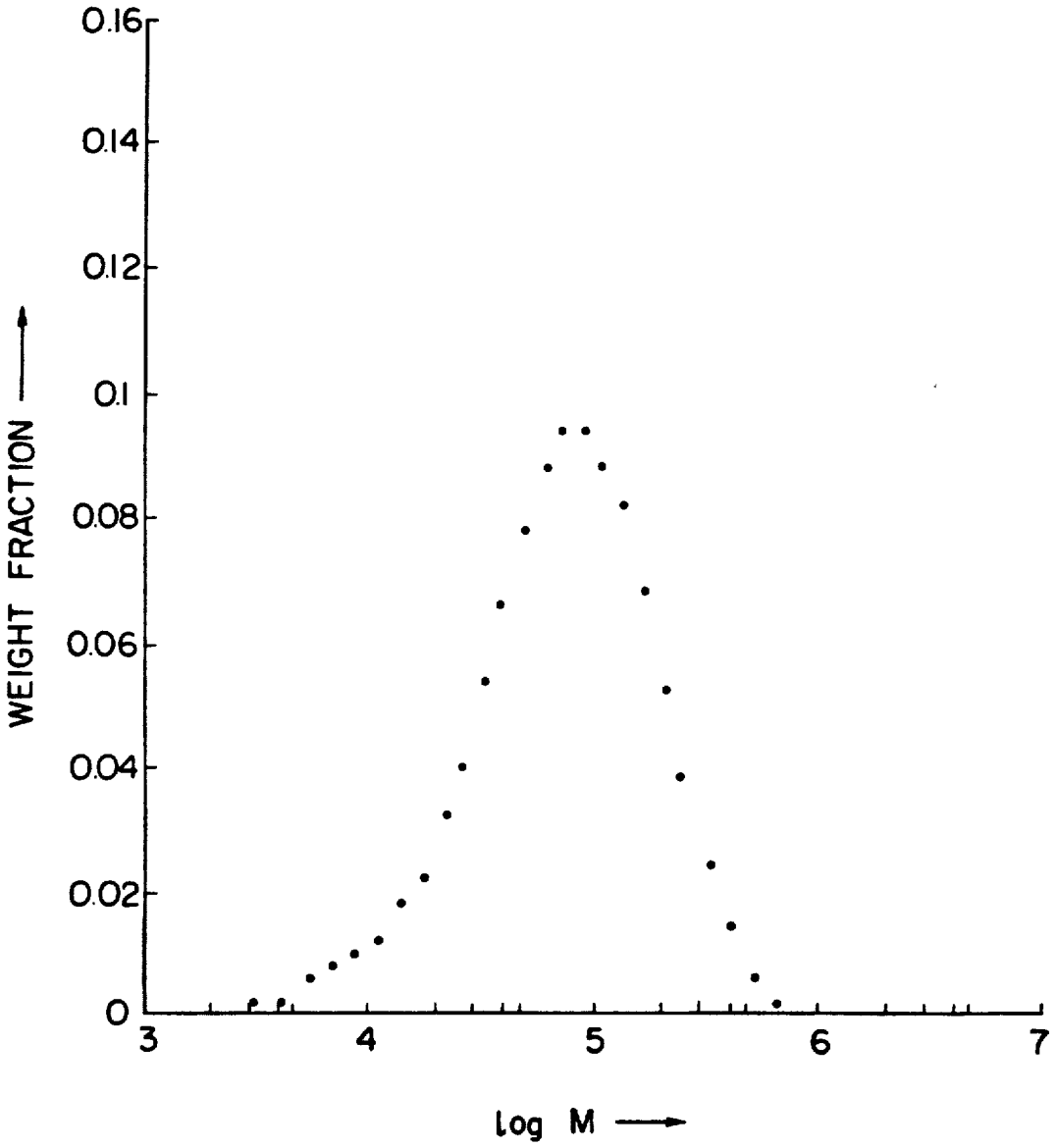
Figure 13:
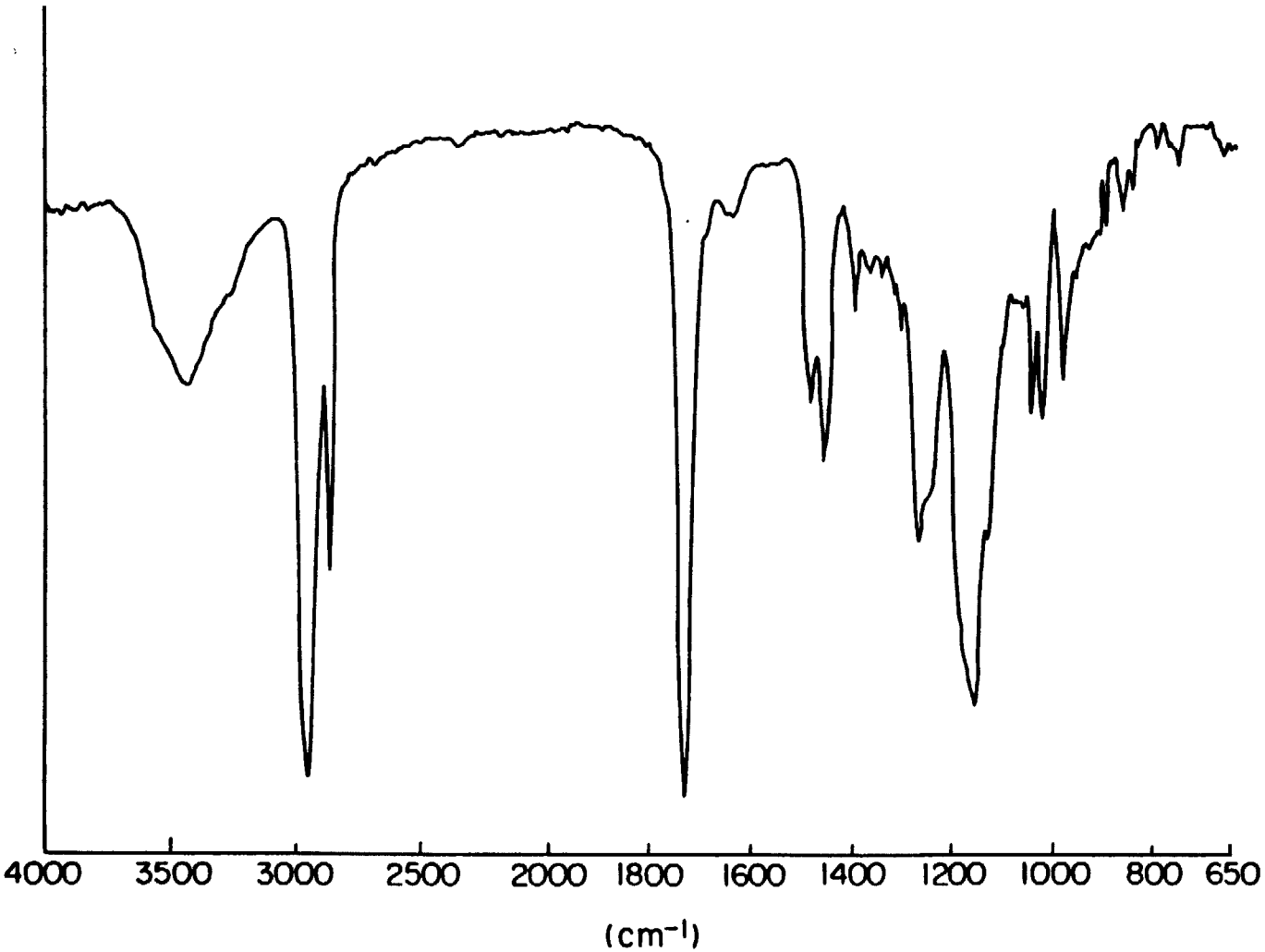
Figure 15:
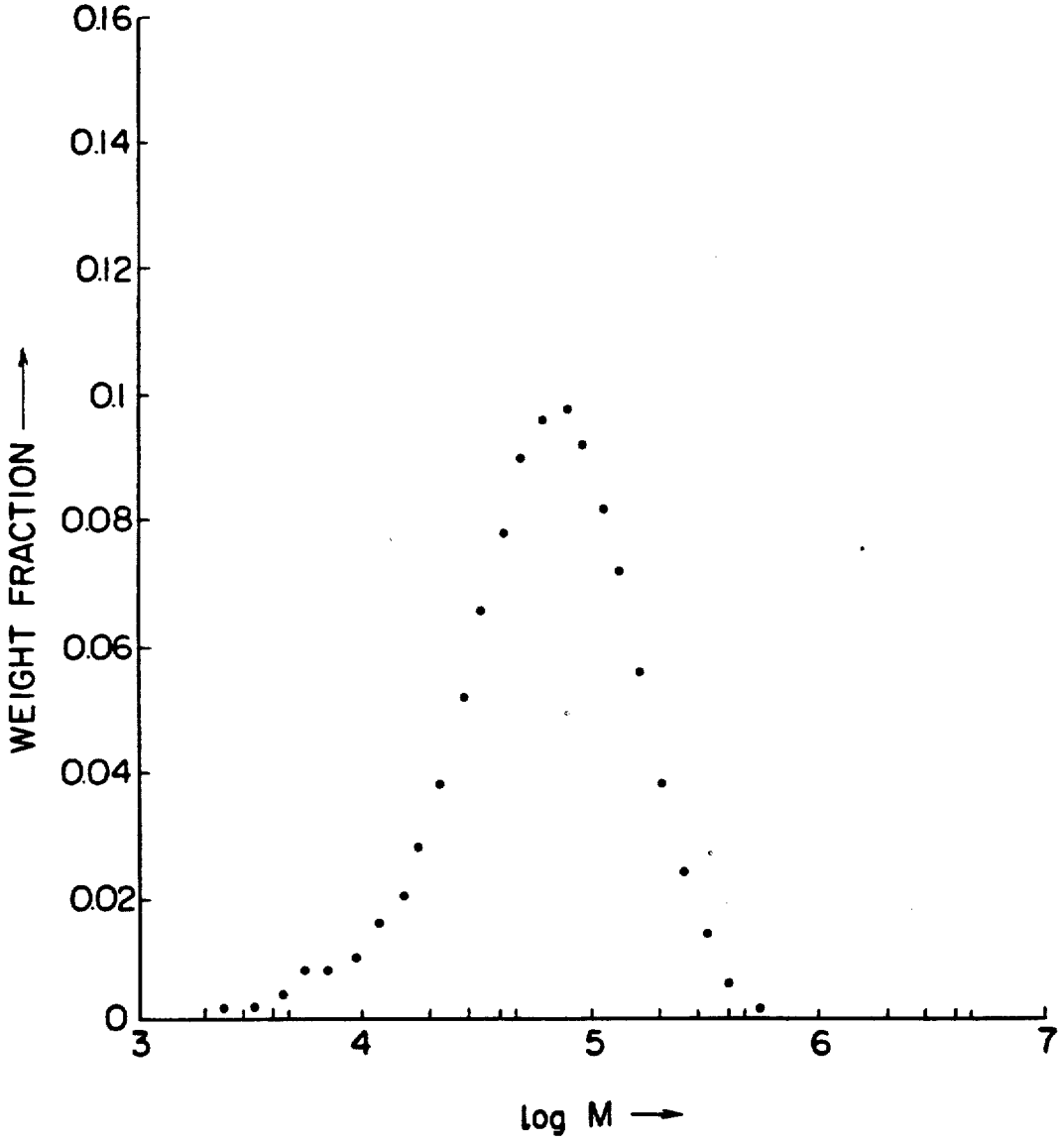
Figure 18:
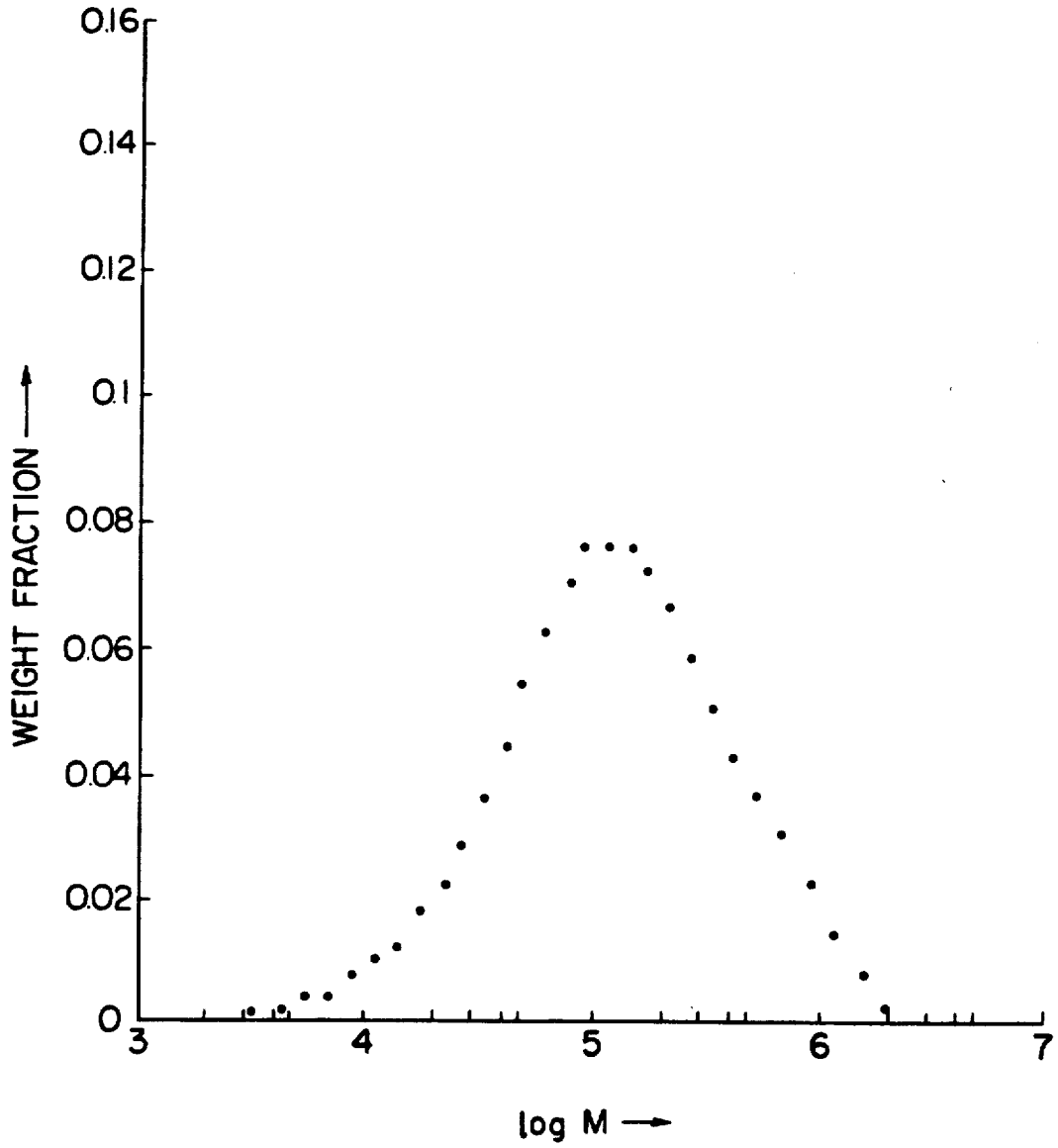

| | | Example No. | | | | | |
|---|---|---|---|---|---|---|---|
| | | 22 | 23 | 24 | 25 | 26 | 27 |
| Monomer (g) | TCD-MA | 200 | — | 100 | 160 | 120 | — |
| | TCD-AA | — | 200 | 100 | — | — | 180 |
| | Ethyl methacrylate | — | — | — | 40 | — | — |
| | Cyclohexyl methacrylate | — | — | — | — | 80 | — |
| | N-Methyl-maleimide | — | — | — | — | — | 20 |
| Yield of powdery polymer (%) | | 97 | 98 | 98 | 97 | 97 | 99 |
| IR spectrum | | FIG. 1 | FIG. 4 | FIG. 7 | FIG. 10 | FIG. 13 | FIG. 16 |
| NMR spectrum | | FIG. 2 | FIG. 5 | FIG. 8 | FIG. 11 | FIG. 14 | FIG. 17 |
| MW distribution | | FIG. 3 | FIG. 6 | FIG. 9 | FIG. 12 | FIG. 15 | FIG. 18 |

EXAMPLE 28

In a 5-liter separable flask equipped with a stirrer and a condenser, 100 g of a 10% basic potassium phosphate suspension as a dispersing agent, 0.005 g of sodium dodecylbenzensulfonate and 1 g of sodium sulfate were placed together with 2900 g of pure water to give a suspended medium after stirring and mixing. To this, a mixture of 750 g of TCD-MA, 150 g of n-butyl acrylate, 100 g of N-methylmaleimide, 4 g of lauroyl peroxide and 1 g of n-dodecyl mercaptan (a mixture of monomers, an initiator, and chain transfer agent) was added and the polymerization was carried out under a nitrogen atmosphere with stirring at 200 r.p.m. at 60° C. for 3 hours and at 98° C. for 4 hours. The resulting polymer particles were filtered, washed with an acid, washed with water and dried. The polymer particles in an amount of 100 g was dissolved in 200 g of tetrahydrofuran. The resulting solution was poured into 5 liters of methanol with stirring and the precipitated and deposited polymer was filtered, dried to give powdery polymer.

EXAMPLES 29 TO 40

The process of Example 28 was repeated except for using monomers, polymerization initiators and n-dodecyl mercaptan in kinds and amounts as listed in Table 7 to give powdery polymers.

The elementary analysis values, repeating unit ratios in the main chain, glass transition points, decomposition beginning points, weight-average molecular weights, IR spectra, NMR spectra, and MW distributions were measured in the same manner as Example 22 and listed in Tables 7 to 9. [Explanation on Drawings]

(5) EXAMPLE 28

Figure 20:
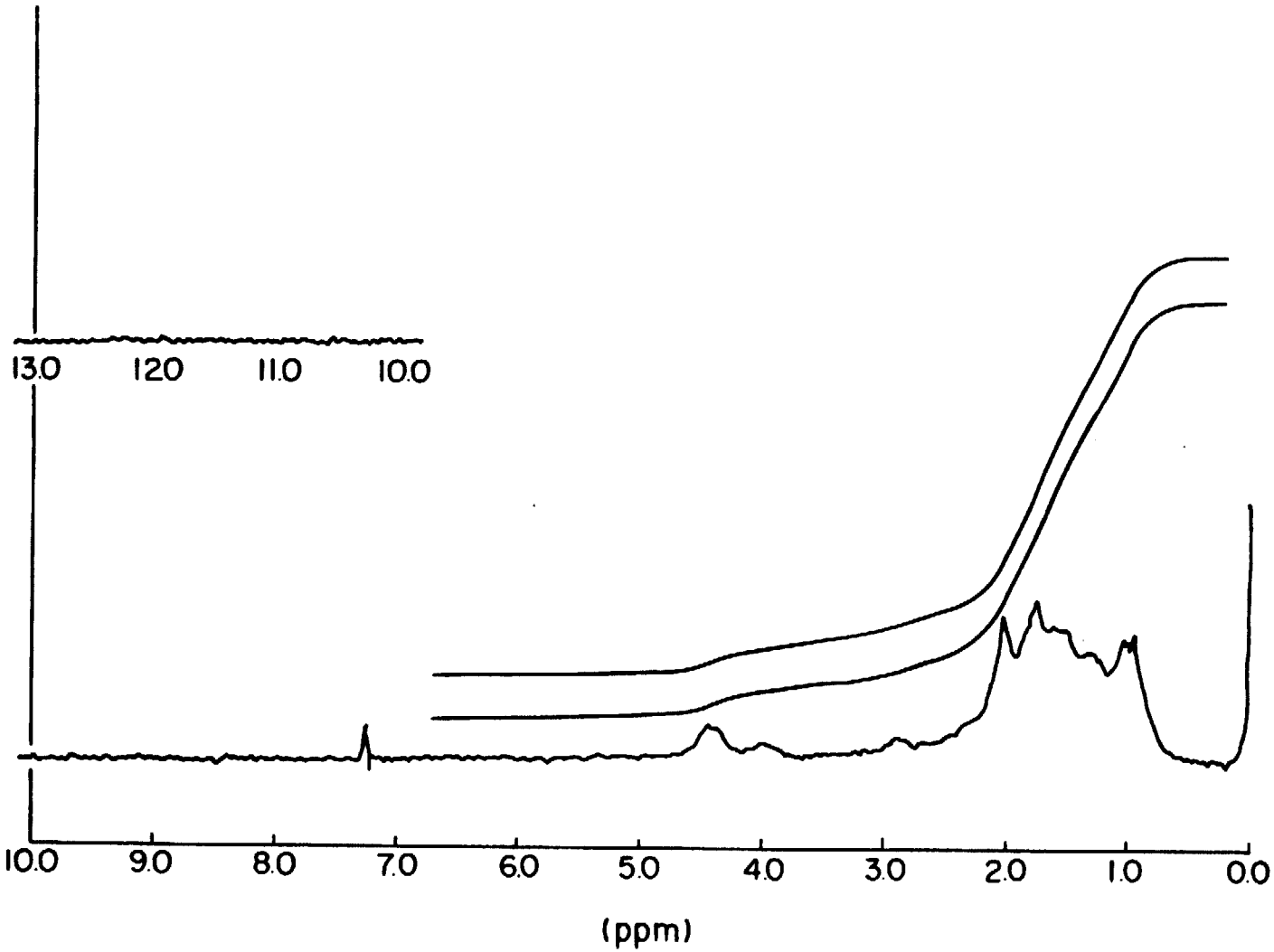

The NMR spectrum chart of FIG. 20 shows a small peak at near 4.0 ppm due to the proton —O—$CH_2$— in the n-butyl group neighboring to the carbonyl group.

(6) EXAMPLE 32

Figure 32:
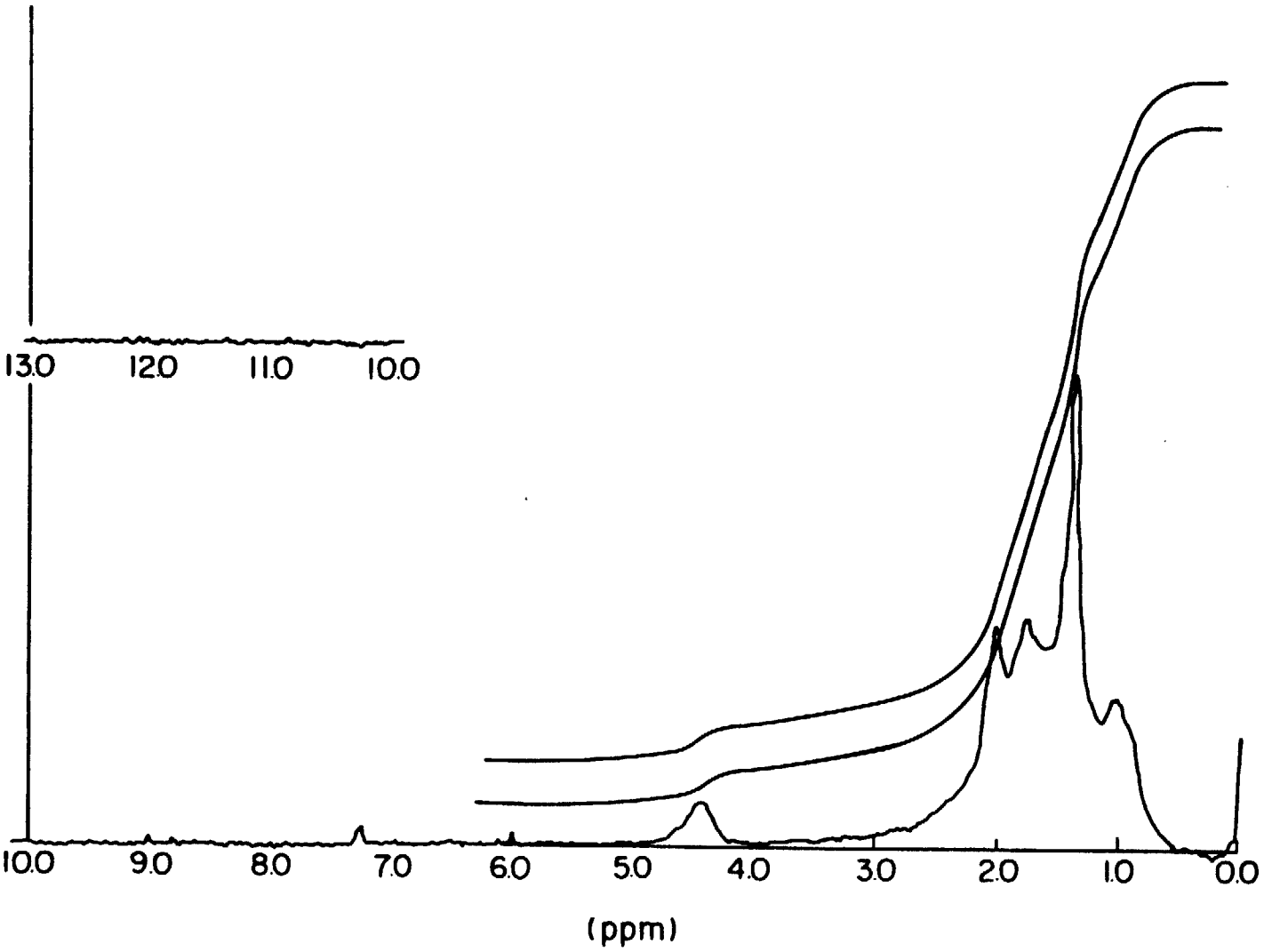

The NMR spectrum chart of FIG. 32 shows a peak at near 1.4 ppm due to the t-butyl group.

(7) EXAMPLE 35

Figure 41:
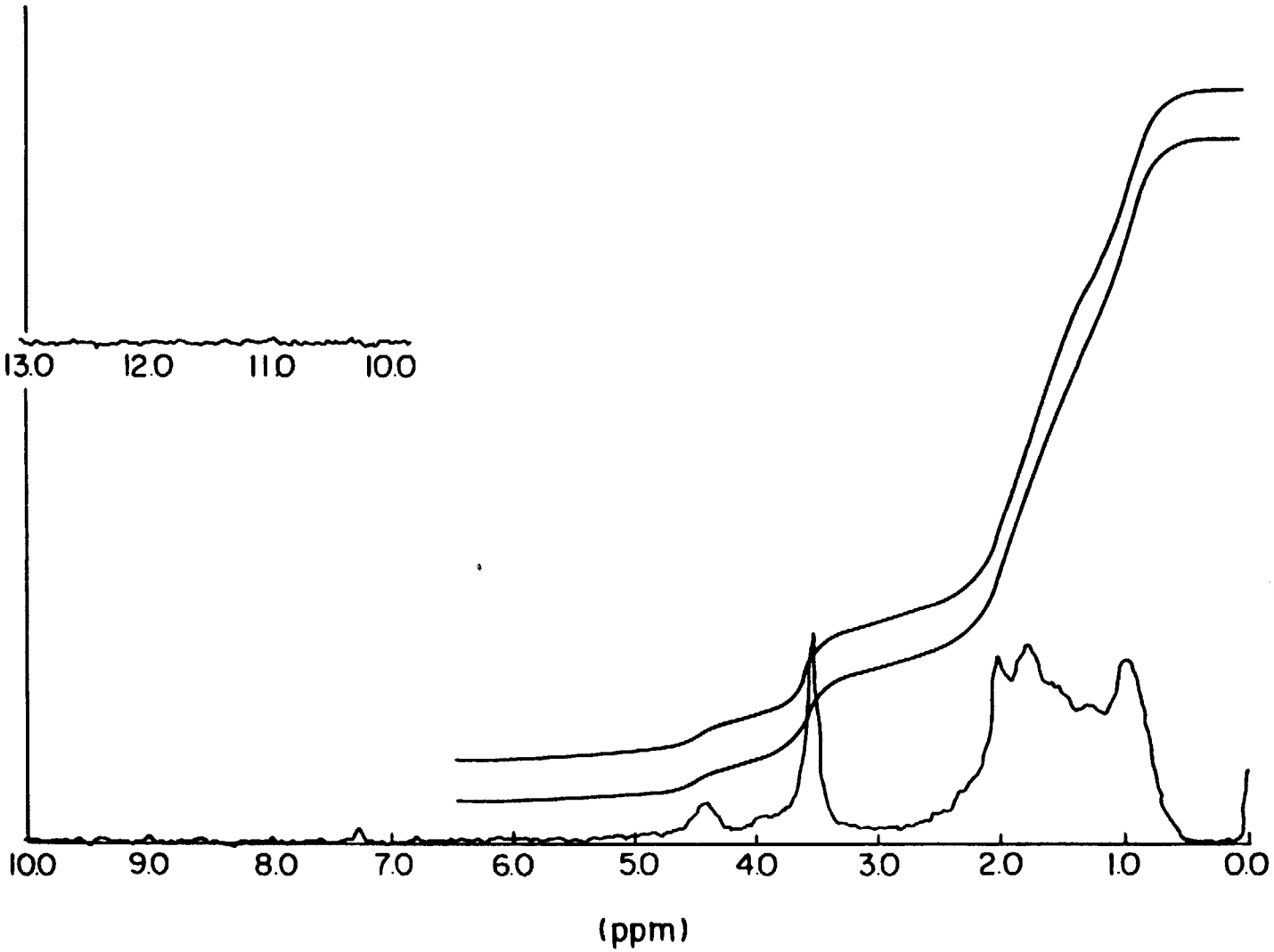

The NMR spectrum chart of FIG. 41 shows a peak at near 3.6 ppm due to the methyl group neighboring to the carbonyl group.

(8) EXAMPLE 39

Figure 52:
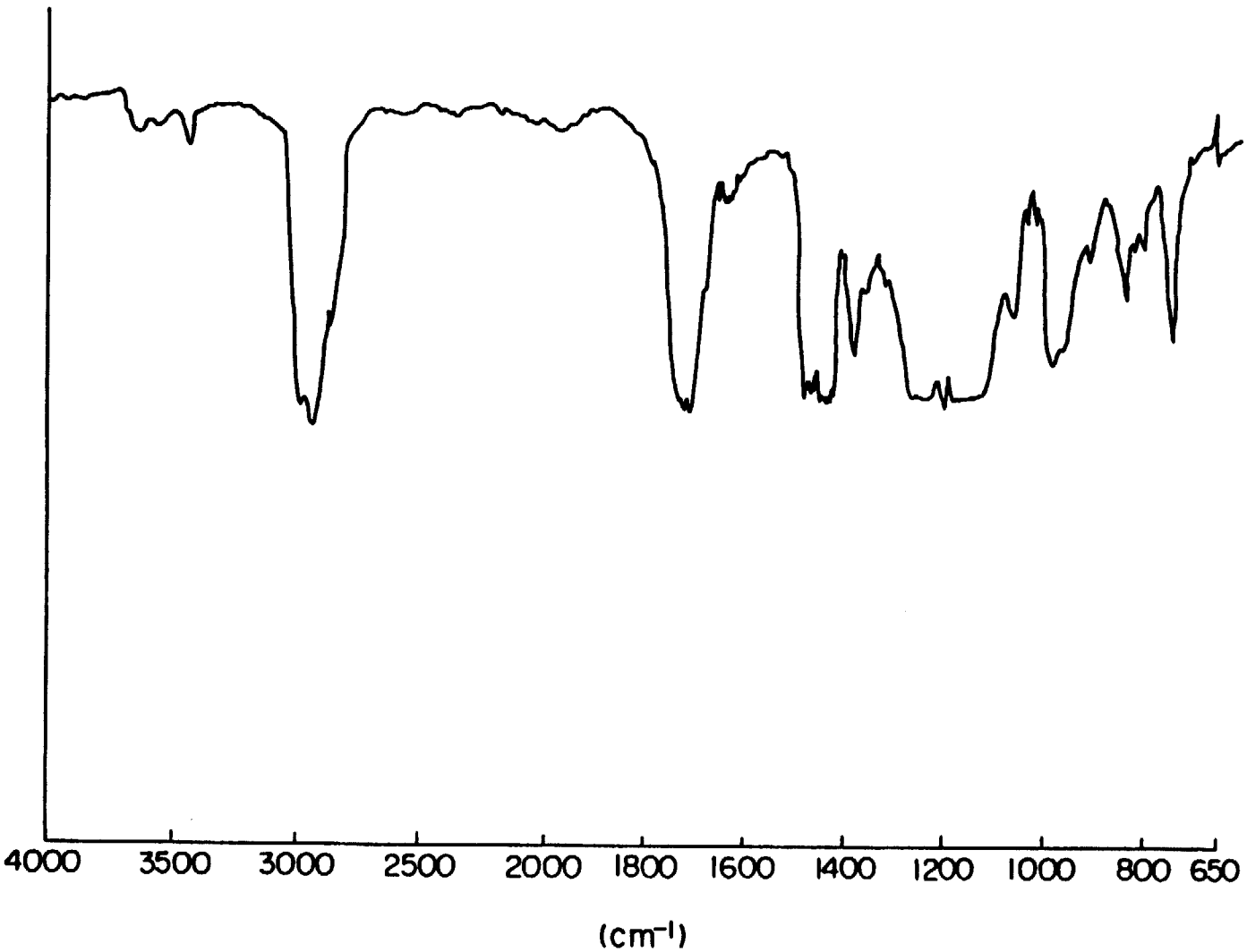

The IR spectrum chart of FIG. 52 shows absorptions at near 3000 $cm^{-1}$, 1500 $cm^{-1}$, 1470 $cm^{-1}$, 1445 $cm^{-1}$ and 1200 $cm^{-1}$ due to the benzyl group.

TABLE 7

Figure 19:
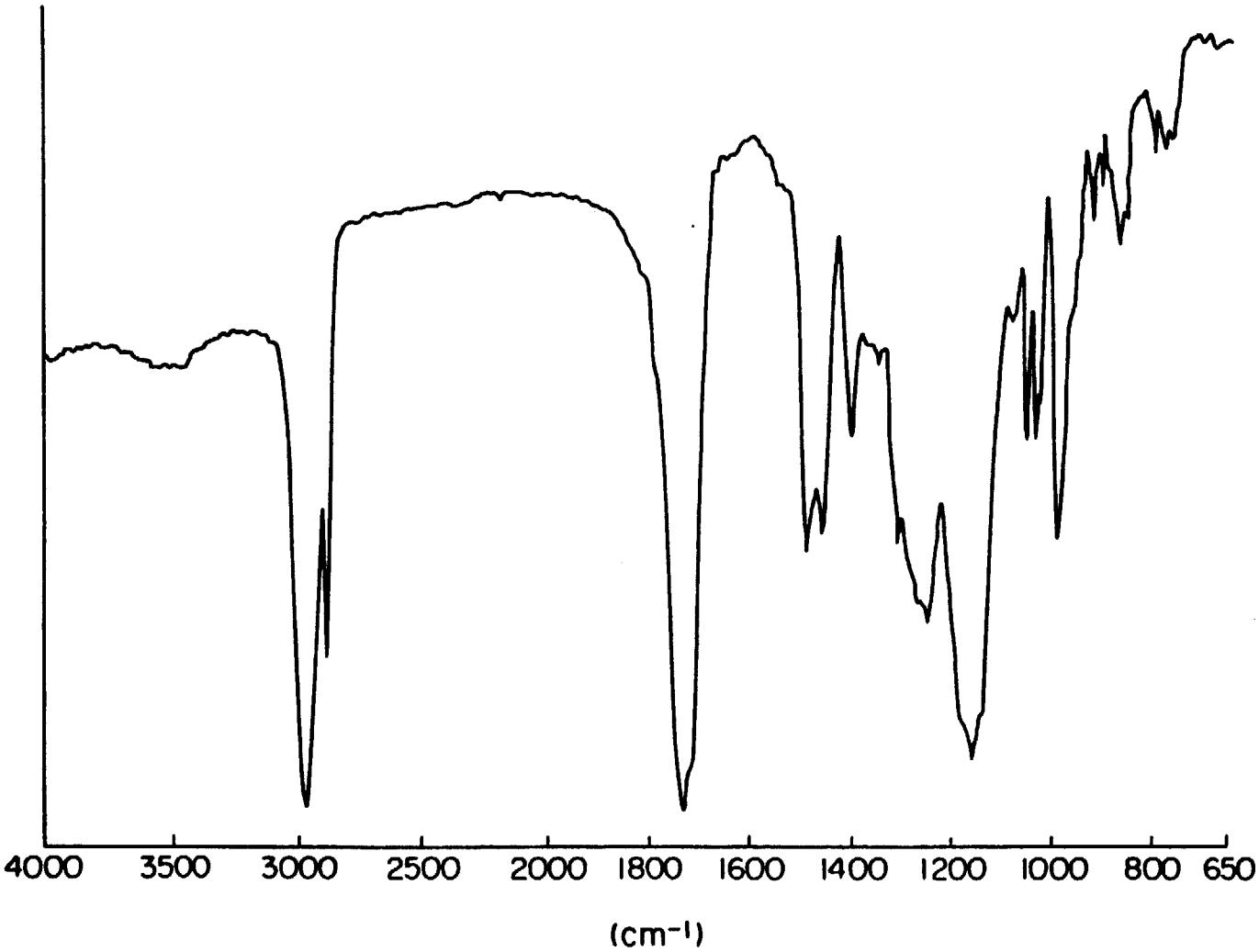
Figure 21:
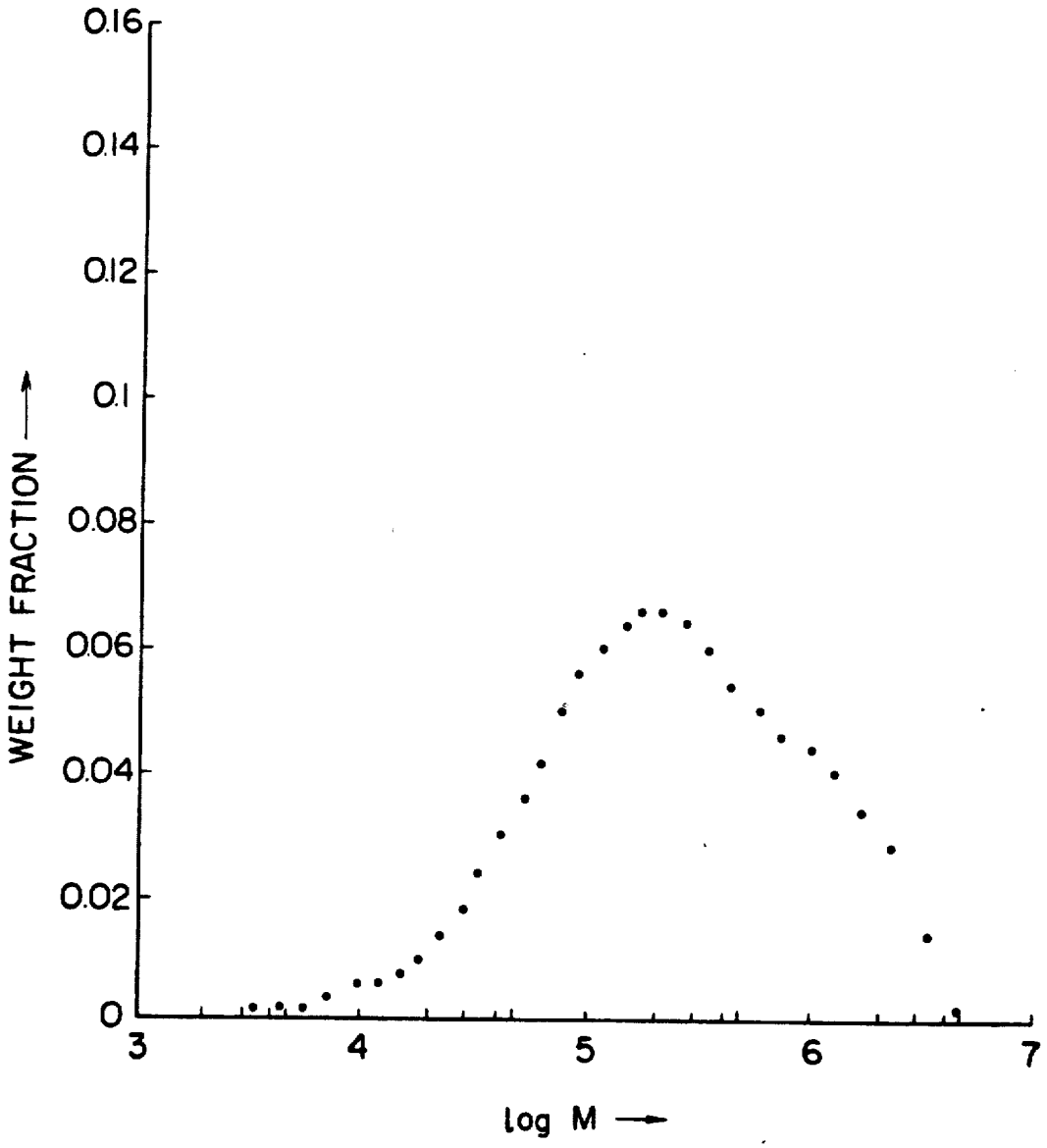
Figure 22:
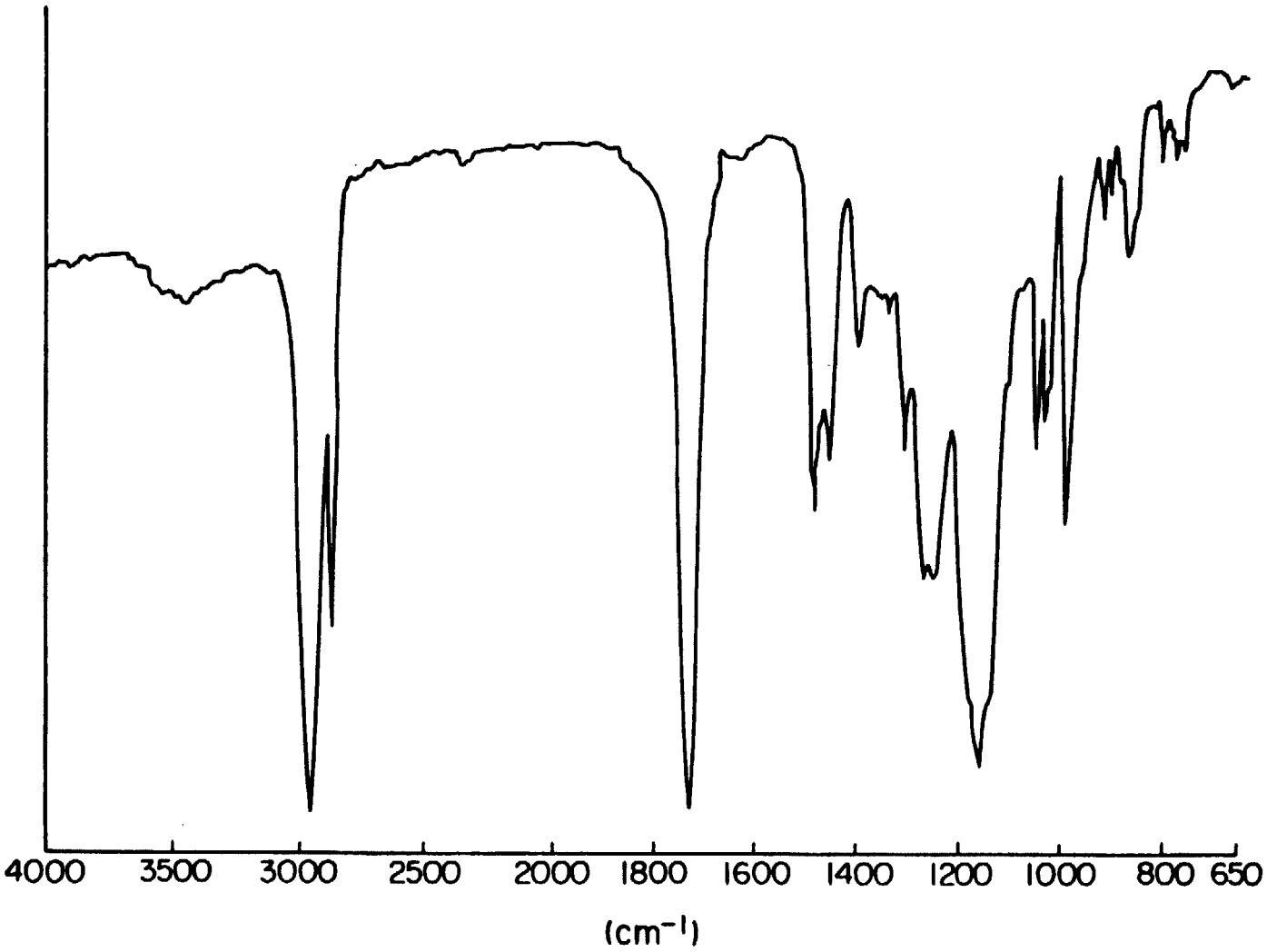
Figure 23:
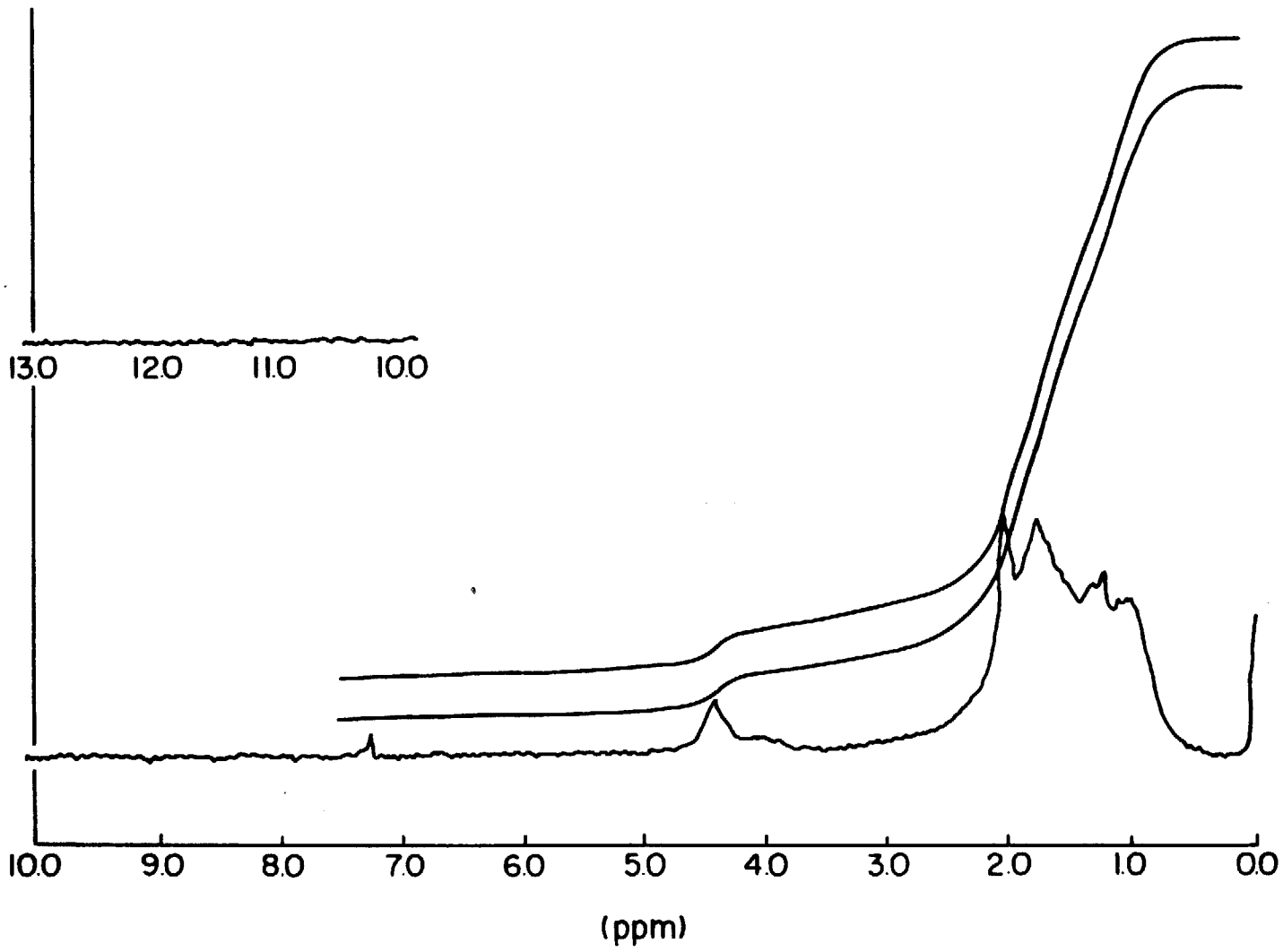
Figure 24:
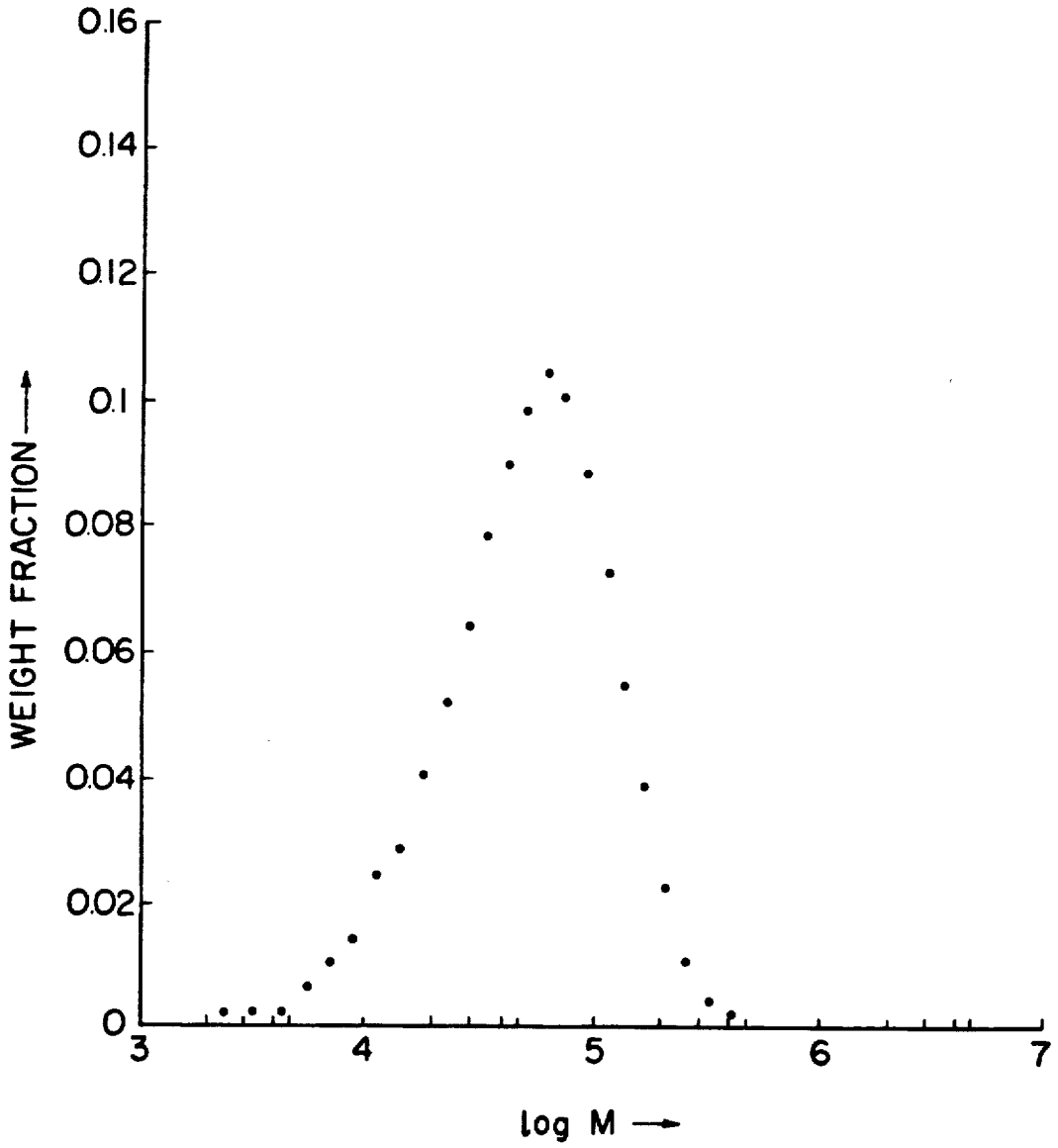
Figure 25:
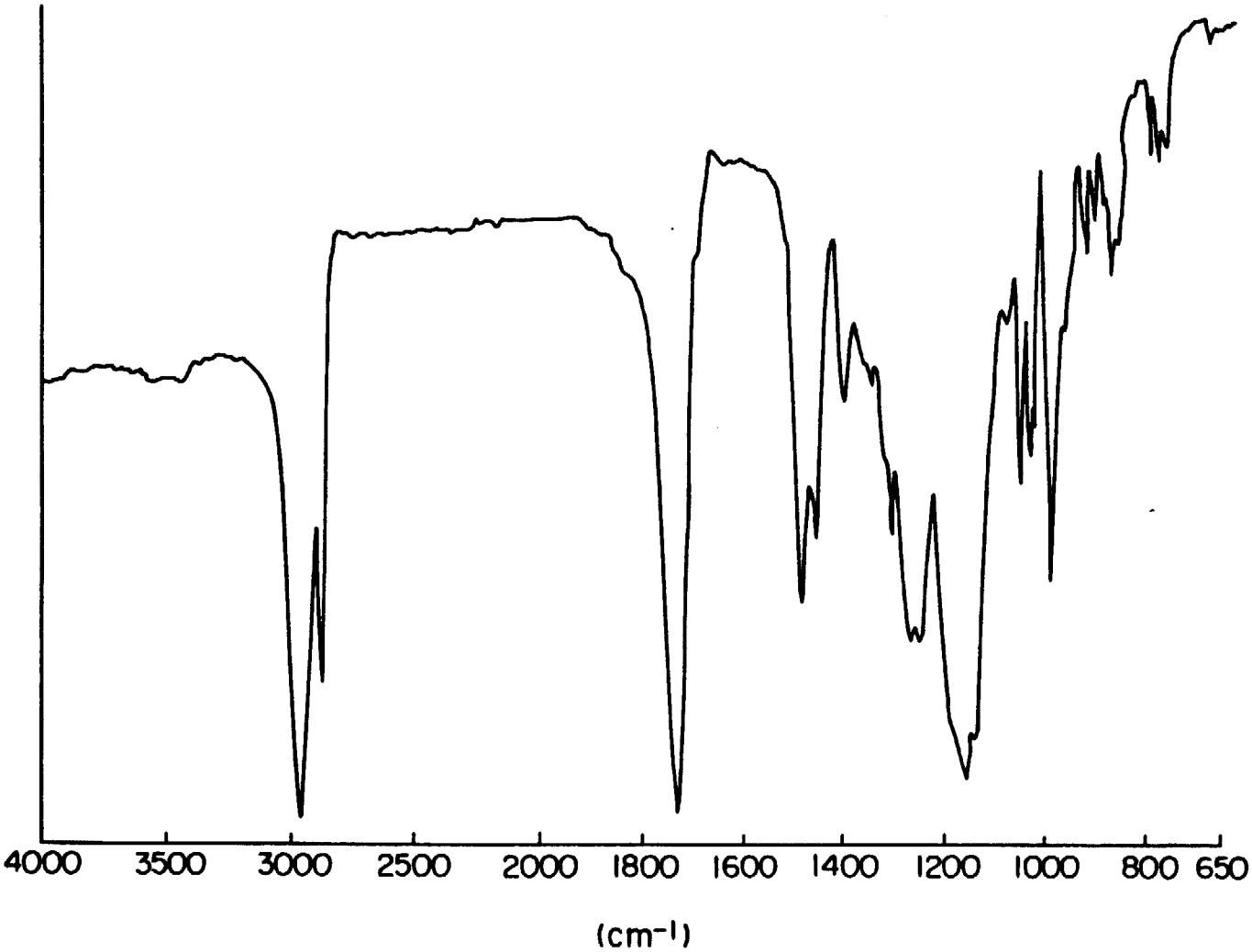
Figure 26:
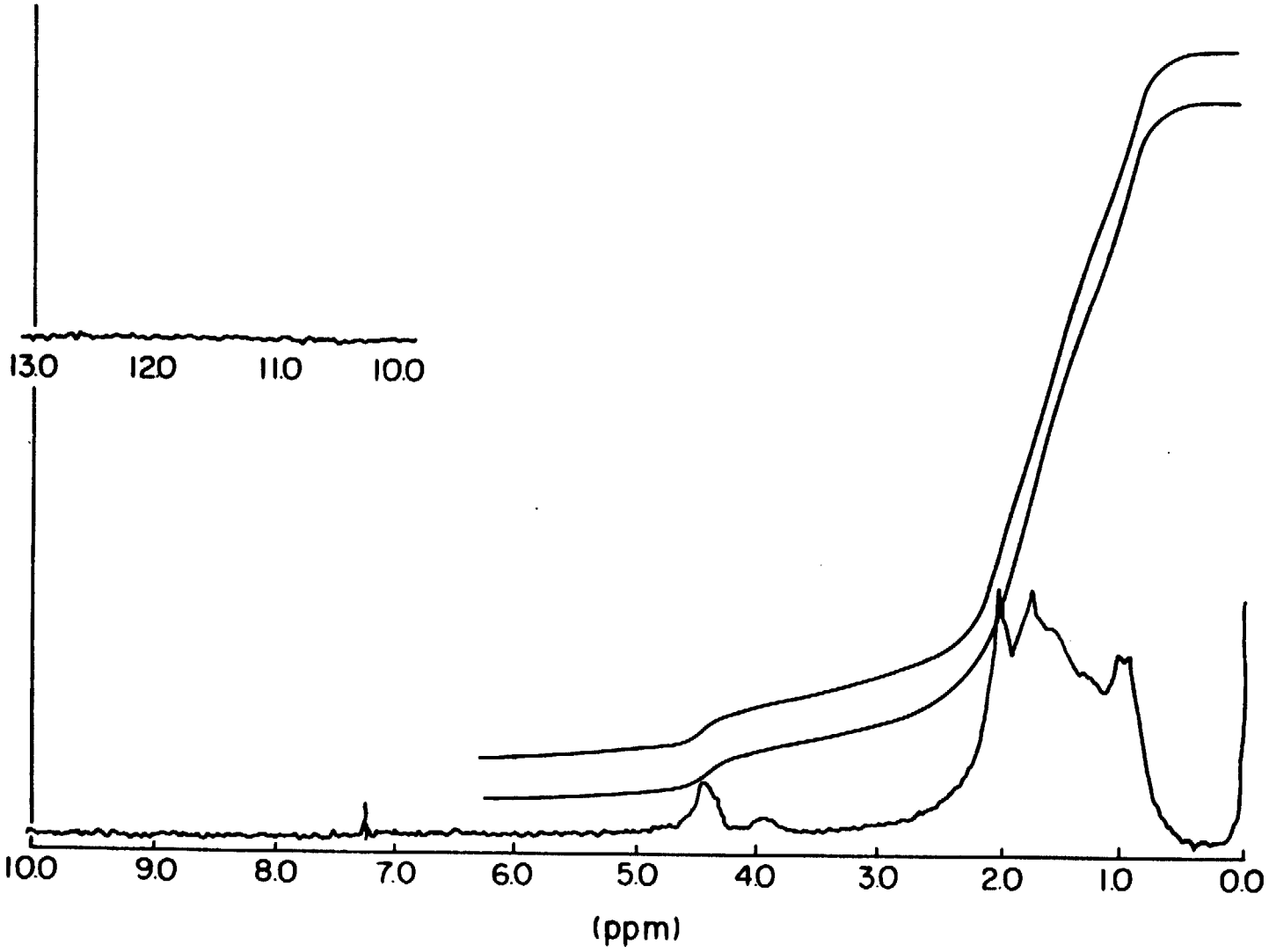
Figure 27:
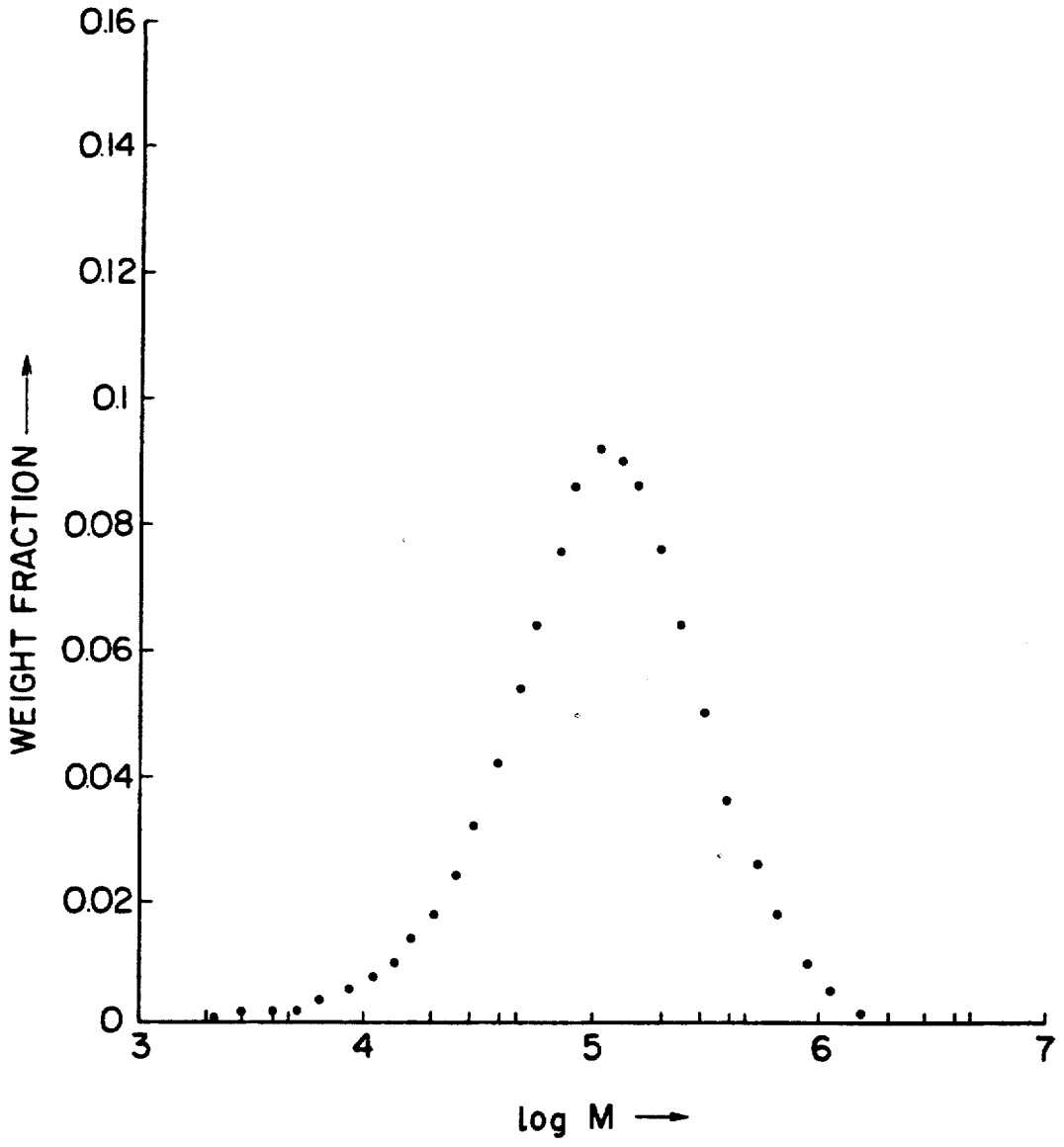
Figure 28:
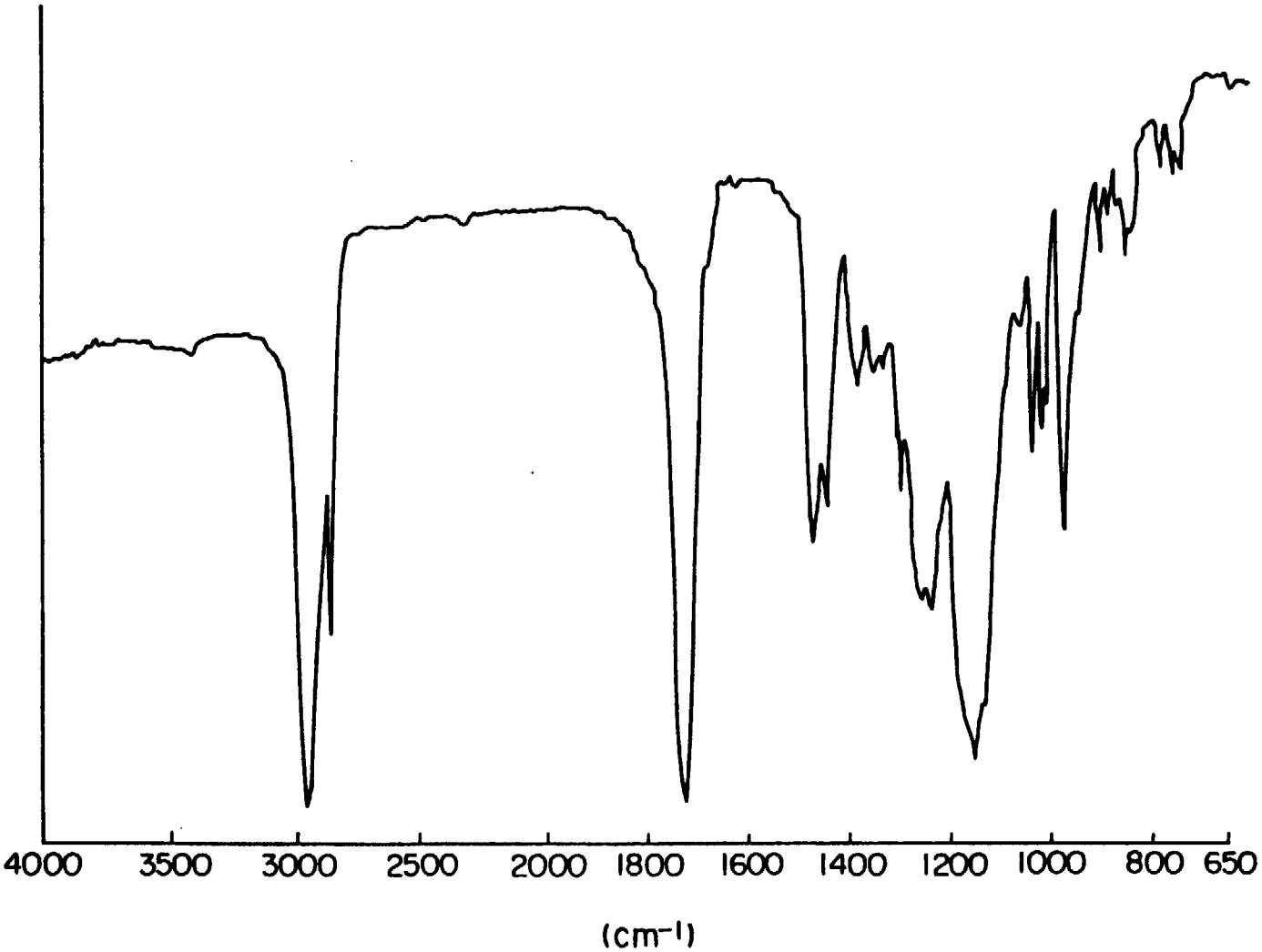
Figure 29:
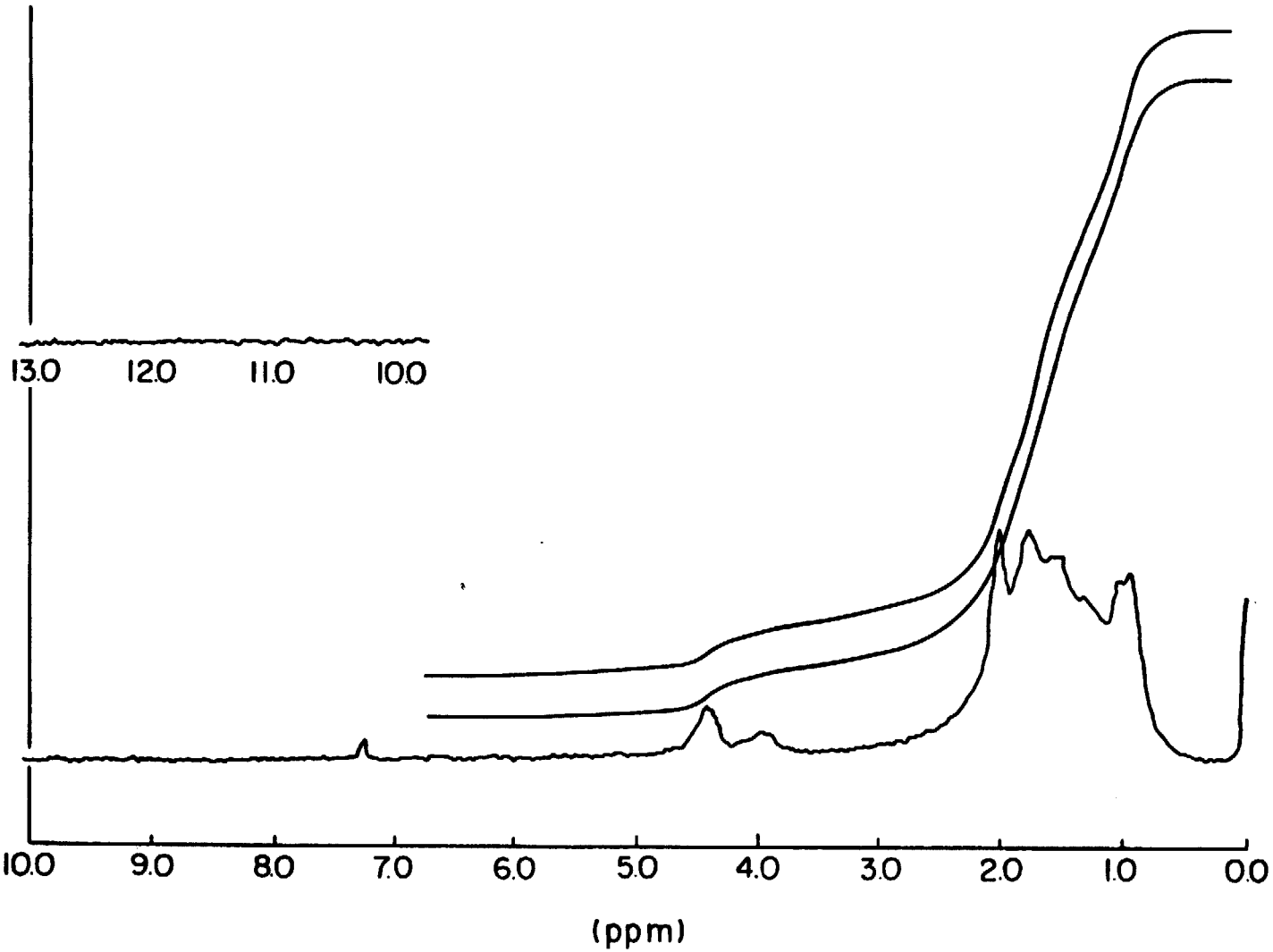
Figure 30:
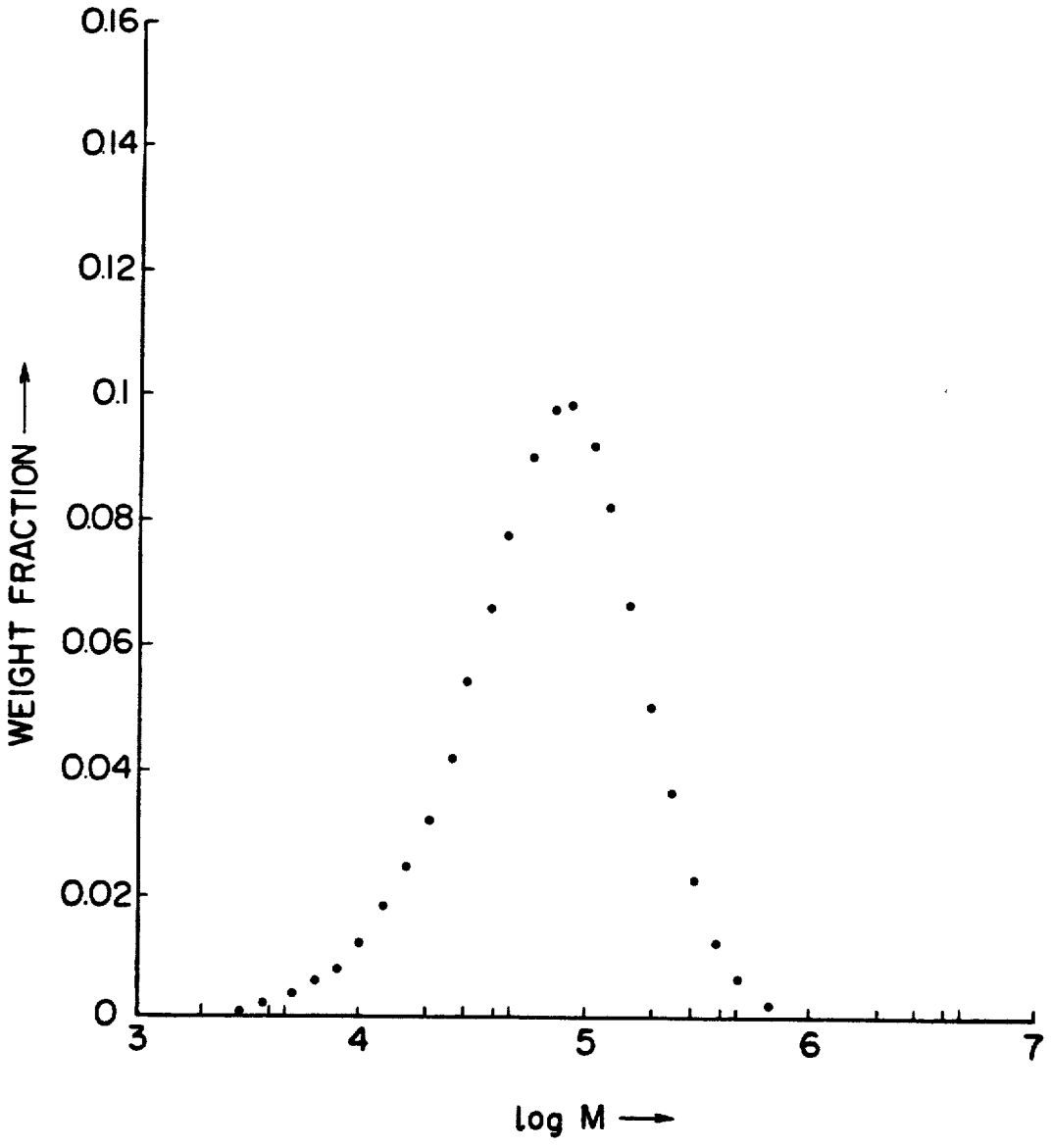
Figure 31:
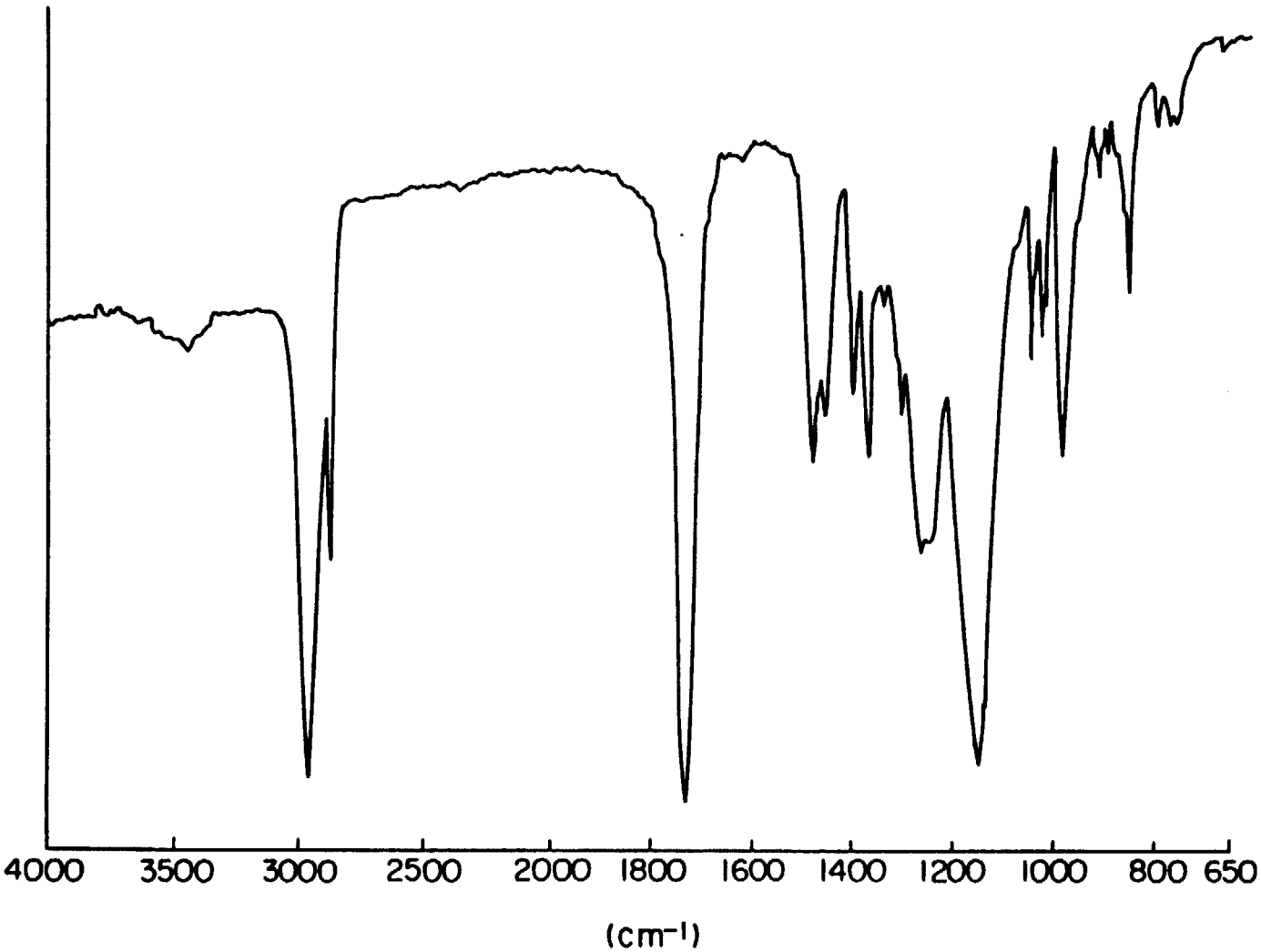
Figure 33:
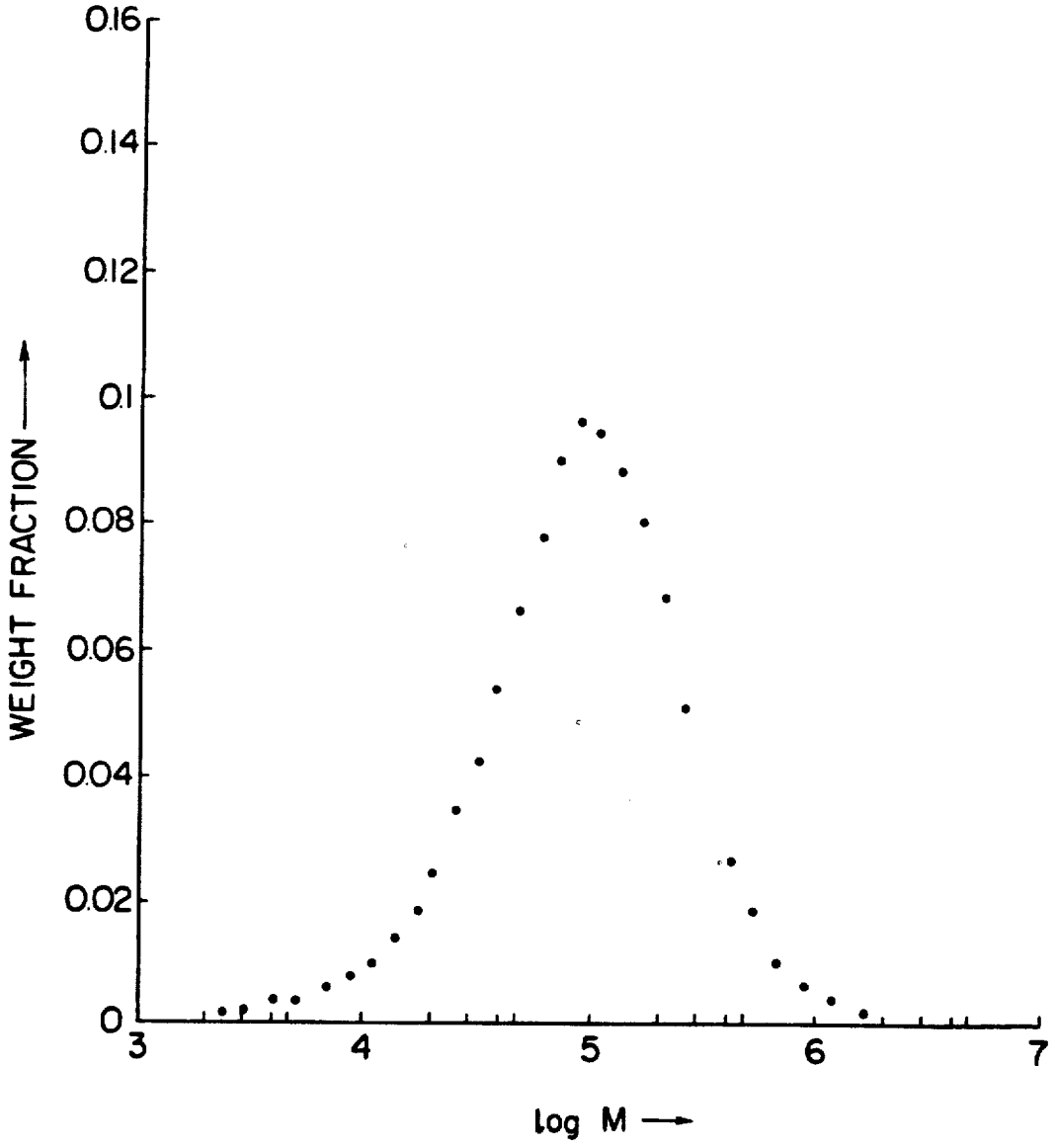
Figure 34:
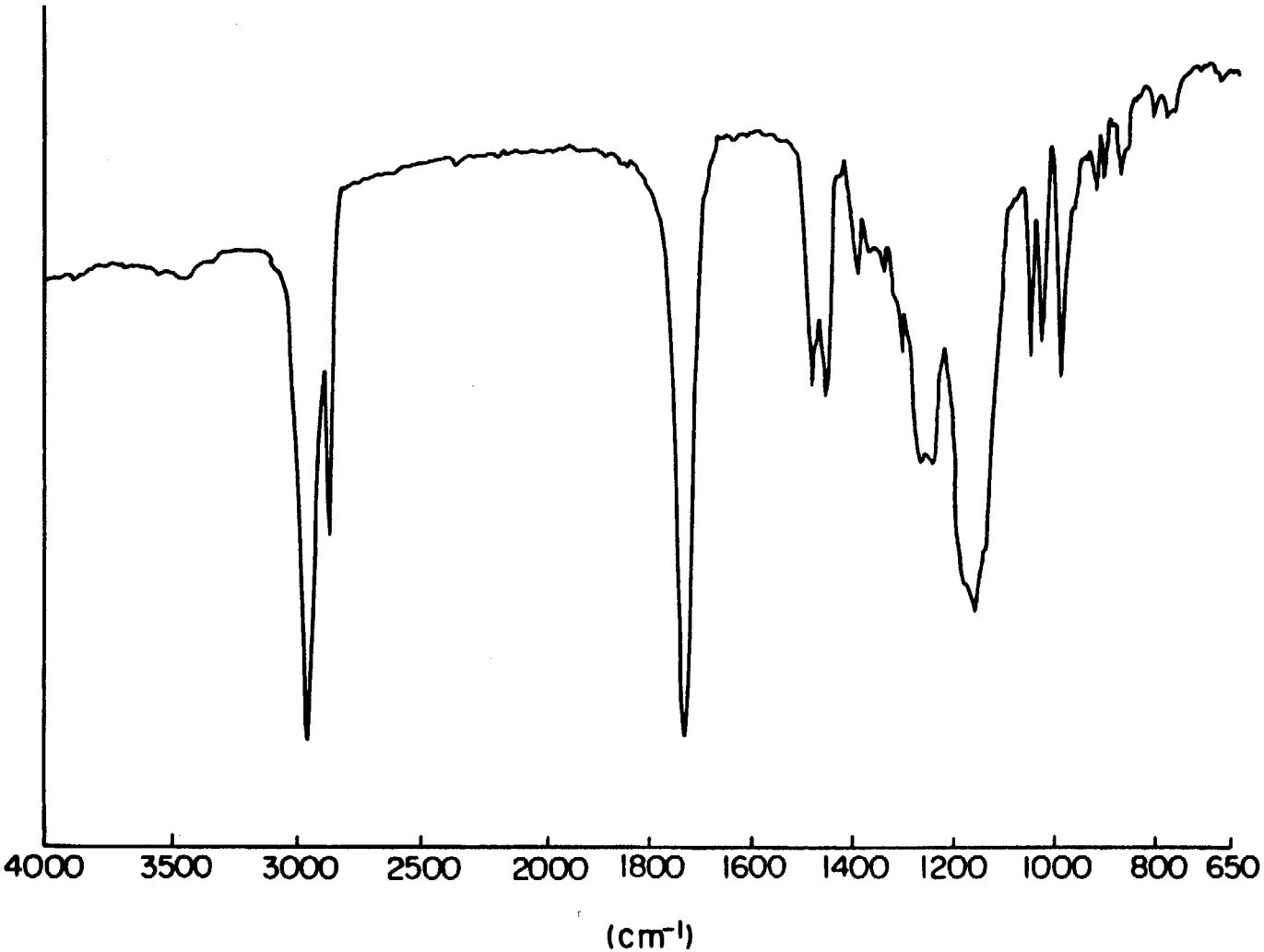
Figure 35:
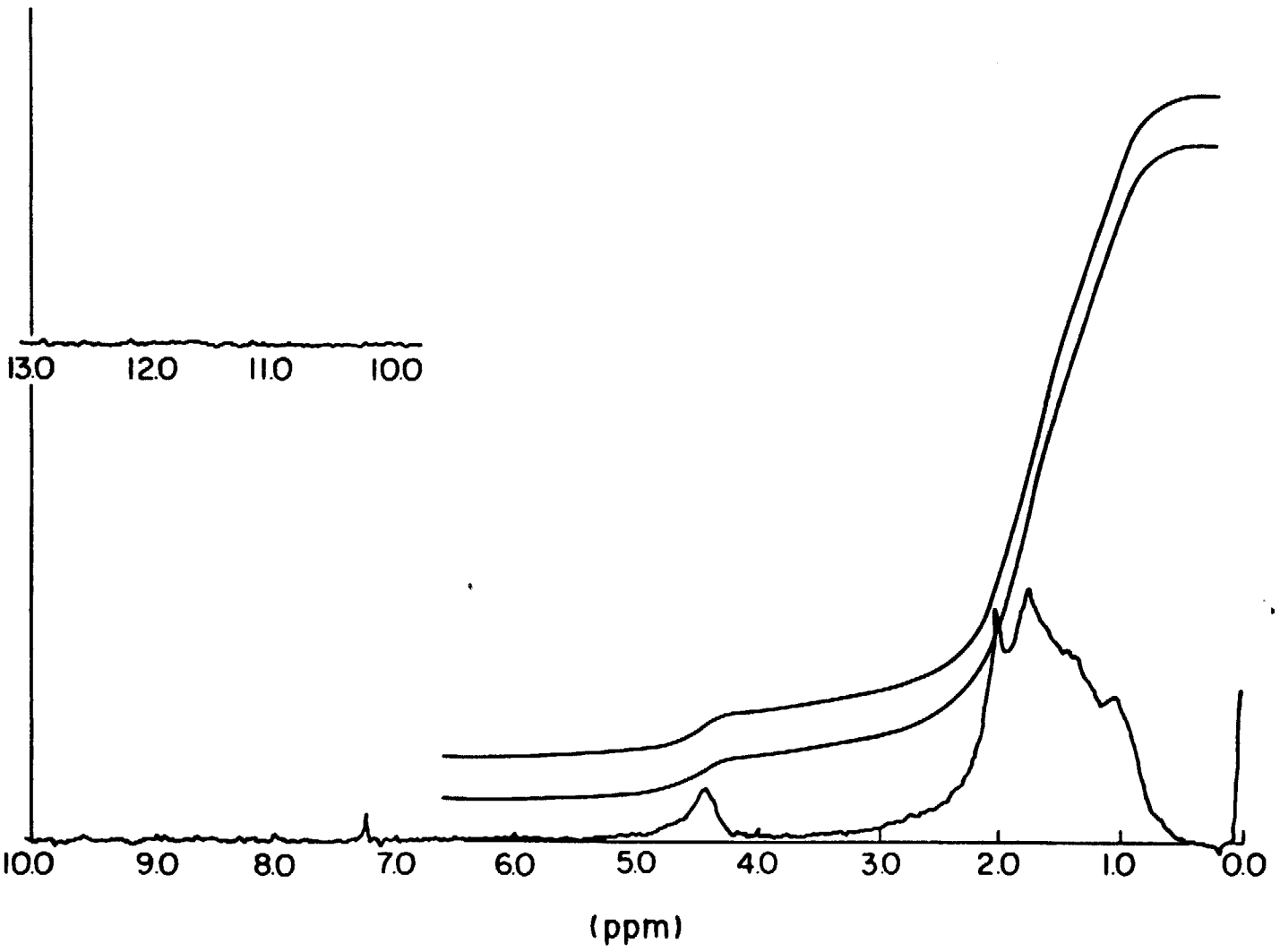
Figure 36:
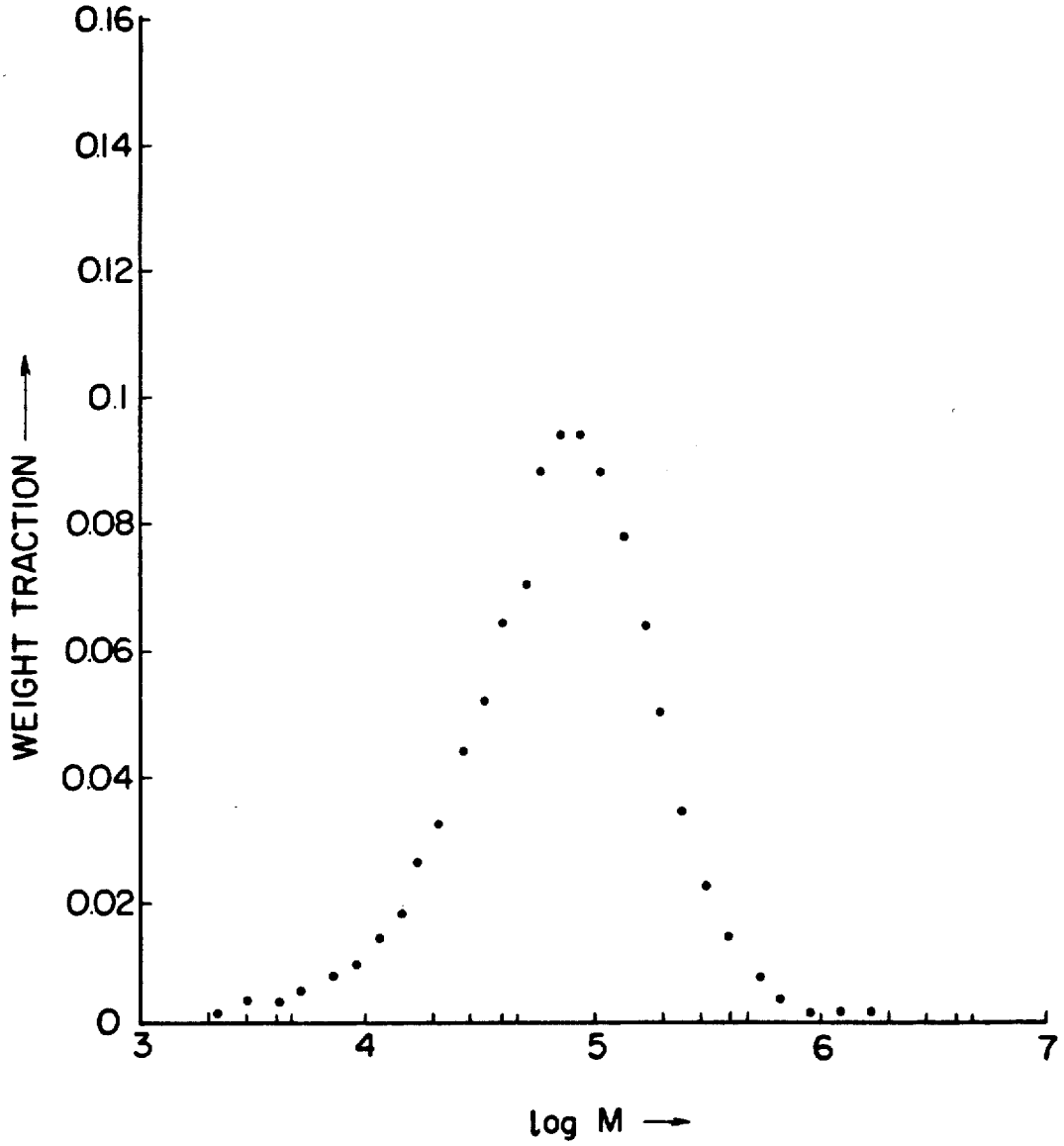
Figure 37:
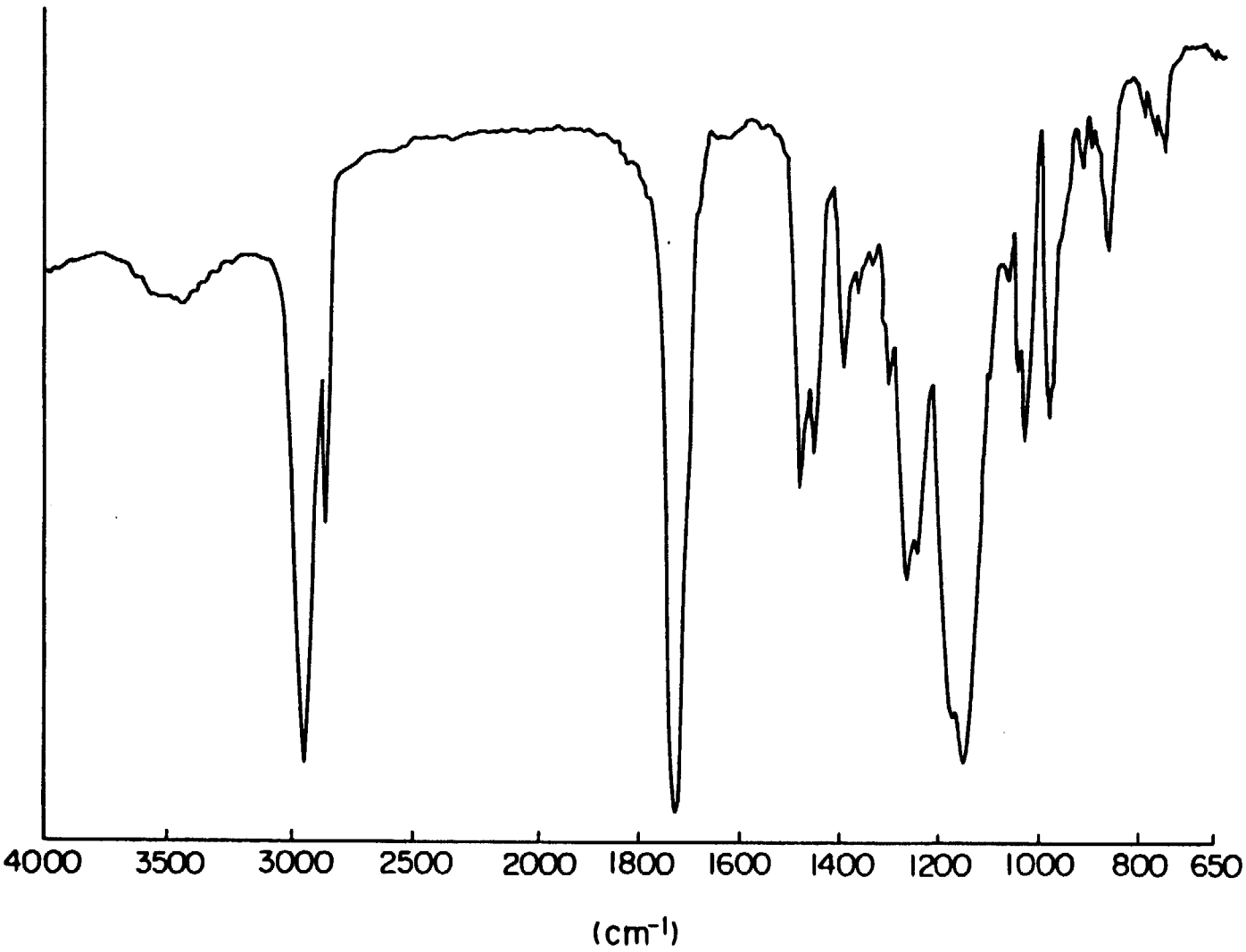
Figure 38:
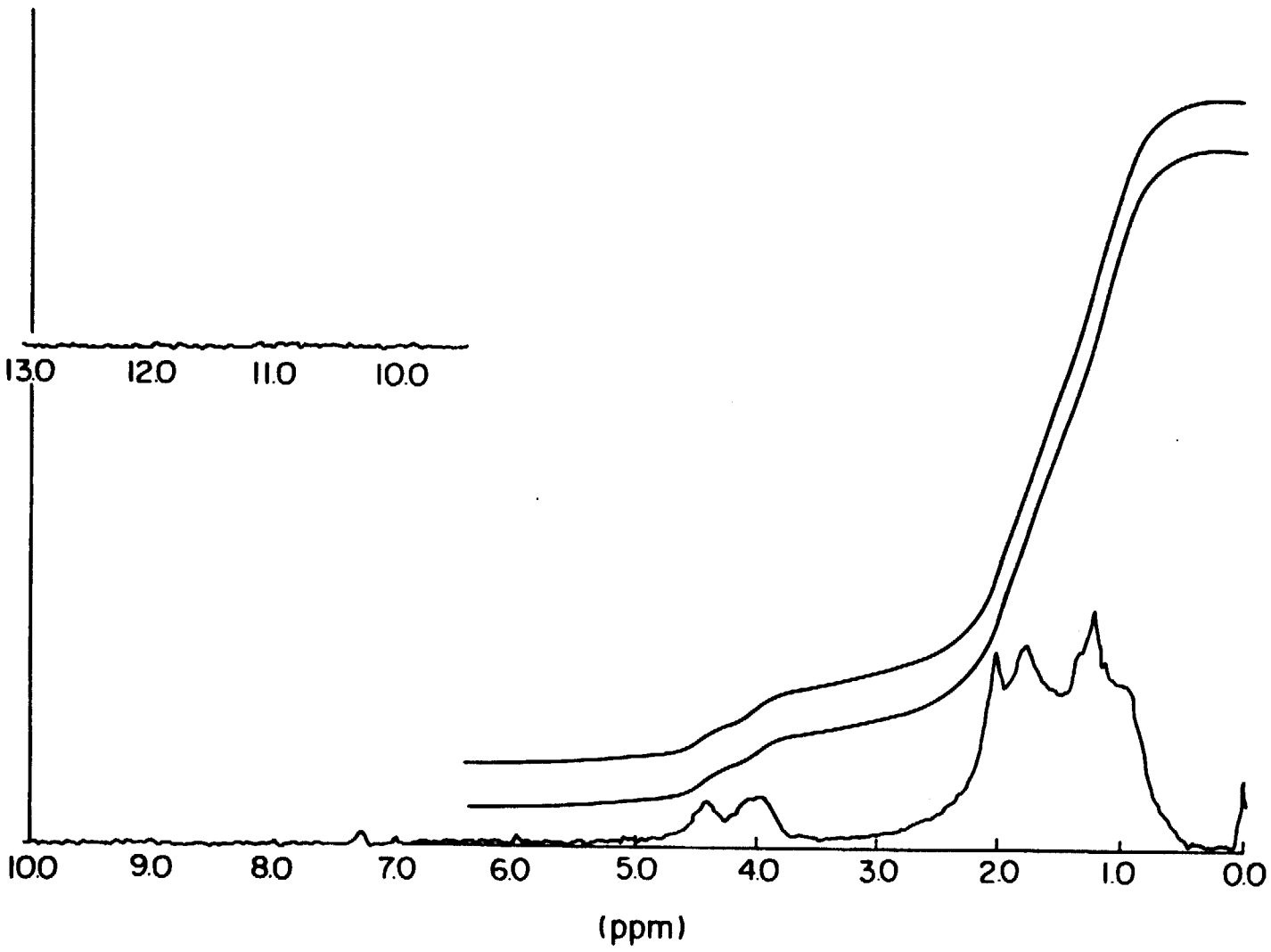
Figure 39:
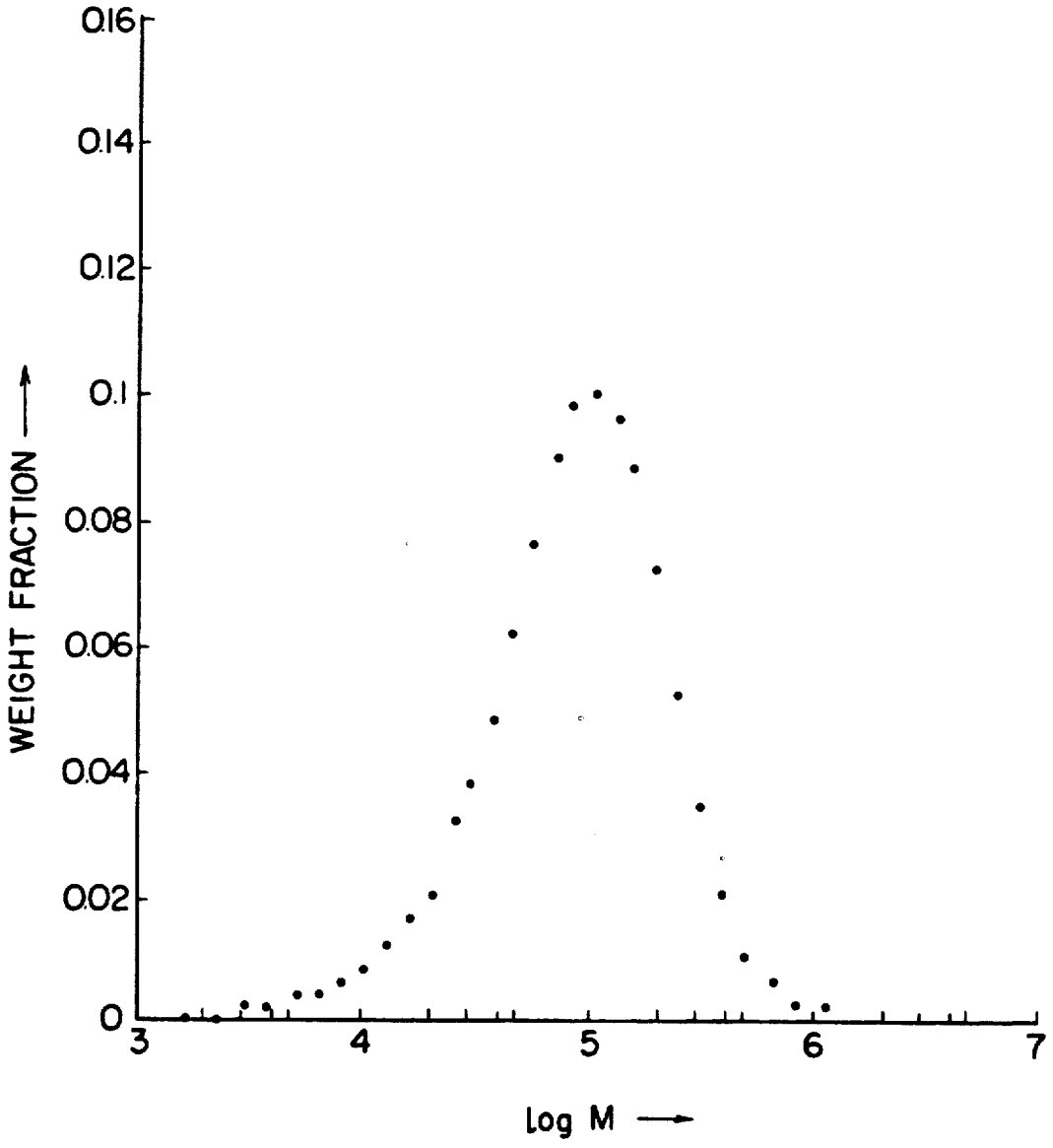
Figure 40:
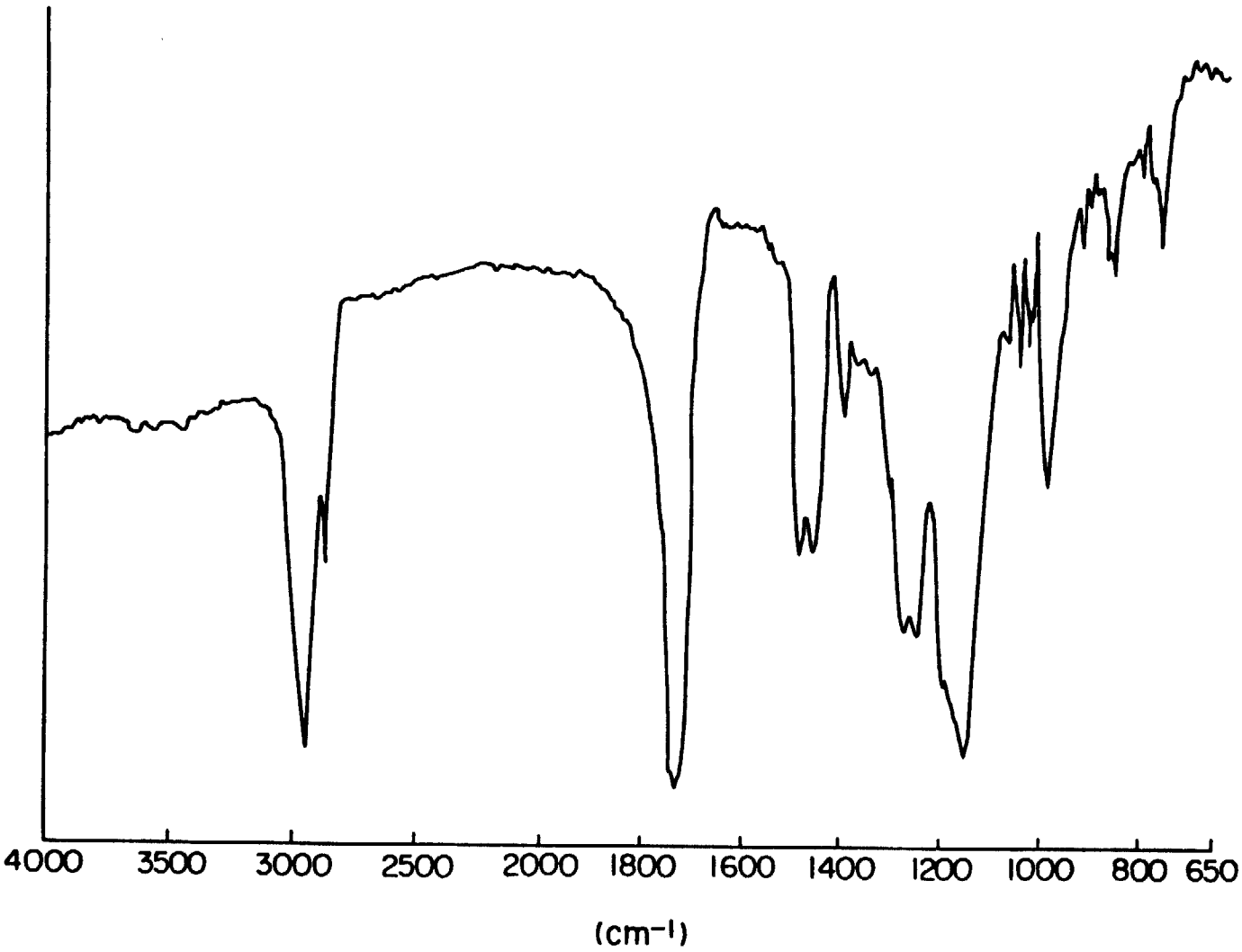
Figure 42:
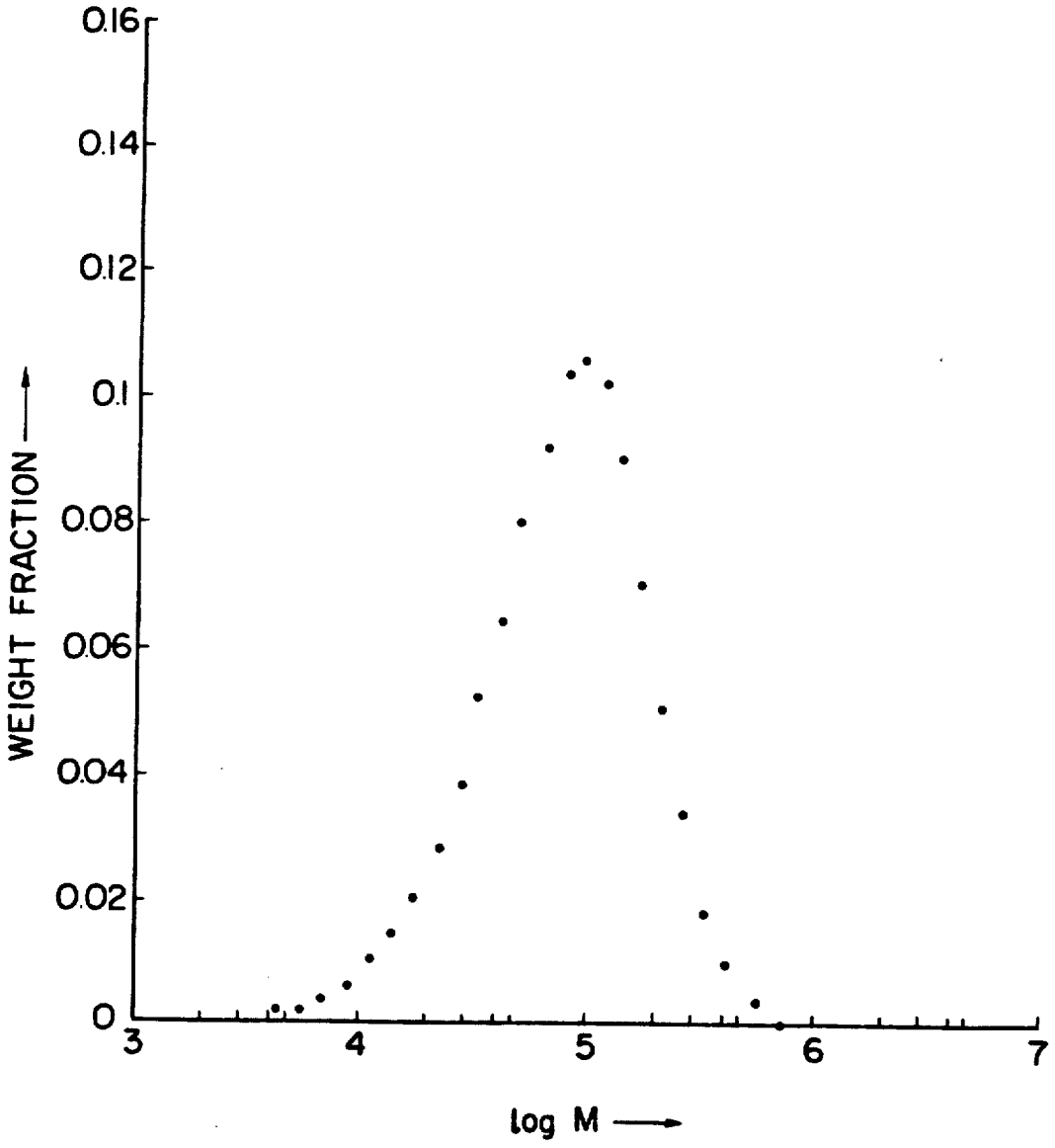
Figure 43:
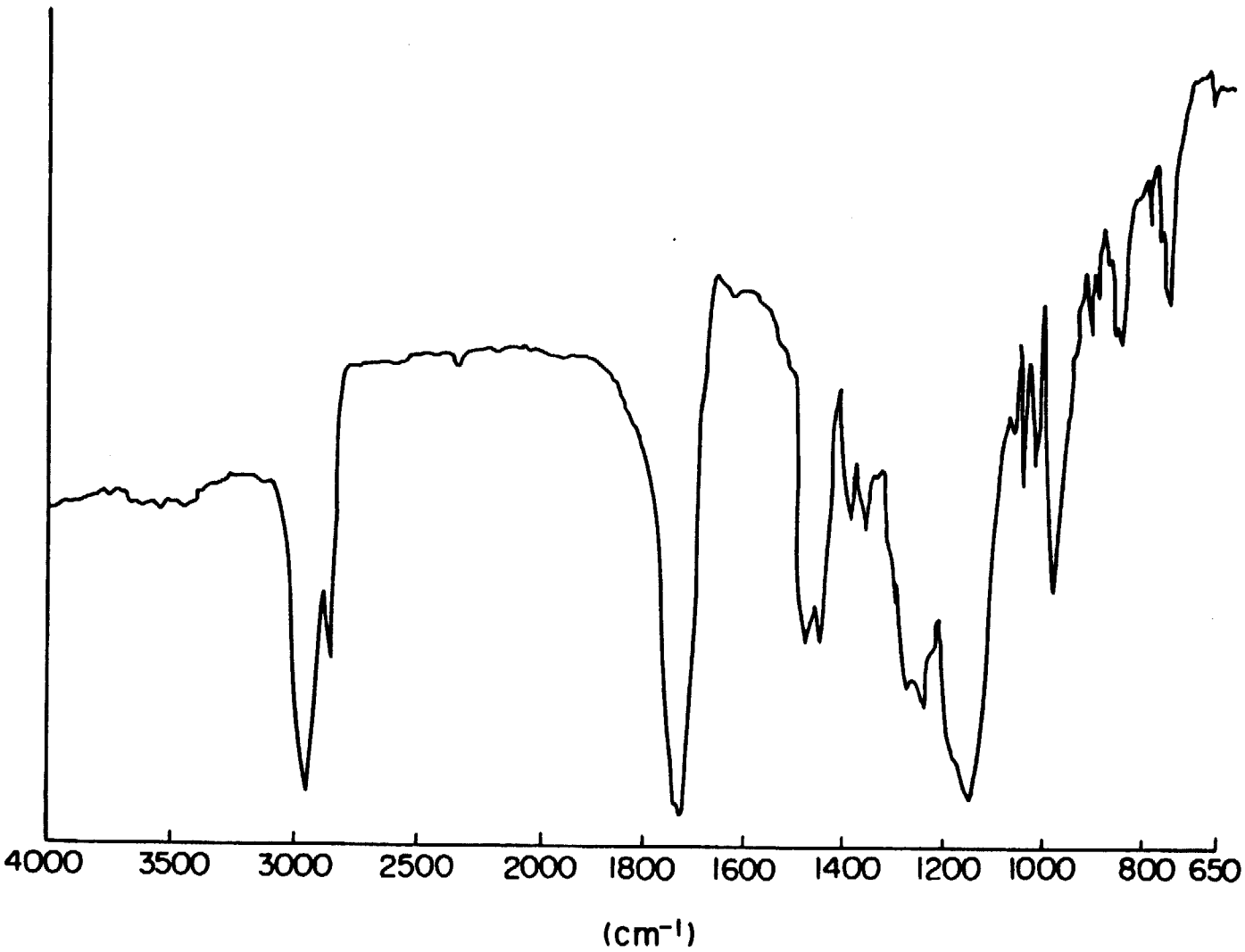
Figure 44:
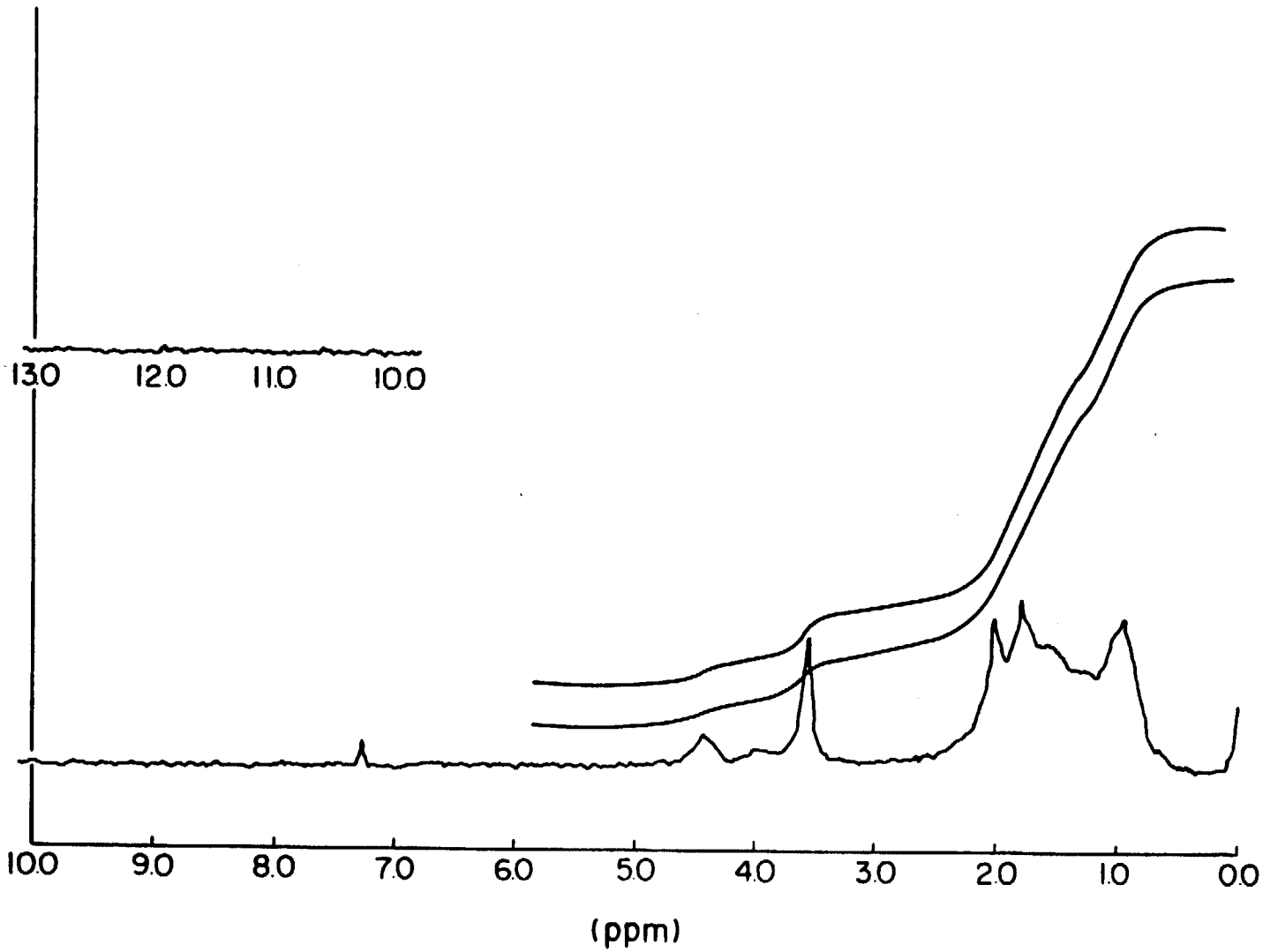
Figure 45:
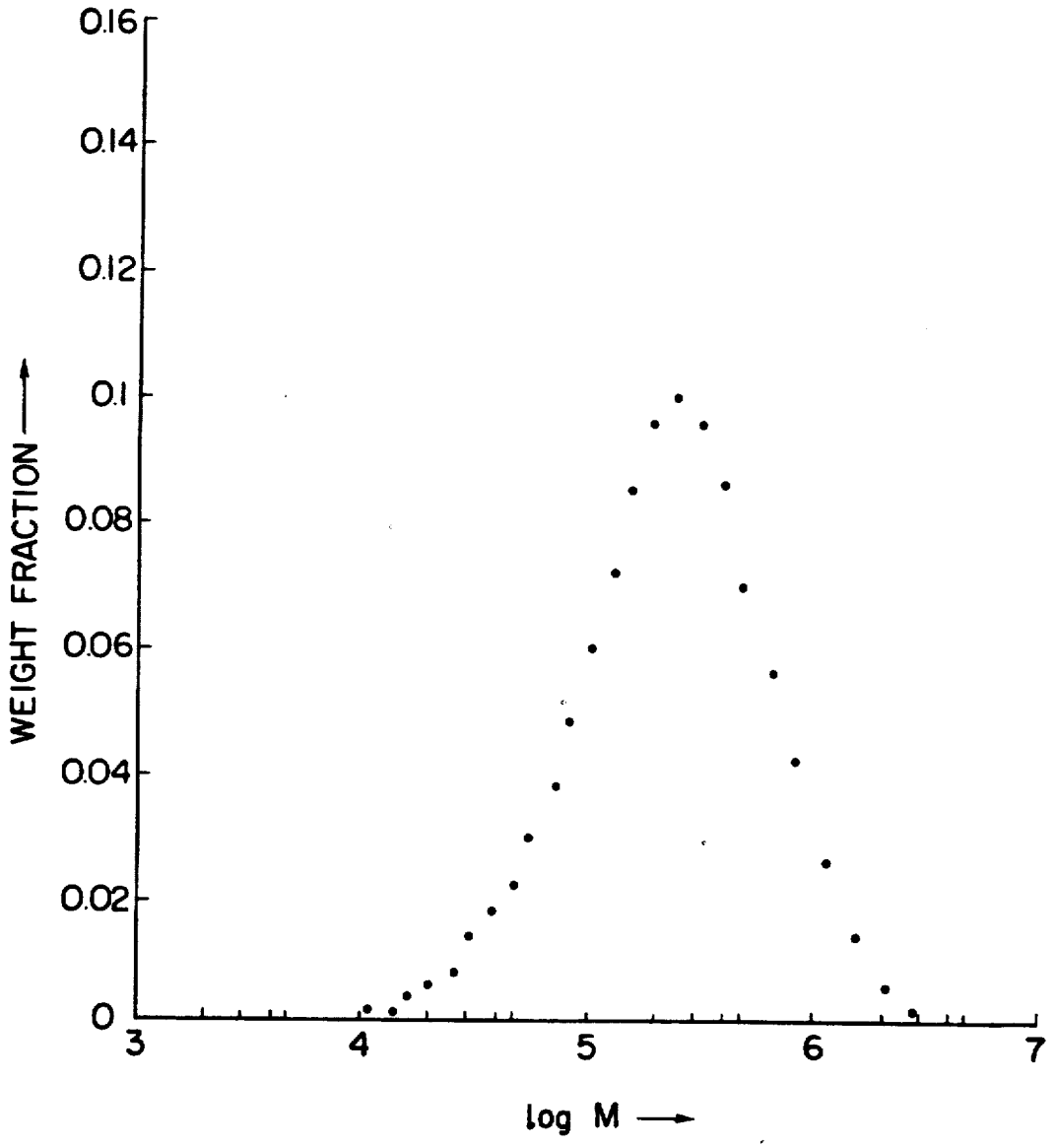
Figure 46:
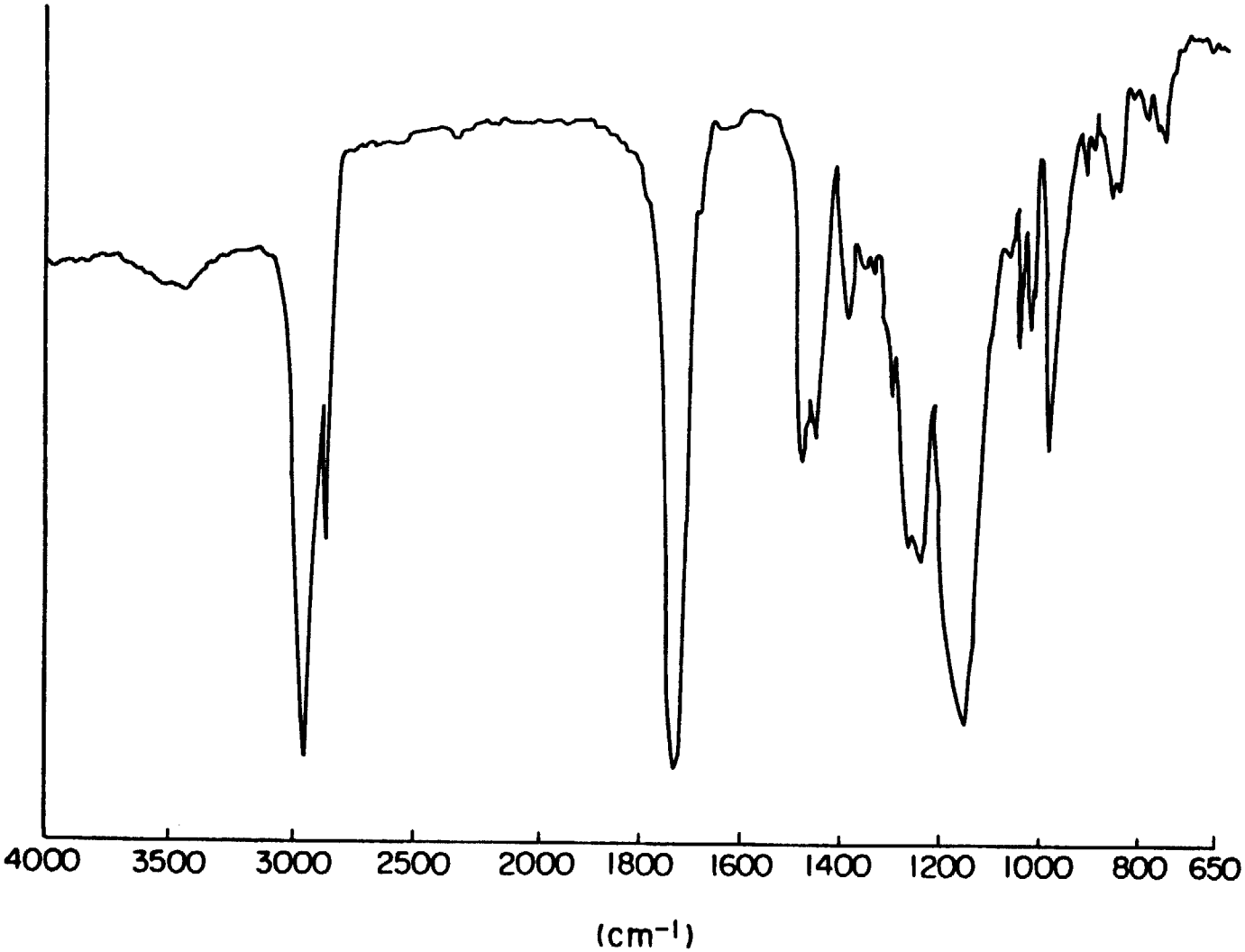
Figure 47:
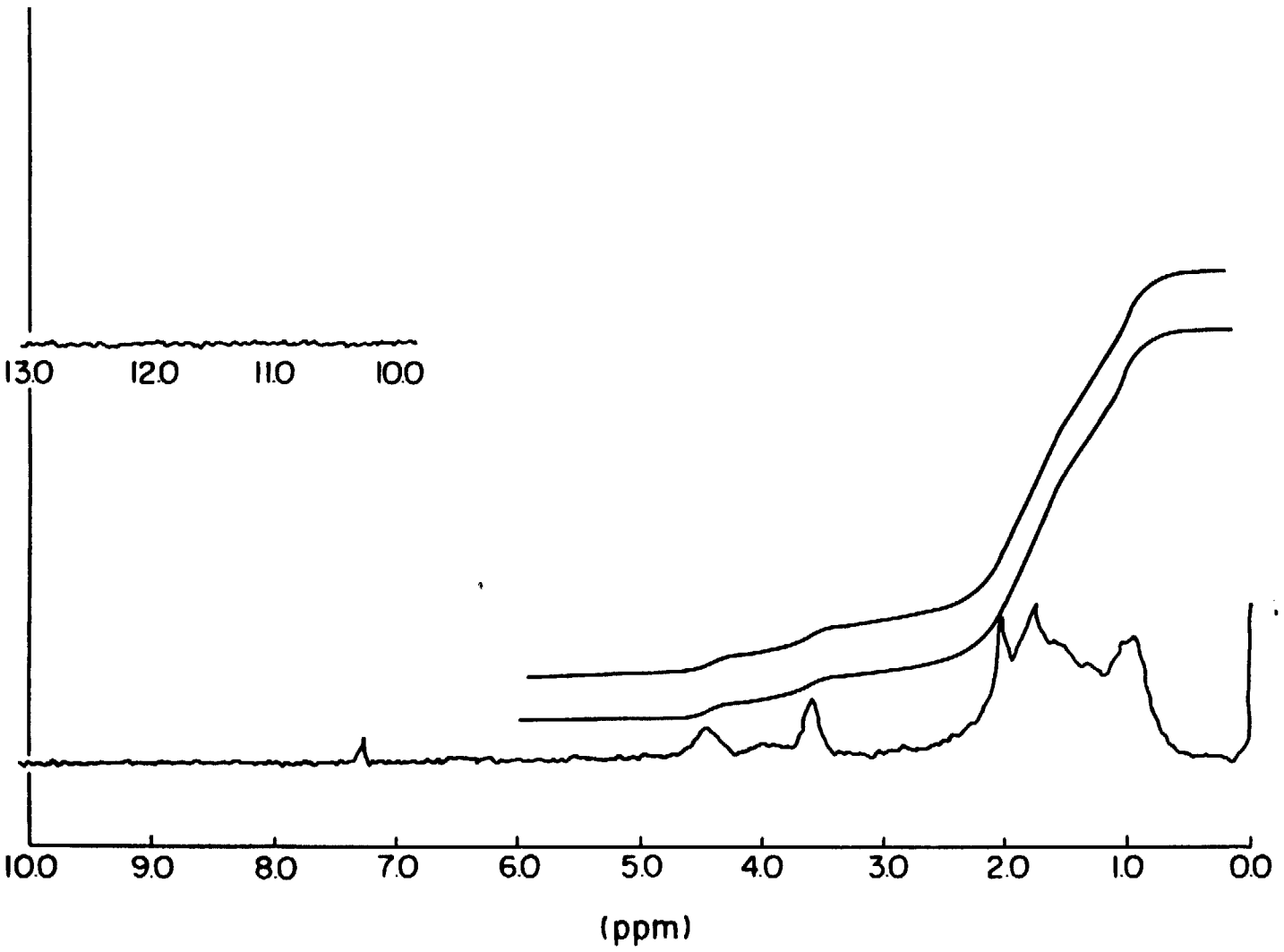
Figure 48:
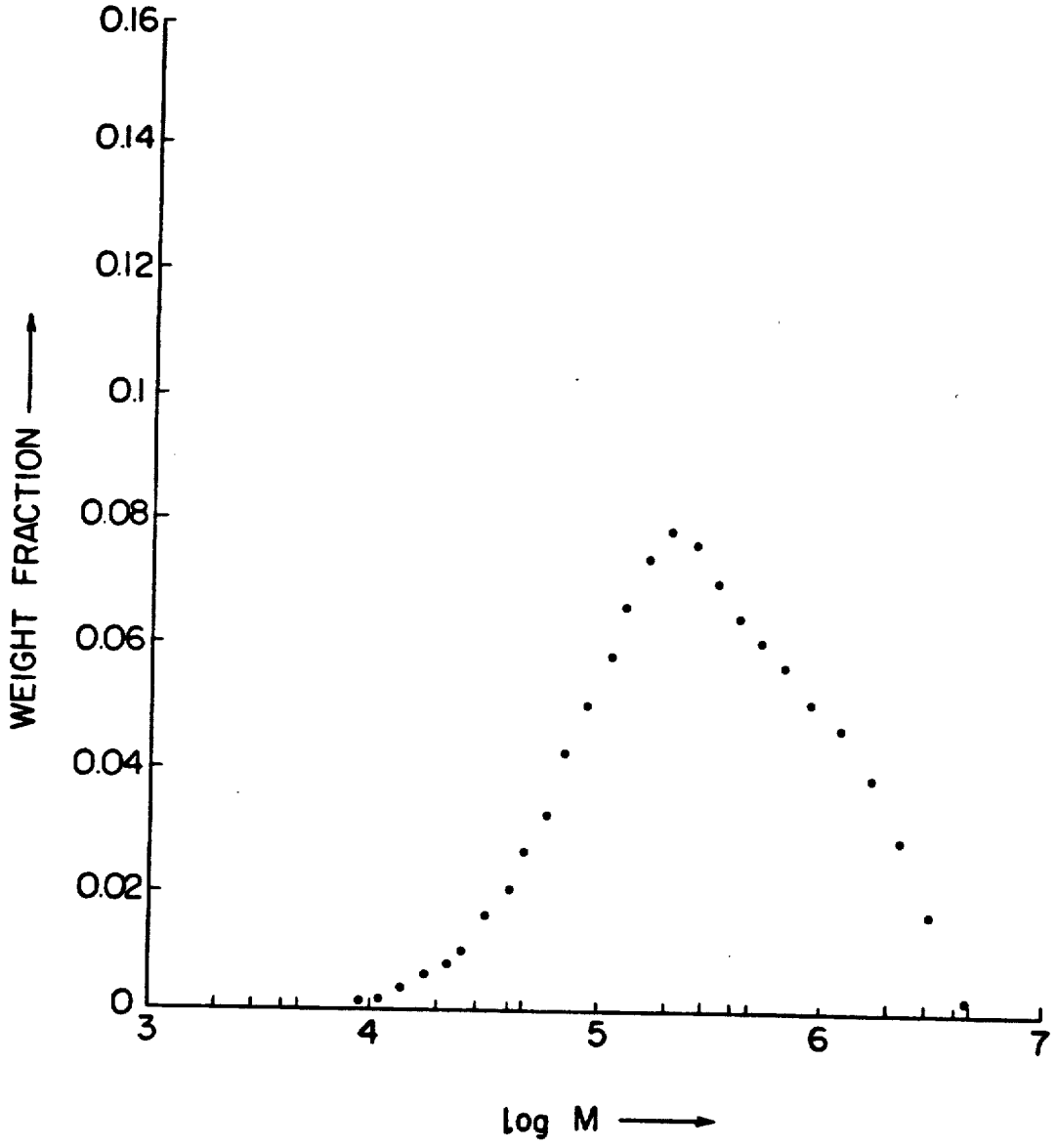
Figure 49:
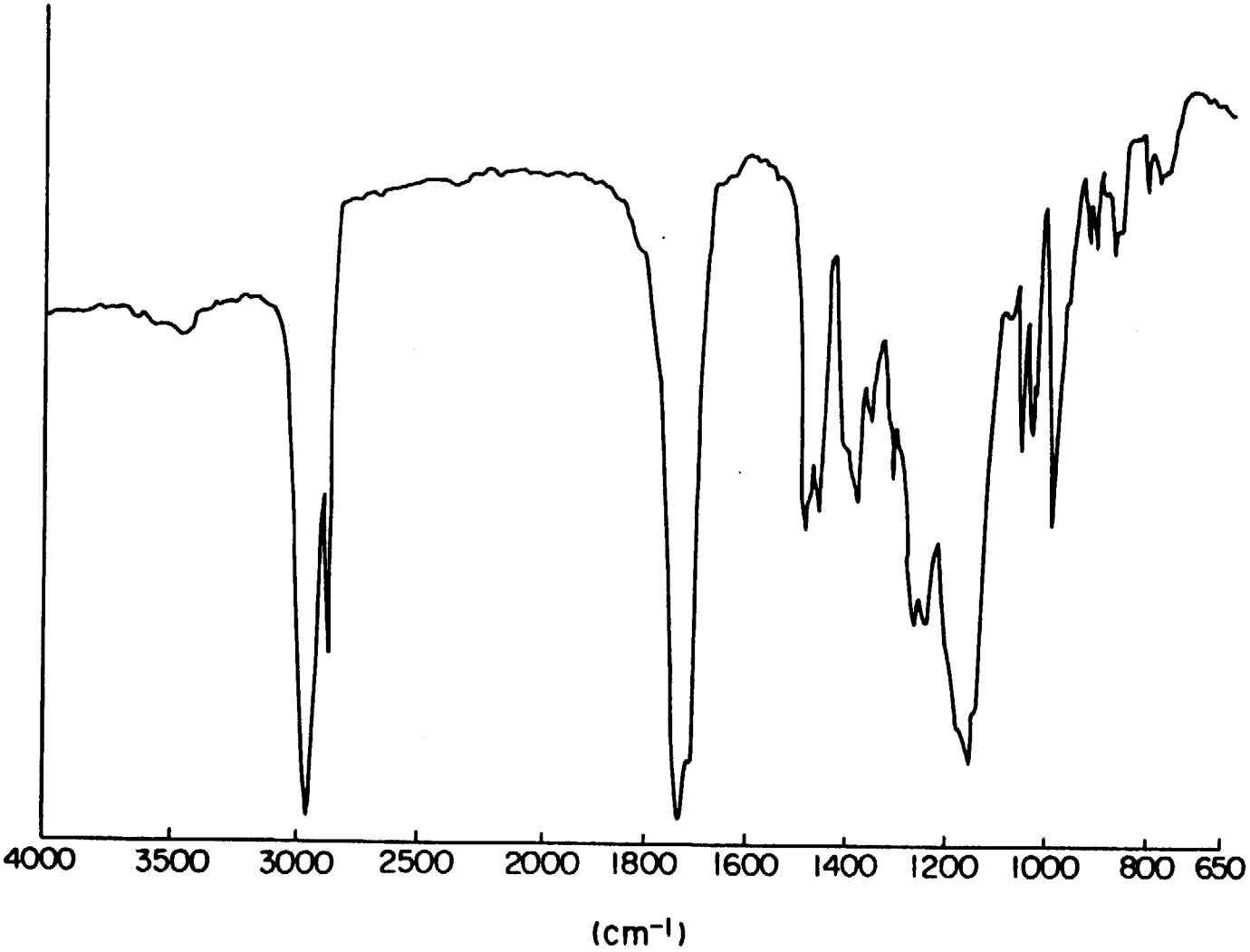
Figure 50:
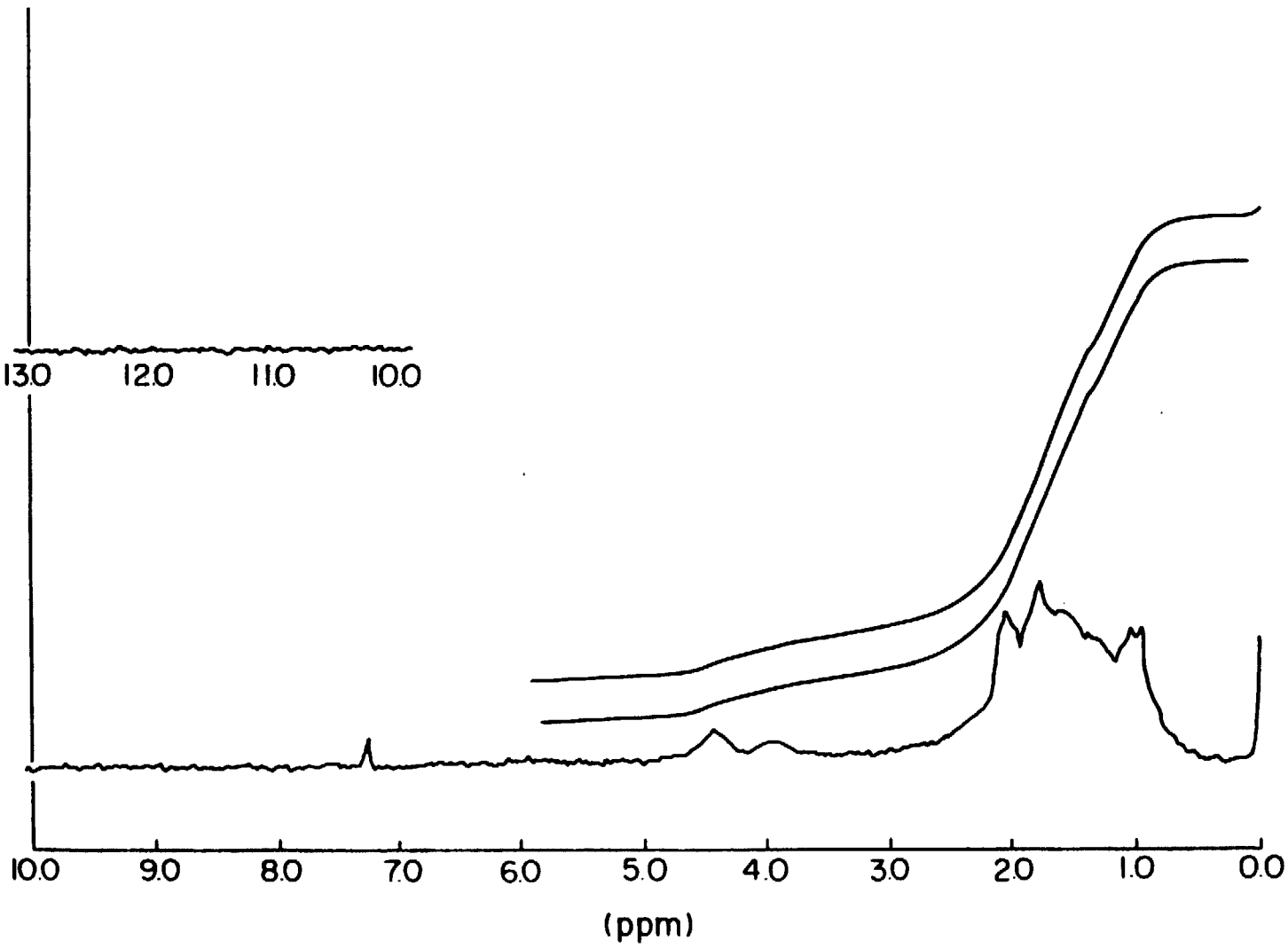
Figure 51:
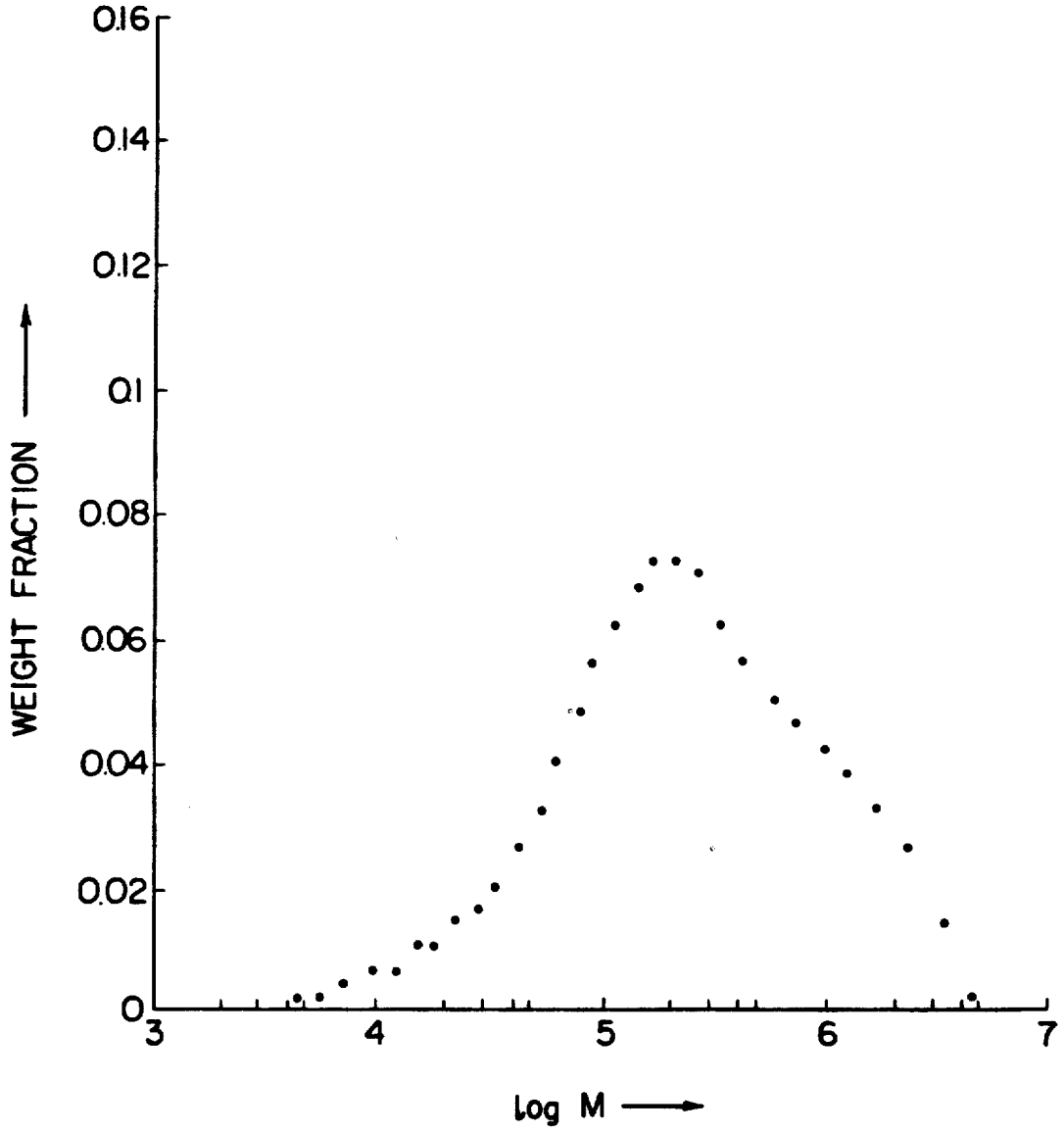
Figure 53:
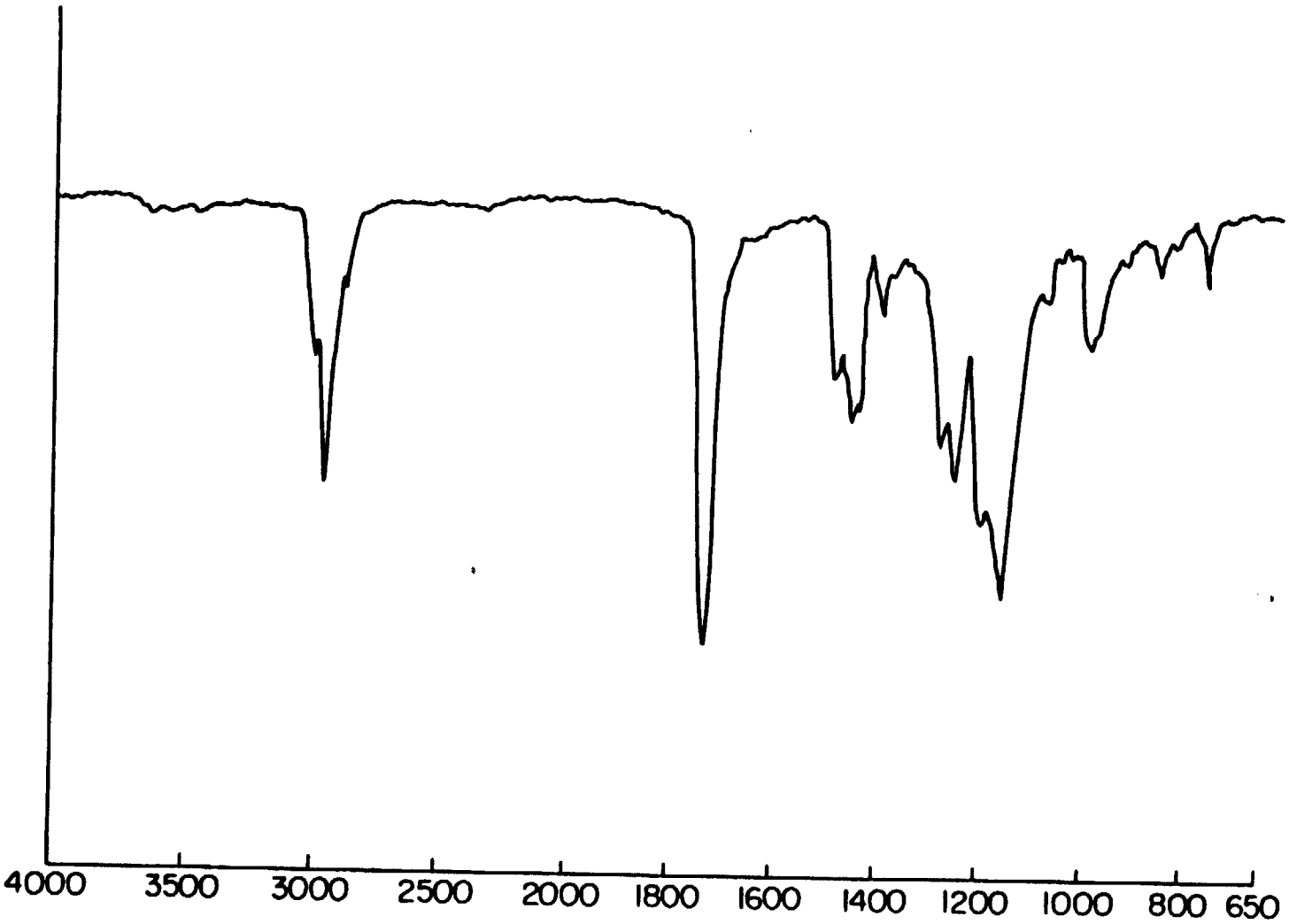

| | Example No. | | | | | | | | | | | | |
|---|---|---|---|---|---|---|---|---|---|---|---|---|---|
| | 28 | 29 | 30 | 31 | 32 | 33 | 34 | 35 | 36 | 37 | 38 | 39 | 40 |
| Monomers, etc (g) | | | | | | | | | | | | | |
| TCD-MA | 750 | 900 | 900 | 850 | 800 | 800 | 700 | 550 | 600 | 750 | 750 | 20 | 10 |
| Ethyl acrylate | — | 100 | — | — | — | — | — | — | — | — | — | — | — |
| n-Butyl acrylate | 150 | — | 100 | 150 | — | — | — | 50 | 100 | 100 | 150 | — | — |
| t-Butyl acrylate | — | — | — | — | 200 | — | — | — | — | — | — | — | — |
| 2-Ethylhexyl acrylate | — | — | — | — | — | — | — | — | — | — | — | 2 | — |
| Cyclohexyl acrylate | — | — | — | — | — | 200 | — | — | — | — | — | — | — |
| Methyl methacrylate | — | — | — | — | — | — | — | 400 | 300 | 150 | — | 63 | 90 |
| Ethyl methacrylate | — | — | — | — | — | — | 300 | — | — | — | — | — | — |
| Benzyl methacrylate | — | — | — | — | — | — | — | — | — | — | — | 15 | — |
| N-Methylmaleimide | 100 | — | — | — | — | — | — | — | — | — | — | — | — |
| N-Cyclohexylmaleimide | — | — | — | — | — | — | — | — | — | — | 100 | — | — |
| Lauroyl peroxide | 4 | — | — | 4 | 4 | 4 | 4 | 4 | 4 | 4 | 4 | 4 | 4 |
| Benzoyl peroxide | — | 5 | 5 | — | — | — | — | — | — | — | — | — | — |
| n-Dodecyl mercaptan | 1 | 3 | 1.5 | 2 | 1.5 | 1.5 | 1.5 | 2 | 1 | 1 | 1 | 1 | 1 |
| Yield of powdery polymer (mole %) | 99.5 | 98 | 99 | 99.5 | 99.5 | 99.5 | 98 | 98 | 98 | 98 | 98 | 98 | 98 |
| IR spectrum | FIG. 19 | FIG. 22 | FIG. 25 | FIG. 28 | FIG. 31 | FIG. 34 | FIG. 37 | FIG. 40 | FIG. 43 | FIG. 46 | FIG. 49 | FIG. 52 | FIG. 53 |
| NMR spectrum | FIG. 20 | FIG. 23 | FIG. 26 | FIG. 29 | FIG. 35 | FIG. 38 | FIG. 41 | FIG. 44 | FIG. 47 | FIG. 50 | FIG. | — | — |
| MW distribution | FIG. 21 | FIG. 24 | FIG. 27 | FIG. 30 | FIG. 33 | FIG. 36 | FIG. 39 | FIG. 42 | FIG. 45 | FIG. 48 | FIG. 51 | — | — |

TABLE 8

| Example No. | Elementary analysis values (wt. %) | | | | Repeating units (mole %) | | | Tg (°C.) | Decomposition beginning point (°C.) | Weight-average molecular weight ($\times 10^4$) |
|---|---|---|---|---|---|---|---|---|---|---|
| | O | H | O | N | II | III | IV | | | |
| 22 | 75.7 | 9.4 | 14.9 | — | 100 | — | — | 173 | 237 | 7.3 |
| 23 | 75.1 | 9.6 | 15.3 | — | 100 | — | — | 103 | 255 | 16 |
| 24 | 75.4 | 9.5 | 15.1 | — | 100 | — | — | 141 | 245 | 9.2 |
| 25 | 73.8 | 9.0 | 17.2 | — | 68 | 32 | — | 144 | 238 | 10 |
| 26 | 74.4 | 9.3 | 16.3 | — | 54 | 46 | — | 141 | 239 | 8.4 |
| 27 | 73.6 | 8.3 | 16.8 | 1.3 | 83 | — | 17 | 125 | 265 | 21 |
| 28 | 72.7 | 8.7 | 17.4 | 1.2 | 63 | 21 | 16 | 143 | 260 | 52 |
| 29 | 74.8 | 9.4 | 15.8 | — | 80 | 20 | — | 148 | 266 | 6.6 |
| 30 | 75.3 | 9.1 | 15.6 | — | 84 | 16 | — | 142 | 267 | 17 |
| 31 | 74.3 | 9.4 | 16.3 | — | 77 | 23 | — | 128 | 269 | 9.3 |
| 32 | 73.7 | 9.3 | 17.0 | — | 70 | 30 | — | 148 | 242 | 13 |
| 33 | 74.6 | 9.6 | 15.8 | — | 74 | 26 | — | 142 | 264 | 11 |
| 34 | 72.3 | 9.5 | 18.2 | — | 55 | 45 | — | 144 | 236 | 12 |
| 35 | 69.0 | 9.0 | 22.0 | — | 36 | 64 | — | 135 | 250 | 10 |
| 36 | 70.4 | 8.8 | 20.8 | — | 42 | 58 | — | 134 | 260 | 34 |
| 37 | 72.9 | 9.0 | 18.1 | — | 60 | 40 | — | 134 | 260 | 54 |
| 38 | 73.8 | 9.0 | 16.4 | 0.8 | 66 | 23 | 11 | 137 | 260 | 51 |
| 39 | 61.7 | 13.8 | 24.5 | — | 11 | 89 | — | 140 | — | — |
| 40 | 61.7 | 8.2 | 30.1 | — | 5 | 95 | — | 132 | — | — |

In Table 8, the repeating unit ratio (in the main chain) was indicated by mole % of individual repeating units of the formulae (II), (III) and (IV) calculated from the elementary analysis values.

Glass transition point was measured in the same manner as described in Example 1.

The decomposition beginning point was indicated by the temperature at which the weight loss by heating began when measured by using a differencial thermogravimetric balance (TG-DTA).

The weight-average molecular weight was calculated based on FIG. 3.

TABLE 9

| Example No. | Light transmittance (%) | Moisture adsorption (%) |
|---|---|---|
| 22 | 91 | 0.2 |
| 23 | 91 | 0.2 |
| 24 | 91 | 0.2 |
| 25 | 91 | 0.3 |
| 26 | 91 | 0.3 |
| 27 | 90 | 0.5 |
| 28 | 90 | 0.5 |
| 29 | 91 | 0.5 |
| 30 | 91 | 0.3 |
| 31 | 91 | 0.3 |
| 32 | 91 | 0.3 |
| 33 | 91 | 0.2 |
| 34 | 91 | 0.4 |
| 35 | 92 | 0.6 |
| 36 | 92 | 0.5 |
| 37 | 91 | 0.3 |

TABLE 9-continued

| Example No. | Light transmittance (%) | Moisture adsorption (%) |
|---|---|---|
| 38 | 90 | 0.4 |
| 39 | 90 | 1.1 |
| 40 | 92 | 1.5 |
| Poly(methyl methacrylate)* | 93 | 2.0 |

EXPERIMENT 1

Flow properties at extrusion and molding of the polymer particles obtained in Example 30 were measured by using a Koka type flow tester (nozzle diameter 1 mm, cylinder crosssectional area 1 $cm^2$; mfd. by Shimazu Seisakusho, Ltd.) at a pressure of 20 $kg/cm^2$ and various temperatures of 200° C., 205° C., 210° C., 215° C., and 220° C. to measure flowed out resin volumes per minutes (flow rate) ($cm^3$/min). The flow rate was taken along the ordinate axis in logarithm and the flow properties were shown in FIG. 54 as the curve 1. The flow properties of commercially available poly(methyl methacrylate)(Acrypet VH, a tradename mfd. by Mitsubishi Rayon Co., Ltd.) were also measured for comparison and shown in FIG. 54 as the curve 2.

Figure 54:
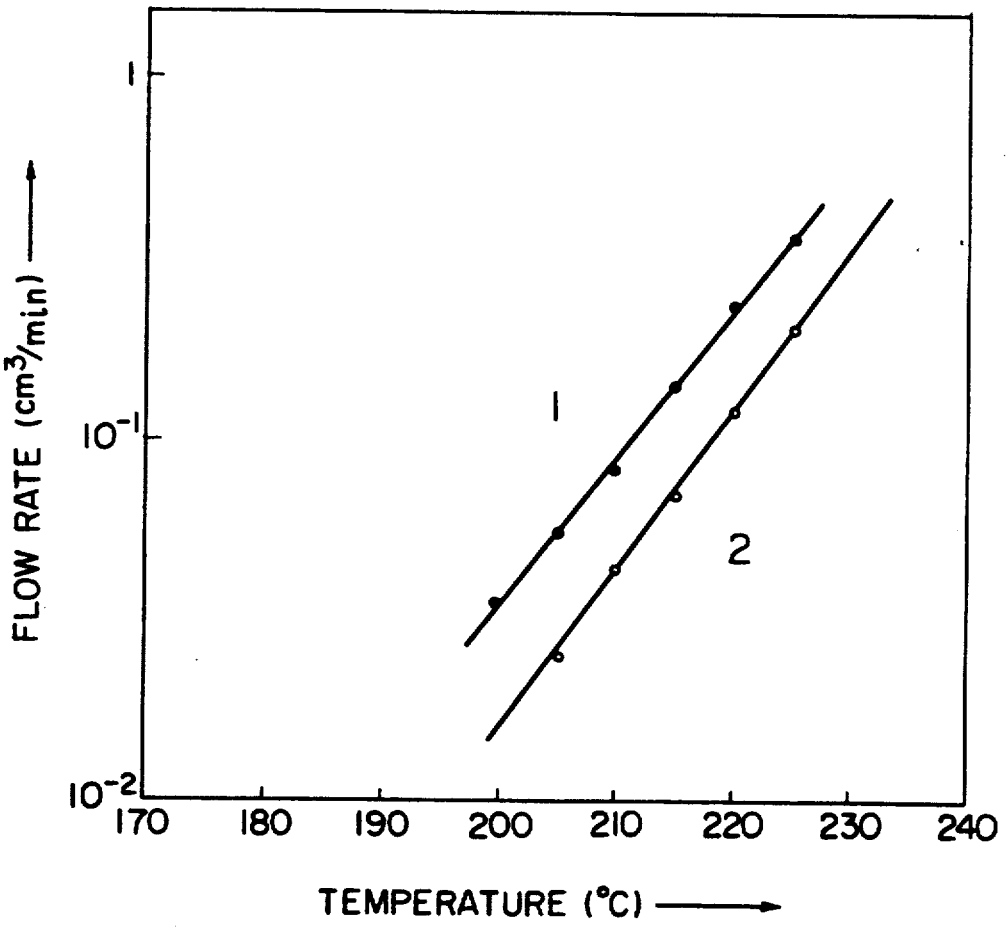
FIG. 54 is a graph showing fluidity of a polymer obtained in this invention.

As is clear from FIG. 54, the polymer particles of this invention show better flow properties than the commercially available one and are suitable for extrusion, injection and the like molding. Further, the strands extruded by the flow tester are excellent in transparency and do not show phenomena of coloring, foaming, and the like.

EXAMPLE 41

In a 500-ml triangular flask equipped with a threeway stop cock, 200 g of TCD-MA, 0.4 g of lauroyl peroxide, 0.4 g of 1,1-bis(t-butylperoxy)-3,3,5-trimethylcyclohexane and 0.2 g of 2,5-dimethyl-2,5-di(t-butylperoxy)-hexin-3 were placed, mixed and dissolved. After relacing the air in the flash by nitrogen gas, the flask was dipped in a constant temperature water bath at 60° C. and subjected to polymerization for 30 minutes with stirring under a nitrogen stream to give a partially polymerized material. Then, the partially polymerized material was cast into a glass cell and further polymerized at 60° C. for 6 hours, 90° C. for 2 hours, 130° C. for 8 hours and 150° C. for 2 hours to give a transparent cast plate of 150 mm×150 mm×3 mm.

EXAMPLES 42 TO 49

COMPARATIVE EXAMPLES 1 TO 3

The process of Example 41 was repeated except for using monomer or monomers as listed in Table 10 to give transparent cast plates.

TABLE 10

(unit: g)

| | Example No. | | | | | | | | | | | |
|---|---|---|---|---|---|---|---|---|---|---|---|---|
| | Example 41 | Example 42 | Example 43 | Example 44 | Example 45 | Example 46 | Example 47 | Example 48 | Example 49 | Comparative Example 1 | Comparative Example 2 | Comparative Example 3 |
| TCD-MA | 200 | — | 100 | 50 | 100 | 180 | 140 | 180 | 160 | — | — | — |
| TCD-AA | — | 200 | 100 | — | — | — | — | — | — | — | — | — |
| Methyl methacrylate | — | — | — | 150 | — | — | 50 | — | — | 200 | — | — |
| Cyclohexyl methacrylate | — | — | — | — | 100 | — | — | — | — | — | 200 | — |
| n-Octadecyl-methacrylate | — | — | — | — | — | 20 | — | — | — | — | — | — |
| n-Butyl acrylate | — | — | — | — | — | — | 10 | — | — | — | — | — |
| Styrene | — | — | — | — | — | — | — | 20 | 40 | — | — | 200 |

Note
*Acrypet VH, mfd. by Mitsubishi Rayon Co., Ltd.

The cast plates obtained in Examples 41 to 49 and Comparative Examples 1 to 3 were subjected to tests for measuring the total light transmittance, refractive index, Abbe number, saturated water absorption rate and glass transition point.

The total light transmittance was measured according to JIS K 6717.

The refractive index and the Abbe number were measured by using an Abbe refractometer.

The saturated water absorption rate was obtained by weighing a dried cast plate (dry weight), immersing the cast plate in water at 70° C. for 72 hours, weighing the cast plate (water absorbed weight), and calculating by using the following equation:

$$\text{Saturated water absorption rate} = \frac{\left(\text{Water absorbed weight}\right) - \left(\text{Dry weight}\right)}{(\text{Dry weight})} \times 100(\%)$$

The glass transition point was measured in the same manner as described in Example 1.

TABLE 11

| Example No. | Light transmittance (%) | Refractive index ($n_D$) | Abbe number ($\nu_D$) | Saturated water absorption (%) | Tg (°C.) |
|---|---|---|---|---|---|
| Example 41 | 92 | 1.528 | 57 | 0.2 | 173 |
| Example 42 | 92 | 1.520 | 57 | 0.2 | 107 |
| Example 43 | 92 | 1.524 | 57 | 0.2 | 141 |
| Example 44 | 93 | 1.500 | 57 | 1.0 | 128 |
| Example 45 | 92 | 1.517 | 57 | 0.3 | 133 |
| Example 46 | 92 | 1.522 | 56 | 0.3 | 130 |
| Example 47 | 92 | 1.514 | 57 | 0.5 | 126 |
| Example 48 | 92 | 1.520 | 57 | 0.3 | 129 |
| Example 49 | 92 | 1.538 | 50 | 0.2 | 152 |
| Comparative | 93 | 1.492 | 58 | 22 | 120 |

TABLE 11-continued

| Example No. | Light transmittance (%) | Refractive index ($n_D$) | Abbe number ($\nu_D$) | Saturated water absorption (%) | Tg (°C.) |
|---|---|---|---|---|---|
| Example 1 | | | | | |
| Comparative Example 2 | 92 | 1.506 | 57 | 0.4 | 93 |
| Comparative Example 3 | 90 | 1.592 | 31 | <0.1 | 112 |

EXAMPLE 50

In a 5-liter separable flask equipped with a stirrer and a condenser, 83 g of a 10% basic potassium phosphate aqueous suspension as a dispersing agent, 0.004 g of sodium dodecylbenzenesulfonate and 1 g of sodium sulfate were place together with 2400 g of pure water and stirred and mixed to give a suspended medium. To this, a mixture of the following composition was added and the polymerization was carried out under a nitrogen atmosphere with stirring at 200 r.p.m at 60° C. for 3 hours and 98° C. for 4 hours.

| | |
|---|---|
| TCD-MA | 1800 g |
| n-Butyl acrylate | 200 g |
| Lauroyl peroxide | 8 g |
| n-Octyl mercaptan | 2 g |
| n-Octadecyl-3-(4'-hydroxy-3',5'-di-t-butylphenyl)propionate | 4 g |
| Stearyl alcohol | 2 g |

Polymer particles thus produced were washed with an acid, washed with water, dehydrated and dried in vacuum to give an optical resin material.

EXAMPLES 51 TO 53

COMPARATIVE EXAMPLES 4 AND 5

The process of Example 50 was repeated except for using monomers as shown in Table 12 to give optical resin materials.

TABLE 12

| | Example No. | | | | Comparative Example 4 | (unit: g) Comparative Example 5 |
|---|---|---|---|---|---|---|
| | 50 | 51 | 52 | 53 | | |
| TCD-MA | 1800 | 1400 | 1260 | — | — | — |
| TCD-AA | — | — | — | 1800 | — | — |
| Methyl methacrylate | — | 600 | 500 | — | 2000 | — |
| Cyclohexyl methacrylate | — | — | — | — | — | 2000 |
| n-Butyl acrylate | 200 | — | — | — | — | — |
| Styrene | — | — | 240 | — | — | — |
| N-Ethylmaleimide | — | — | — | 200 | — | — |

The optical resin materials obtained in Examples 50–53 and Comparative Examples 4 and 5 were injection molded at a resin temperature of 230° C. to give lenses having a center thickness of 3 mm and a diameter of 14 mm. The lenses were allowed to stand under an atmosphere of 100% RH (humidity) at 40° C. for 6 hours to absorb moisture and change of face accuracy was measured. The change of face accuracy by moisture absorption was defined by a difference in numbers of Newton's rings formed by the lense before moisture absorption and that after moisture absorption and measured by a conventional optical measuring method. On the other hand, a lense obtained by the molding was allowed to stand at 80° C. and a humidity of 40% RH for 1 hour to measure change of face accuracy (face accuracy change by heat). The results are shown in Table 13.

TABLE 13

| Example No. | Face accuracy change by moisture absorption (difference in number) | Face accuracy change by heat (difference in number) |
|---|---|---|
| Example 50 | 0–1 | 0–1 |
| Example 51 | 1 | 0–1 |
| Example 52 | 1 | 0–1 |
| Example 53 | 1 | 0–1 |
| Comparative Example 4 | 3 | 1 |
| Comparative Example 5 | 0–1 | 3 |

EXAMPLE 54

In a 100-liter autoclave, 10 kg of TCD-MA, 10 kg of methyl methacrylate, 80 g of lauroyl peroxide, 30 g of n-octyl mercaptan, 40 kg of pure water, 40 g of potassium polymethacrylate, 4 g of poly(vinyl alcohol) and 40 g of disodium hydrogen phosphate were placed and subjected to polymerization under a nitrogen atmosphere at 60° C. for 3 hours and at 100° C. for 4 hours. The resulting polymer particles were washed with water, dehydrated and dried in vacuum to give an optical resin material.

EXAMPLES 55 TO 57

COMPARATIVE EXAMPLES 6 AND 7

The process of Example 54 was repeated except for using monomers as listed in Table 14 to give optical resin materials.

| | Example No. | | | | Comparative Example | (unit: kg) Comparative Example |
|---|---|---|---|---|---|---|
| | 54 | 55 | 56 | 57 | 6 | 7 |
| TCD-MA | 10 | 6 | — | 2 | — | — |
| TCD-AA | — | — | 16 | — | — | — |
| Methyl methacrylate | 10 | 13 | — | — | 20 | 8 |
| Ethyl methacrylate | — | — | — | 16 | — | — |
| n-Octadecyl methacrylate | — | — | 2 | — | — | — |
| Cyclohexyl methacrylate | — | — | — | — | — | 12 |
| Styrene | — | 1 | — | — | — | — |
| N-Methylmaleimide | — | — | — | 2 | — | — |
| N-Ethylmaleimide | — | — | 2 | — | — | — |

The optical resin materials obtained in Examples 54 to 57 and Comparative Examples 6 and 7 were injection molded at a resin temperature of 260° C. to give transparent substrates for disk places of 120 mm in diameter and 1.2 mm in thickness. Aluminum was vapor metallized on one side of a substrate and covered with a protective film.

The thus produced disk plates were allowed to stand under a humidity of 100% RH at 40° C. for 24 hours to measure the warpage of the center portion of disk plate (strain by moisture absorption) and the heat deformation temperature (HDT). The warpage was obtained by measuring the height (mm) of the center portion of disk when the periphery of disk plate was positioned horizontally.

The results are shown in Table 15.

TABLE 15

| Example No. | Strain by moisture absorption (mm) | HDT (°C.) |
|---|---|---|
| Example 54 | 0.1 | 108 |
| Example 55 | 0.1-0.2 | 103 |
| Example 56 | 0.1 | 100 |
| Example 57 | 0.1 | 97 |
| Comparative Example 6 | 1.5 | 97 |
| Comparative Example 7 | 0.2 | 87 |

The optical resin materials obtained in Examples 51 to 57 were injection molded at a resin temperature of 230° C. to give plates of 150 mm×150 mm+3 mm. Using these plates, the Abbe number, the saturated water absorption rate and the glass transition point (Tg) were measured in the same manner as described in Examples 41 to 49.

The results are shown in Table 16.

TABLE 16

| Example No. | Abbe number | Saturated water absorption rate (%) | Tg (°C.) |
|---|---|---|---|
| 51 | 57 | 0.5 | 153 |
| 52 | 51 | 0.4 | 140 |
| 53 | 55 | 0.4 | 127 |
| 54 | 57 | 0.8 | 142 |
| 55 | 54 | 1.2 | 130 |
| 56 | 55 | 0.4 | 120 |
| 57 | 55 | 1.6 | 132 |

As is clear from Examples 41 to 57 and Comparative Examples 1 to 7, the optical resin materials of this invention are superior to known materials as follows. The saturated water absorption rate of poly(methyl methacrylate) (Comparative Example 1) is 2.2%, while those of the Examples of this invention are by far lower than that value. The glass transition point of poly(cyclohexyl methacrylate) (Comparative Example 2) is 93° C., while those of the Examples of this invention are all over 100° C. The Abbe number of polystyrene (Comparative Example 3) is 31, while those of the Examples of this invention are by far larger than that value. Further, it is clear that the materials of the Examples of this invention are superior in moisture resistance (the saturated water absorption rate), heat resistance and optical dispersion. Further, as is clear from Tables 13 and 15, the optical resin materials of this invention are stable for moisture absorption and heat even if used for practical articles such as lenses and disk plates.

What is claimed is:

1. A transparent material for optical elements comprising a polymer produced by polymerizing a compound of the formula:

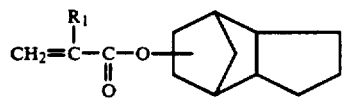

(I)

wherein $R_1$ is hydrogen or a methyl group, in an amount of 100 to 5% by weight and one or more unsaturated monomers copolymerizable with the compound of the formula (I) in an amount of 0 to 95% by weight; said material exhibiting a saturated water absorption rate of 1.8% or less, and Abbe number of 45 or more and a glass transition point of 100° C. or higher.

2. A polymer according to claim 1, wherein the unsaturated monomer copolymerizable with the compound of the formula (I) is at least one member selected from the group consisting of unsaturated fatty acid esters, aromatic vinyl compounds, vinyl cyanide compounds, unsaturated dibasic acids or derivatives thereof, and unsaturated fatty acids or derivatives thereof.

3. A polymer according to claim 1, wherein the compound of the formula (I) is used in an amount of 5% by weight or more, an N-substituted maleimide as the copolymerizable unsaturated monomer is used in an amount of 0 to 50% by weight, and other copolymerizable unsaturated monomer is used in an amount of 0 to 95% by weight, the total being 10% by weight.

4. A polymer according to claim 1, wherein the compound of the formula (I) is used in an amount of 5% by weight or more, an N-substituted maleimide as the copolymerizable unsaturated monomer is used in an amount of 0 to 50% by weight, a copolymerizable unsaturated monomer having a glass transition point of 50° C. or less when measured as to the homopolymer thereof is used in an amount of 0 to 50% by weight, and other copolymerizable unsaturated monomer is used in an amount of 0 to 95% by weight, the total being 100% by weight .

5. A polymer according to claim 1, which has a repeating unit of the formula:

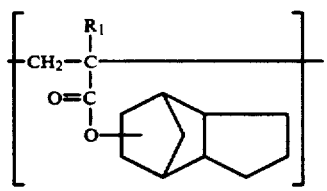

(II)

wherein $R_1$ is hydrogen or a methyl group, in an amount of 100 to 3 mole %, a repeating unit of the formula:

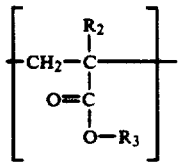

(III)

wherein $R_2$ is hydrogen or a methyl group; and $R_3$ is an alkyl group having 1 to 22 carbon atoms, a cycloalkyl group having 5 to 22 carbon atoms, or an aromatic group having 6 to 14 carbon atoms which may contain one or more substituents, in an amount of 0 to 97 mole %, and a repeating unit of the formula:

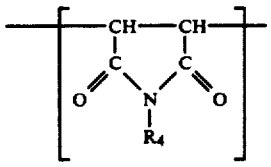

(IV)

wherein $R_4$ is an alkyl group having 1 to 6 carbon atoms or a cycloalkyl group having 5 to 22 carbon atoms, in an amount of 0 to 30 mole %, the total being 100 mole %.

6. A polymer according to claim 5, wherein the repeating unit of the formula (III) is derived from one or more monomers selected from the group consisting of methyl methacrylate, ethyl methacrylate, i-propyl methacrylate, n-butyl methacrylate, t-butyl methacrylate, hexyl methacrylate, 2-ethylhexyl methacrylate, cyclohexyl methacrylate, phenyl methacrylate, benzyl methacrylate, methyl acrylate, ethyl acrylate, n-butyl acrylate, t-butyl acrylate, hexyl acrylate, 2-ethylhexyl acrylate, cyclohexyl acrylate, phenyl acrylate and benzyl acrylate, and the repeating unit of the formula (IV) is derived from one or more monomers selected from the group consisting of N-methylmaleimide, N-ethylmaleimide, N-propylmaleimide, N-butylmaleimide, and N-cyclohexylmaleimide.

*7. A transparent material for optical elements comprising a polymer produced by polymerizing a compound of the formula:*

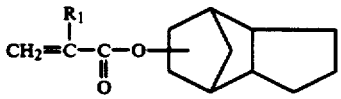

*wherein R1 is hydrogen or a methyl group, in an amount of 100 to 5% by weight and one or more unsaturated monomers copolymerizable with the compound of the formula (I) in an amount of 0 to 95% by weight; said material exhibiting excellent transparency, a saturated water absorption rate of 1.8% or less and a glass transition point of 100° C. or higher.*

*8. A transparent material according to claim 7, wherein said transparent material exhibits an Abbe number of 34 or more.*

* * * * *